(12) United States Patent
Maeda

(10) Patent No.: US 7,835,995 B2
(45) Date of Patent: Nov. 16, 2010

(54) LARGE CAPACITY DATA SALES MEDIATION SERVER AND TERMINAL

(75) Inventor: Koji Maeda, Tokyo (JP)

(73) Assignee: NEC Corporation, Tokyo (JP)

( * ) Notice: Subject to any disclaimer, the term of this patent is extended or adjusted under 35 U.S.C. 154(b) by 511 days.

(21) Appl. No.: 11/406,923

(22) Filed: Apr. 18, 2006

(65) Prior Publication Data

US 2006/0190415 A1    Aug. 24, 2006

Related U.S. Application Data

(62) Division of application No. 09/983,449, filed on Oct. 24, 2001, now abandoned.

(30) Foreign Application Priority Data

Oct. 25, 2000   (JP) .............................. 2000-332119

(51) Int. Cl.
*G06Q 20/00* (2006.01)

(52) U.S. Cl. ............................... 705/76; 705/10; 705/7; 705/1; 705/50; 705/28; 235/383; 235/375

(58) Field of Classification Search .............. 705/60–83
See application file for complete search history.

(56) References Cited

U.S. PATENT DOCUMENTS

| | | | |
|---|---|---|---|
| 5,109,413 A | 4/1992 | Comerford et al. | |
| 5,375,240 A | 12/1994 | Grundy | |
| 5,761,607 A | 6/1998 | Gudesen | |
| 5,809,143 A | 9/1998 | Hughes | |
| 5,815,577 A | 9/1998 | Clark | |
| 5,855,007 A | 12/1998 | Jovicic et al. | |

(Continued)

FOREIGN PATENT DOCUMENTS

JP          5-165782          7/1993

(Continued)

OTHER PUBLICATIONS

Naoya Torii, et al., "System Architecture for Superdistribution", vol. 94, No. 240, pp. 59-66, Sep. 21, 1994.

(Continued)

*Primary Examiner*—Calvin Loyd Hewitt, II
*Assistant Examiner*—Cristina Owen Sherr
(74) *Attorney, Agent, or Firm*—Foley & Lardner LLP

(57) ABSTRACT

An animation data sales mediation method, an animation data sales mediation system and so on are capable of providing large capacity data such as animation data by a large capacity storage medium in advance, rendering the time required for transfer of the data via the network extremely short by passing a key code for viewing the animation data via the network, rendering the labor and costs required for sales of the animation data extremely low, and providing the latest unauthorized copy technology to the animation data. The animation data sales mediation system has the steps of having a user terminal send to a large capacity data sales server an online access code corresponding to the large capacity data one to one, having the large capacity data sales server send the key code to the user terminal, having the user terminal encrypt and store the key code, and having the animation data used by using the key code.

5 Claims, 33 Drawing Sheets

U.S. PATENT DOCUMENTS

| | | | |
|---|---|---|---|
| 5,864,620 | A | 1/1999 | Pettitt |
| 5,875,247 | A | 2/1999 | Nakashima et al. |
| 5,884,280 | A | 3/1999 | Yoshioka et al. |
| 6,075,862 | A | 6/2000 | Yoshida et al. |
| 6,226,618 | B1 * | 5/2001 | Downs et al. ............ 705/51 |
| 6,253,193 | B1 | 6/2001 | Ginter et al. |
| 6,385,726 | B1 | 5/2002 | Hasebe et al. |
| 6,463,205 | B1 | 10/2002 | Aschbrenner et al. |
| 6,697,948 | B1 | 2/2004 | Rabin et al. |

FOREIGN PATENT DOCUMENTS

| | | |
|---|---|---|
| JP | 3-3290 | 11/1993 |
| JP | 8-84139 | 3/1996 |
| JP | 8-235759 | 9/1996 |
| JP | 9-73487 | 3/1997 |
| JP | 2723231 | 11/1997 |
| JP | 10-63364 | 3/1998 |
| JP | 10-334048 | 12/1998 |
| JP | 11-225324 | 8/1999 |
| WO | WO 99/60458 | 11/1999 |
| WO | WO 00/16229 | 3/2000 |

OTHER PUBLICATIONS

Makoto Yoshioka et al., "The Technical Trend of Super Distribution", vol. 94, No. 240, pp. 67-74, Sep. 21, 1994.

Shin'ichi Ueki et al., "The Accounting Process in Software Usage Monitor for Superdistribution", vol. 90, No. 1, pp. 1-10, Jan. 16, 1999.

U.S. Patent Office Action in related U.S. Appl. No. 11/406,677, dated Mar. 3, 2009, 10 pages.

Koji Maeda, USPTO Office Action, U.S. Appl. No. 11/406,677, Mar. 30, 2010, 13 pages.

* cited by examiner

F I G. 5

| SIGNAL NAME | SIGNAL TRANSMITTING SIDE | ADDITIONAL INFORMATION |
|---|---|---|
| REGISTRATION REQUEST | USER TERMINAL | ONLINE ACCESS CODE |
| REGISTRATION CONFIRMATION | ANIMATION DISTRIBUTION SERVICE COMPANY | KEY CODE |
| REGISTRATION REJECT | ANIMATION DISTRIBUTION SERVICE COMPANY | |
| DEREGISTRATION REQUEST | USER TERMINAL | |
| DEREGISTRATION CONFIRMATION | ANIMATION DISTRIBUTION SERVICE COMPANY | |
| DEREGISTRATION REJECT | ANIMATION DISTRIBUTION SERVICE COMPANY | |

F I G. 26
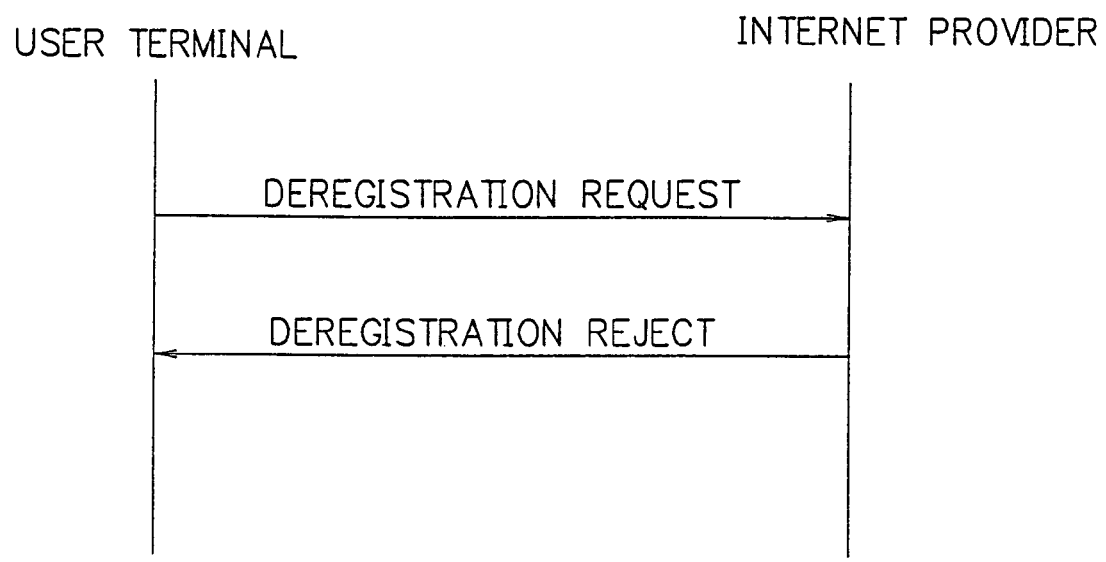

LARGE CAPACITY DATA SALES MEDIATION SERVER AND TERMINAL

CROSS-REFERENCE TO RELATED PATENT APPLICATIONS

This application is a division of application Ser. No. 09/983,449, filed Oct. 24, 2001, now pending, and related to two concurrently filed applications entitled LARGE CAPACITY DATA SALES SERVER AND RECORDING MEDIUM RECORDING PROGRAM THEREOF Ser. No. 11,406,921 and LARGE CAPACITY DATA SALES MEDIATION SERVER AND METHOD Ser. No. 11/406,677 and based on Japanese Patent Application No. 2000-332119, filed Oct. 25, 2000, by Koji Maeda. This application claims only subject matter disclosed in the parent application and therefore presents no new matter.

BACKGROUND OF THE INVENTION

The present invention relates to large capacity data sales method and system, and large capacity data sales mediation method and system for selling data of a large capacity such as animation data.

DESCRIPTION OF THE RELATED ART

In recent years, a technology (service) for distributing data such as music via a network, such as the Internet, is rapidly becoming widespread. For instance, an incoming tone distribution service for a portable telephone is quite successful in terms of business.

According to the above conventional technology, however, time required for transmitting data is extremely long in the case of distributing or selling large capacity data of a data amount (capacity) far larger than music data, such as animation data, map data and dictionary data. For this reason, communication costs and so on also become huge. In addition, sending and receiving data of such large amount puts an enormous load on a communication environment.

Therefore, distribution and sales of data via the network is effective for data of a small capacity such as melody data for incoming tone as in the above conventional technology, but it is not practical in the case of large capacity data such as animation data.

On the other hand, storage media capable of storing large capacity data as animation data are currently quite inexpensive. For instance, a DVD-ROM, a typical one of such storage media is capable of storing large capacity data such as movies, and may be even attached to a magazine or the like nowadays.

Moreover, a CD-ROM, which is becoming popular as a storage medium for storing large capacity data in spite of its smaller capacity than the DVD-ROM, are occasionally distributed for free.

Thus, it is expected that the animation data will be sold and distributed by such storage media rather than a communication line in the future as well.

As for a sales and distribution method of the animation data using such storage media, however, various problems are pointed out. A first problem is that this large capacity data may be distributed to a number of unspecified persons. A second problem is that this large capacity data becomes expensive. A third problem is that much labor and costs are required therefor.

The first problem is a problem of so-called unauthorized copies. For instance, a variety of technologies for preventing unauthorized copies are installed on the DVD-ROM, but these unauthorized copy preventing technologies are uniformly provided as a standard of the DVD-ROM, and so their level relatively become lower and vulnerable as the technology level is ever rising.

The second problem arises because such a sales method only allows assignment of the large capacity data. To be more specific, it is very expensive to sell and/or distribute storage media in which the large capacity data is stored because recovering the storage media is difficult as compared with the cases of renting them (assignment with a deadline).

The third problem arises because large capacity media must be sold by way of an actual distribution channel. For instance, a still popular sales method of delivering an animation medium to a predetermined retailer and collecting a price from a purchaser requires a lot of labor and costs. While comprehensive efficiency of this sales method is better than said cases of distributing and/or selling the large capacity data such as the animation data by using the aforementioned network, it is extremely inefficient if compared to a distribution method via a network of small-scale data such as the above music data.

On the other hand, the first conventional technology disclosed in Japanese Patent Publication No. HEI 03-3290 discloses an image reproduction system constituted so that an image reproduction device has mode switches for respective mode functions, and a recording medium with an inserted key code corresponding to one of the modes of the above mode switches is provided so as to operate the image reproduction device only in the case where, on setting the recording medium on the above image reproduction device, the mode function of the above mode switch corresponds to the key code of the recording medium.

As for this first conventional technology, however, it is just that the image reproduction device operates only in the case where the key code of the recording medium corresponds to the mode function of the above mode switch, and as the applicant who proposed the first conventional technology points out, it does not show a countermeasure against the above-mentioned problem of unauthorized copies even though it can be used in order not to show children an educationally undesirable VTR, for instance. In addition, it does not indicate any countermeasure against the above second and third problems.

The second conventional technology disclosed in Japanese Patent Application Laid Open No. HEI 08-235759 discloses a disk reproducing device for reproducing an image program recorded on a disk on which an image display prohibition process is performed by correspondence of a lock code, having a power switch for turning on and off the power of the device proper, and a means for storing an image display state and a reproduced position address when the above described power switch is turned off, a checking means for checking a previous image display state from the above described means for storing when the above described power switch is turned on, and means for maintaining an image display prohibition state in the case where, as a result of the check, it is verified that the image display prohibition was cancelled to display images last time due to correspondence of the lock code.

However, this second conventional technology is a technology for a problem that, in a parental process technology for rendering a part or all of a video tape, a video disk and so on irreproducible without inputting a specific key code, a player having a memory play function for, if switched off and then switched on, starting reproduction from a scene reproduced when switched off last time has the memory play function also performed to the video disk having undergone the parental process, and so it is not a technology for solving the problems described above.

The third conventional technology disclosed in Japanese Patent Application Laid-Open No. HEI 10-334048 discloses a method of sending predetermined chargeable information on a WWW server to a user side in response to a request from a personal computer on the above user side on which a WWW browser of the Internet is mounted, the above method having: a first password sending stage for inputting a first password on the above WWW browser from the personal computer on the above user side and sending the inputted first password to the above WWW server; a second password returning stage for the above WWW server to issue a second password according to the above first password and return the above second password to the user browsing the above WWW browser; a password notifying stage for the above user to dial a number of a center device of a videotex communication network displayed on the above WWW browser and notify the above center device of the above first password and the second password acquired by way of the above Internet and also notify the above WWW server or a server different from the above WWW server and having a function of governing an accounting check of the WWW server of the above first password and the second password received by the above center device; a password checking stage for the above WWW server or the above different server to check the above first password and the second password received from the above user via the above center device against the above first password received from the above user via the above Internet and the above second password issued by the above WWW server; and a chargeable information sending stage for sending the above predetermined chargeable information from the above WWW server to the personal computer on the above user side in the case where the check results in the above password checking stage correspond.

However, this third conventional technology is a technology for handling the chargeable information that is difficult to handle on the WWW server by using the videotex communication network, and so it is not a technology for solving the problems described above.

The fourth conventional technology disclosed in Japanese Patent Application Laid-Open No. HEI 11-225324 discloses a technology related to a reproduction system for reproducing AV information recorded on a storage medium and outputting it on a display device, the above system having: a means for storing resource use information for, to use related information related to predetermined stream information included in the above described AV information, connecting to a resource having said related information, the above resource use information having a plurality of definitions of the same related information based on predetermined system attribute information; and control means for, when reproducing the above described AV information, selecting the above described resource use information determined based on the above described system attribute information to process the above described related information acquired from the resource and display it on the screen of the above described display device.

However, this fourth conventional technology is a technology for, in a system for reproducing the AV information from a storage medium such as the DVD, acquiring related information related to predetermined stream information by using resources of a computer network in addition to ordinary reproduction of a title, and so it is not a technology for solving the problems described above.

SUMMARY OF THE INVENTION

The present invention has been implemented in consideration of the above problems, and its object is to provide an animation data sales mediation method, an animation data sales mediation system, an animation data sales mediation server and a user terminal capable of providing large capacity data such as animation data by a large capacity storage medium in advance, rendering the time required for transfer of the data via the network extremely short by passing the key code for viewing the animation data via the network, rendering the labor and costs required for sales of the animation data extremely low, and providing the latest unauthorized copy prevention technology to the animation data.

Another object of the present invention is to provide an animation data sales method, an animation data sales system, an animation data sales server and a user terminal capable of providing large capacity data such as animation data by a large capacity storage medium in advance, rendering the time required for transfer of the data extremely short by passing the key code for viewing the animation data via the network, rendering the labor and costs required for sales of the animation data extremely low, and providing the latest unauthorized copy prevention technology to the animation data.

A further object of the present invention is to provide a storage medium recording an animation data purchase program for purchasing large capacity data such as animation data in this manner.

In order to attain these objects, the first aspect of the present invention provides a large capacity data sales system having a user terminal and a large capacity data sales server, the user terminal comprising: means for sending to the large capacity data sales server an online access code unique to large capacity data stored in a large capacity storage medium by including it in a registration request signal; means for encrypting and storing a key code included in a registration confirmation signal received from the large capacity data sales server; and means for reproducing the large capacity data by using the key code, and the large capacity data sales server comprising: means for storing information on the key code corresponding to the online access code one to one; and means for, in the case where the registration request signal has a registration confirmation signal sending requirement, acquiring the key code corresponding to the online access code from the means for storing and sending the key code to the user terminal by including it in the registration confirmation signal.

In accordance with the second aspect of the present invention, in the large capacity data sales system according to the first aspect of the present invention, the large capacity data sales server further comprises means for determining the number of the user terminals for storing the key code corresponding to the online access code one to one respectively.

In accordance with the third aspect of the present invention, in the large capacity data sales system according to the second aspect of the present invention, the large capacity data sales server sets conditions for the registration confirmation signal sending requirement, including a condition that information on the key code corresponding to the online access code one to one is stored in the means for storing and a condition that the number of the user terminals for storing the key code corresponding to the online access code one to one is smaller than a predetermined number.

In accordance with the fourth aspect of the present invention, in the large capacity data sales system according to the first aspect of the present invention, the registration request signal further includes user identification information, and the large capacity data sales server further has storage means for user information, and sets a condition, for the registration confirmation signal sending requirement, that the user identification information corresponds to the user information.

In accordance with the fifth aspect of the present invention, in the large capacity data sales system according to the first aspect of the present invention, the large capacity data sales server sets a condition, for the registration confirmation signal sending requirement, that a usage charge for the large capacity data is paid.

In accordance with the sixth aspect of the present invention, in the large capacity data sales system according to the first aspect of the present invention, the user terminal further comprises: means for sending to the large capacity data sales server a deregistration request signal for requesting erasure of the key code in the user terminal; and means for, in the case of receiving the deregistration confirmation signal from the large capacity data sales server, erasing the key code in the user terminal, and the large capacity data sales server further comprises means for, in the case where the deregistration request signal has a deregistration confirmation signal sending requirement, sending the deregistration confirmation signal to the user terminal.

In accordance with the seventh aspect of the present invention, there is provided a user terminal comprising: means for sending to the large capacity data sales server an online access code unique to large capacity data stored in a large capacity storage medium by including it in a registration request signal; means for encrypting and storing a key code included in a registration confirmation signal received from the large capacity data sales server; and means for reproducing the large capacity data by using the key code.

In accordance with the eighth aspect of the present invention, the user terminal according to the seventh aspect of the present invention comprises: means for sending to the large capacity data sales server a deregistration request signal including a request for erasure of the key code in the user terminal; and means for, in the case of receiving a deregistration confirmation signal from the large capacity data sales server, erasing the key code.

In accordance with the ninth aspect of the present invention, there is provided a large capacity data sales server, comprising: means for storing information on a key code corresponding to an online access code one to one; means for, in the case where a registration request signal received from a user terminal has a registration confirmation signal sending requirement, acquiring the key code corresponding to the online access code one to one from the means for storing and sending a registration confirmation signal including the key code to the user terminal.

In accordance with the tenth aspect of the present invention, the large capacity data sales server according to the ninth aspect of the present invention, comprises: means for determining the number of the user terminals for storing the key code corresponding to the online access code one to one respectively; and conditions for the registration confirmation signal sending requirement including a condition that information on the key code corresponding to the online access code one to one is stored in the means for storing and a condition that the number of the user terminals for storing the key code corresponding to the online access code one to one is smaller than a predetermined number.

In accordance with the eleventh aspect of the present invention, in the large capacity data sales server according to the tenth aspect of the present invention, the registration request signal further includes user identification information, and the server further has storage means for user information, and sets a condition, for the registration confirmation signal sending requirement, that the user identification information corresponds to the user information.

In accordance with the twelfth aspect of the present invention, the large capacity data sales server according to the ninth aspect of the present invention is characterized by setting a condition, for the registration confirmation signal sending requirement, that a usage charge for the large capacity data is paid.

In accordance with the thirteenth aspect of the present invention, the large capacity data sales server according to the ninth aspect of the present invention is characterized by further comprising means for, in the case where a deregistration request signal has a deregistration confirmation signal sending requirement, sending a deregistration confirmation signal to the user terminal having sent the deregistration request signal.

In accordance with the fourteenth aspect of the present invention, there is provided a large capacity data sales method comprising the steps of: having a user terminal extract from a large capacity storage medium an online access code corresponding to large capacity data one to one and send the online access code to a large capacity data sales server by including it in a registration request signal; in the case where the registration request signal has a registration confirmation signal sending requirement, having the large capacity data sales server send to the user terminal a registration confirmation signal including a key code corresponding to the online access code one to one; having the user terminal encrypt and store the key code; and having the user terminal reproduce the large capacity data by using the key code.

In accordance with the fifteenth aspect of the present invention, the large capacity data sales method according to the fourteenth aspect of the present invention further comprises the step of: having the large capacity data sales server determine for each online access code the number of the user terminals for storing the key code corresponding to the online access code one to one; the conditions for the registration request signal to have the registration confirmation signal sending requirement including a condition that the large capacity data sales server can acquire information on the key code corresponding to the online access code one to one and a condition that the number of the user terminals for storing the key code is smaller than a predetermined number.

In accordance with the sixteenth aspect of the present invention, in the large capacity data sales method according to the fourteenth aspect of the present invention, the registration request signal further includes user identification information, and the large capacity data sales server further stores user information, and sets a condition, for the registration confirmation signal sending requirement, that the user identification information corresponds to the user information.

In accordance with the seventeenth aspect of the present invention, the large capacity data sales method according to the fourteenth aspect of the present invention is characterized by setting a condition, for the registration confirmation signal sending requirement, that a usage charge for the large capacity data is paid.

In accordance with the eighteenth aspect of the present invention, the large capacity data sales method according to the fourteenth aspect of the present invention comprises the steps of: having the user terminal send to the large capacity data sales server a deregistration request signal including a request for erasure of the key code in the user terminal; in the case where the deregistration request signal has a deregistration confirmation signal sending requirement, having the large capacity data sales server send the deregistration confirmation signal to the user terminal; and in the case of receiving the deregistration confirmation signal from the large capacity data sales server, having the user terminal erase the key code.

In accordance with the nineteenth aspect of the present invention, there is provided a large capacity data sales mediation system having a user terminal, a large capacity data sales mediation server and a large capacity data sales server, the user terminal comprising: means for sending to the large capacity data sales server a registration request signal including user identification information and an online access code unique to large capacity data stored in a large capacity storage medium; means for encrypting and storing a key code included in a registration confirmation signal received from the large capacity data sales server; and means for reproducing the large capacity data by using the key code, the large capacity data sales server comprising: means for storing information on the key code corresponding to the online access code one to one; means for sending the user identification information to the large capacity data sales mediation server; and means for, in the case where the registration request signal inputted from the user terminal has a registration confirmation signal sending requirement, acquiring the key code corresponding to the online access code from the means for storing and sending the key code to the user terminal by including it in the registration confirmation signal, and the large capacity data sales mediation server comprising: storage means for user information; and means for determining whether or not the user information corresponding to the user identification information is stored in the storage means and sending the determination results to the large capacity data sales mediation server, and the registration confirmation signal sending requirement setting a condition that it receives from the large capacity data sales mediation server a notice to the effect that the user information corresponding to the user identification information is stored in the storage means.

In accordance with the twentieth aspect of the present invention, in the large capacity data sales mediation system according to the nineteenth aspect of the present invention, the large capacity data sales server further comprises means for determining the number of the user terminals for storing the key code corresponding to the online access code one to one respectively.

In accordance with the twenty first aspect of the present invention, in the large capacity data sales mediation system according to the twentieth aspect of the present invention, the large capacity data sales server further has conditions for the registration confirmation signal sending requirement including a condition that information on the key code corresponding to the online access code one to one is stored in the means for storing, and a condition that the number of the user terminals for storing the key code corresponding to the online access code one to one is smaller than a predetermined number.

In accordance with the twenty second aspect of the present invention, in the large capacity data sales mediation system according to the nineteenth aspect of the present invention, the large capacity data sales server sets a condition, for the registration confirmation signal sending requirement, that a usage charge for the large capacity data is paid.

In accordance with the twenty third aspect of the present invention, in the large capacity data sales mediation system according to the nineteenth aspect of the present invention, the user terminal further comprises: means for sending to the large capacity data sales server a deregistration request signal for requesting erasure of the key code in the user terminal; and means for, in the case of receiving the deregistration confirmation signal from the large capacity data sales server, erasing the key code in the user terminal, and the large capacity data sales server further comprises means for, in the case where the deregistration request signal has a deregistration confirmation signal sending requirement, sending the deregistration confirmation signal to the user terminal.

In accordance with the twenty fourth aspect of the present invention, there is provided a large capacity data sales server, comprising: means for storing information on a key code corresponding to an online access code one to one; means for having a large capacity data sales mediation server perform user authentication based on user identification information included in a registration request signal inputted from a user terminal; and means for, in the case where the registration request signal has a registration confirmation signal sending requirement, acquiring the key code corresponding to the online access code from the means for storing and sending the key code to the user terminal by including it in a registration confirmation signal, the registration confirmation signal sending requirement including a condition that the user is identified by the user authentication.

In accordance with the twenty fifth aspect of the present invention, the large capacity data sales server according to the twenty fourth aspect of the present invention further comprises: means for determining the number of the user terminals for storing the key code corresponding to the online access code one to one respectively; and conditions, for the registration confirmation signal sending requirement, that is, a condition that information on the key code corresponding to the online access code one to one is stored in the means for storing and a condition that the number of the user terminals for storing the key code corresponding to the online access code one to one is smaller than a predetermined number.

In accordance with the twenty sixth aspect of the present invention, the large capacity data sales server according to the twenty fourth aspect of the present invention is characterized by setting a condition, for the registration confirmation signal sending requirement, that a usage charge for the large capacity data is paid.

In accordance with the twenty seventh aspect of the present invention, the large capacity data sales server according to claim the twenty fourth aspect of the present invention further comprises means for, in the case where a received deregistration request signal has a deregistration confirmation signal sending requirement, sending a deregistration confirmation signal to the user terminal.

In accordance with the twenty eighth aspect of the present invention, there is provided a large capacity data sales mediation server comprising: storage means for user information; and means for determining whether or not the user information corresponding to user identification information inputted from a large capacity data sales server is stored in the storage means and sending the determination results to the large capacity data sales mediation server.

In accordance with the twenty ninth aspect of the present invention, there is provided a large capacity data sales mediation method comprising the steps of: having a user terminal extract from a large capacity storage medium an online access code corresponding to large capacity data one to one and send a registration request signal including user identification information and the online access code to a large capacity data sales server; having the large capacity data sales server send the user identification information to the large capacity data sales mediation server; having the large capacity data sales mediation server perform user authentication based on the user identification information and send authentication results to the large capacity data sales server; in the case where the registration request signal has a registration confirmation signal sending requirement, having the large capacity data sales server send to the user terminal a registration confirmation signal including the key code corresponding to the online access code one to one; having the user terminal encrypt and store the key code; and having the user terminal reproduce the large capacity data by using the key code, wherein the registration confirmation signal sending requirement has a condition that the user is identified by the authentication results.

In accordance with the thirtieth aspect of the present invention, the large capacity data sales mediation method according to the twenty ninth aspect of the present invention further comprises the step of: having the large capacity data sales server determine for each online access code the number of the user terminals for storing the key code corresponding to the online access code one to one; the conditions for the registration request signal to meet the registration confirmation signal sending requirement including a condition that the large capacity data sales server can acquire information on the key code corresponding to the online access code one to one and a condition that the number of the user terminals for storing the key code is smaller than a predetermined number.

In accordance with the thirty first aspect of the present invention, the large capacity data sales mediation method according to the twenty ninth aspect of the present invention is characterized by setting a condition, for the registration confirmation signal sending requirement, that a usage charge for the large capacity data is paid.

In accordance with the thirty second aspect of the present invention, the large capacity data sales mediation method according to the thirty first aspect of the present invention further comprises the steps of: having a manager of the large capacity data sales mediation server pay the usage charge to a manager of the large capacity data sales server; and having the manager of the large capacity data sales mediation server collect the usage charge from the user of the large capacity data.

In accordance with the thirty third aspect of the present invention, the large capacity data sales mediation method according to the twenty ninth aspect of the present invention further comprises the steps of: having the user terminal send to the large capacity data sales server a deregistration request signal including a request for erasure of the key code in the user terminal; in the case where the deregistration request signal has a deregistration confirmation signal sending requirement, having the large capacity data sales server send the deregistration confirmation signal to the user terminal; and in the case of receiving the deregistration confirmation signal from the large capacity data sales server, having the user terminal erase the key code.

In accordance with the thirty fourth aspect of the present invention, there is provided a large capacity data sales mediation system having a user terminal, a large capacity data sales mediation server and a large capacity data sales server, the user terminal comprising: means for sending to the large capacity data sales mediation server a registration request signal including user identification information and an online access code unique to large capacity data stored in a large capacity storage medium; means for encrypting and storing a key code included in a registration confirmation signal received from the large capacity data sales mediation server; and means for reproducing large capacity data by using the key code, and the large capacity data sales mediation server comprising: storage means for user information; means for determining whether or not user information corresponding to the user identification information is stored in the storage means; means for sending an online access code included in the registration request signal to the large capacity data sales server; means for, in the case where the registration request signal inputted from the user terminal has a registration confirmation signal sending requirement, sending to the user terminal the registration confirmation signal including the key code inputted from the large capacity data sales server; and means for determining the number of the user terminals for storing the key code corresponding to the online access code one to one, and the large capacity data sales server comprising: means for storing information on the key code corresponding to the online access code one to one; and means for acquiring the inputted key code corresponding to the online access code from the means for storing and sending the key code to the large capacity data sales mediation server, and the registration confirmation signal sending requirement including a condition that user information corresponding to the user information included in the registration request signal is stored in the storage means, a condition that the information on the key code corresponding to the online access code one to one is stored in the means for storing, and a condition that the number of the user terminals for storing the key code corresponding to the online access code one to one is smaller than a predetermined number.

In accordance with the thirty fifth aspect of the present invention, in the large capacity data sales mediation system according to the thirty fourth aspect of the present invention, the large capacity data sales mediation server sets a condition, for the registration confirmation signal sending requirement, that a usage charge for the large capacity data is paid.

In accordance with the thirty sixth aspect of the present invention, in the large capacity data sales mediation system according to thirty fourth aspect of the present invention, the user terminal further comprises: means for sending to the large capacity data sales mediation server a deregistration request signal for requesting erasure of the key code in the user terminal; and means for, in the case of receiving a deregistration confirmation signal from the large capacity data sales mediation server, erasing the key code in the user terminal, and the large capacity data sales mediation server further has means for, in the case where the deregistration request signal received has a deregistration confirmation signal sending requirement, sending the deregistration confirmation signal to the user terminal.

In accordance with the thirty seventh aspect of the present invention, there is provided a user terminal comprising: means for sending to a large capacity data sales mediation server a registration request signal including user identification information and an online access code unique to large capacity data stored in a large capacity storage medium; means for encrypting and storing a key code included in a registration confirmation signal received from the large capacity data sales mediation server; and means for reproducing large capacity data by using the key code.

In accordance with the thirty eighth aspect of the present invention, the user terminal according to the thirty seventh aspect of the present invention further comprises: means for sending to the large capacity data sales mediation server a deregistration request signal requesting erasure of the key code in the user terminal; and means for, in the case of receiving a deregistration confirmation signal from the large capacity data sales mediation server, erasing the key code in the user terminal.

In accordance with the thirty ninth aspect of the present invention, there is provided a large capacity data sales server comprising: means for storing information on a key code corresponding to an online access code one to one; means for acquiring from the means for storing the key code corresponding to the online access code inputted from the large capacity data sales mediation server and sending the key code to the large capacity data sales mediation server.

In accordance with the fortieth aspect of the present invention, there is provided a large capacity data sales mediation server comprising: storage means for user information; means for determining whether or not the user information corresponding to user identification information included in a registration request signal is stored in the storage means; means for sending an online access code included in the registration request signal to the large capacity data sales server; means for, in the case where the registration request signal has a registration confirmation signal sending requirement, sending to the user terminal the registration confirmation signal including a key code inputted from the large capacity data sales server; and means for determining the number of the user terminals for storing the key code corresponding to the online access code one to one respectively, the registration confirmation signal sending requirement setting a condition that user information corresponding to the user identification information is stored in the storage means, a condition that the information on the key code corresponding to the online access code one to one is stored in the means for storing, and a condition that the number of the user terminals for storing the key code corresponding to the online access code one to one is smaller than a predetermined number.

In accordance with the forty first aspect of the present invention, in the large capacity data sales mediation server according to the fortieth aspect of the present invention, the registration confirmation signal sending requirement includes a condition that a usage charge for the large capacity data is paid.

In accordance with the forty second aspect of the present invention, the large capacity data sales mediation server according to the fortieth aspect of the present invention comprises means for sending a deregistration confirmation signal to the user terminal in the case where a deregistration request signal received from the user terminal meets a deregistration confirmation signal sending requirement.

In accordance with the forty third aspect of the present invention, there is provided a large capacity data sales mediation method comprising the steps of: having a user terminal extract from a large capacity storage medium an online access code corresponding to large capacity data one to one and send a registration request signal including user identification information and the online access code to a large capacity data sales mediation server; having the large capacity data sales mediation server send the online access code included in the registration request signal to the large capacity data sales server; having the large capacity data sales server send a key code corresponding to the inputted online access code one to one to the large capacity data sales mediation server; in the case where the registration request signal has a registration confirmation signal sending requirement, having the large capacity data sales mediation server send to the user terminal a registration confirmation signal including the key code inputted from the large capacity data sales server; having the user terminal encrypt and store the key code; and having the user terminal reproduce the large capacity data by using the key code, wherein the registration confirmation signal sending requirement includes a condition that user information corresponding to the user identification information is stored in the large capacity data sales mediation server, a condition that the information on the key code corresponding to the online access code one to one is stored in the large capacity data sales server, and a condition that the number of the user terminals for storing the key code corresponding to the online access code one to one is smaller than a predetermined number.

In accordance with the forty fourth aspect of the present invention, in the large capacity data sales mediation method according to the forty third aspect of the present invention, the registration confirmation signal sending requirement includes a condition that a usage charge for the large capacity data is paid.

In accordance with the forty fifth aspect of the present invention, the large capacity data sales mediation method according to the forty third aspect of the present invention further comprises the steps of: having the user terminal send to the large capacity data sales mediation server a deregistration request signal including a request for erasure of the key code in the user terminal; in the case where the received deregistration request signal has a deregistration confirmation signal sending requirement, having the large capacity data sales mediation server send the deregistration confirmation signal to the user terminal; and in the case of receiving the deregistration confirmation signal from the large capacity data sales mediation server, having the user terminal erase the key code.

In accordance with the forty sixth aspect of the present invention, there is provided a large capacity data sales mediation system having a user terminal, a large capacity data sales mediation server and a large capacity data sales server, the user terminal comprising: means for sending to the large capacity data sales mediation server a registration request signal including user identification information and an online access code unique to large capacity data stored in a large capacity storage medium; means for encrypting and storing a key code included in a registration confirmation signal received from the large capacity data sales mediation server; and means for using large capacity data by using the key code, the large capacity data sales server comprising: first means for storing information on the key code corresponding to the online access code one to one; and means for sending information on the key code to the large capacity data sales mediation server in predetermined timing, and the large capacity data sales mediation server comprising: storage means for user information; second means for storing information on the key code corresponding to the online access code one to one; means for determining the number of the user terminals for storing the key code corresponding to the online access code one to one respectively; means for acquiring the information on the key code from the large capacity data sales server and storing it in the second means for storing; means for determining whether or not user information corresponding to the user identification information is stored in the storage means; and means for, in the case where the registration request signal has a registration confirmation signal sending requirement, acquiring the key code corresponding to the registration request signal one to one from the second means for storing and sending to the user terminal the registration confirmation signal including the key code, wherein the registration confirmation signal sending requirement includes a condition that user information corresponding to the user identification information is stored in the storage means, a condition that the information on the key code corresponding to the online access code one to one is stored in either the first or second means for storing, and a condition that the number of the user terminals for storing the key code corresponding to the online access code one to one is smaller than a predetermined number.

In accordance with the forty seventh aspect of the present invention, in the large capacity data sales mediation system according to the forty sixth aspect of the present invention, the predetermined timing is timing to be given a notice from the large capacity data sales mediation server that no key code corresponding to the online access code is stored in the second means for storing.

In accordance with the forty eighth aspect of the present invention, in the large capacity data sales mediation system according to the forty sixth aspect of the present invention, the large capacity data sales mediation server sets a condition, for the registration confirmation signal sending requirement, that a usage charge for the large capacity data is paid.

In accordance with the forty ninth aspect of the present invention, in the large capacity data sales mediation system according to the forty sixth aspect of the present invention, the user terminal further comprises: means for sending to the large capacity data sales mediation server a deregistration request signal for requesting erasure of the key code in the user terminal; and means for, in the case of receiving a deregistration confirmation signal from the large capacity data sales mediation server, erasing the key code in the user terminal, and the large capacity data sales mediation server further comprises means for, in the case where the received deregistration request signal has a deregistration confirmation signal sending requirement, sending the deregistration confirmation signal to the user terminal.

In accordance with the fiftieth aspect of the present invention, there is provided a large capacity data sales server comprising: means for storing information on a key code corresponding to an online access code one to one; and means for sending information on the key code to a large capacity data sales mediation server in predetermined timing.

In accordance with the fifty first aspect of the present invention, in the large capacity data sales server according to the fiftieth aspect of the present invention, the predetermined timing is the timing to be given a notice that the large capacity data sales mediation server detects no key signal corresponding to the online access signal stored in the server.

In accordance with the fifty second aspect of the present invention, there is provided a large capacity data sales mediation server comprising: storage means for user information; means for storing information on a key code corresponding to an online access code one to one; means for acquiring the information on the key code from the large capacity data sales server and storing it in the means for storing; means for determining whether or not user information corresponding to user identification information included in a registration request signal inputted from the user terminal is stored in the storage means; means for, in the case where the registration request signal has a registration confirmation signal sending requirement, acquiring the key code corresponding to the registration request signal one to one from the means for storing and sending to the user terminal the registration confirmation signal including the key code; means for determining the number of the user terminals for storing the key code corresponding to the online access code one to one respectively, wherein the registration confirmation signal sending requirement includes a condition that user information corresponding to the user identification information is stored in the storage means, a condition that the information on the key code corresponding to the online access code one to one is stored in the means for storing, and a condition that the number of the user terminals for storing the key code corresponding to the online access code one to one is smaller than a predetermined number.

In accordance with the fifty third aspect of the present invention, in the large capacity data sales mediation server according to the fifty second aspect of the present invention, the information on the key code is acquired from the large capacity data sales server in the case of detecting no key code corresponding to the online access code included in the registration request signal stored in the means for storing.

In accordance with the fifty fourth aspect of the present invention, in the large capacity data sales mediation server according to the fifty second aspect of the present invention, the registration confirmation signal sending requirement includes a condition that a usage charge for the large capacity data is paid.

In accordance with the fifty fifth aspect of the present invention, the large capacity data sales mediation server according to the fifty second aspect of the present invention is characterized by having means for, in the case where the received deregistration request signal has a deregistration confirmation signal sending requirement, sending a deregistration confirmation signal to the user terminal.

In accordance with the fifty sixth aspect of the present invention, there is provided a large capacity data sales mediation method comprising the steps of: having a large capacity data sales server send to a large capacity data sales mediation server information on a key code corresponding to an online access code one to one; having the large capacity data sales mediation server store the information on the key code; having a user terminal extract the online access code corresponding one to one to large capacity data stored in a large capacity storage medium storing the large capacity data and send a registration request signal including user identification information and the online access code to the large capacity data sales mediation server; in the case where the registration request signal has a registration confirmation signal sending requirement, having the large capacity data sales mediation server send to the user terminal a registration confirmation signal including the key code corresponding to the online access signal included in the registration request signal; having the user terminal encrypt and store the key code; and having the user terminal reproduce the large capacity data by using the key code, the registration confirmation signal sending requirement including a condition that user information corresponding to the user identification information is stored in the large capacity data sales mediation server, a condition that the information on the key code corresponding to the online access code one to one is stored in either the large capacity data sales mediation server or the large capacity data sales server, and a condition that the number of the user terminals for storing the key code corresponding to the online access code one to one is smaller than a predetermined number.

In accordance with the fifty seventh aspect of the present invention, in the large capacity data sales mediation method according to the fifty sixth aspect of the present invention, the registration confirmation signal sending requirement includes a condition that a usage charge for the large capacity data is paid.

In accordance with the fifty eighth aspect of the present invention, the large capacity data sales mediation method according to the fifty sixth aspect of the present invention further comprises the steps of: in the case where no information on the key code corresponding to the online access code is stored, having the large capacity data sales mediation server send the online access code to the large capacity data sales server; and having the large capacity data sales server send the information on the key code corresponding to the online access code to the large capacity data sales mediation server.

In accordance with the fifty ninth aspect of the present invention, the large capacity data sales mediation method according to the fifty sixth aspect of the present invention further comprising the steps of: having the user terminal send to the large capacity data sales mediation server a deregistration request signal including a request for erasure of the key code in the user terminal; in the case where the received deregistration request signal has a deregistration confirmation signal sending requirement, having the large capacity data sales mediation server send the deregistration confirmation signal to the user terminal; and in the case of receiving the deregistration confirmation signal from the large capacity data sales mediation server, having the user terminal erase the key code.

In accordance with the sixtieth aspect of the present invention, there is provided a computer-readable recording medium recording a program for implementing the steps of: sending to a large capacity data sales server a registration request signal including an online access code unique to large capacity data; extracting a key code in a registration confirmation signal inputted from the large capacity data sales server to encrypt and store it; and decoding the key code and using the large capacity data by using the key code.

In accordance with the sixty first aspect of the present invention, the computer-readable recording medium according to the sixtieth aspect of the present invention records a program for further implementing the steps of: sending to the large capacity data sales server a deregistration request signal for requesting deregistration; and in the case of receiving a deregistration confirmation signal from the large capacity data sales server, erasing the stored key code.

In accordance with the sixty second aspect of the present invention, there is provided a computer-readable recording medium recording a program for implementing the steps of: sending to a large capacity data sales mediation server a registration request signal including an online access code unique to large capacity data; extracting a key code in a registration confirmation signal inputted from the large capacity data sales mediation server to encrypt and store it; and decoding the key code and using the large capacity data by using the key code.

In accordance with the sixty third aspect of the present invention, the computer-readable recording medium according to the sixty second aspect of the present invention, records a program for further implementing the steps of: sending to the large capacity data sales mediation server a deregistration request signal for requesting deregistration; and in the case of receiving the deregistration confirmation signal from the large capacity data sales mediation server, erasing the stored key code.

BRIEF DESCRIPTION OF THE DRAWINGS

The objects and features of the present invention will become more apparent from the consideration of the following detailed description taken in conjunction with the accompanying drawings, in which:

FIG. 1 is a first diagram for describing configuration of a large capacity data sales mediation system and a flow of data and so on;

FIG. 2 is a diagram for describing configuration of a large capacity data sales system and the flow of data and so on;

FIG. 5 is a diagram representing types of signals;

FIG. 21 is a second diagram for describing the configuration of the large capacity data sales mediation system and the flow of data and so on;

FIG. 26 is an eighth sequence diagram for describing the flow of processing in the large capacity data sales mediation system;

FIG. 29 is a third diagram for describing the configuration of the large capacity data sales mediation system and the flow of data (signals) and so on;

DETAILED DESCRIPTION OF THE PREFERRED EMBODIMENTS

Hereafter, an embodiment of the present invention will be described in detail referring to attached drawings.

The following description is one embodiment of the present invention, and the present invention should not be limited by such description.

While the following will be described by using animation data that is one form of large capacity data, the large capacity data is not limited to the animation data but it may be any data having capacity of which distribution by a data distribution method using a network is not realistic in terms of download time, communication costs and so on, such as map data, programs, music data and dictionary data.

In addition, while the following will be described by using an animation medium that is one of large capacity storage media, the large capacity storage media are not limited to it and they include a DVD-ROM, a CD-ROM and so on capable of storing the above described large capacity data, such as animation data, map data, programs, music data and dictionary data. Such large capacity data does not need to be stored in one large capacity storage medium but may be stored in a plurality of media.

First, an animation data sales system, which is a large capacity data sales system will be described, and an animation data sales server, which is a large capacity data sales server and a user terminal will be described.

Large Capacity Data Sales System

Figure 2:
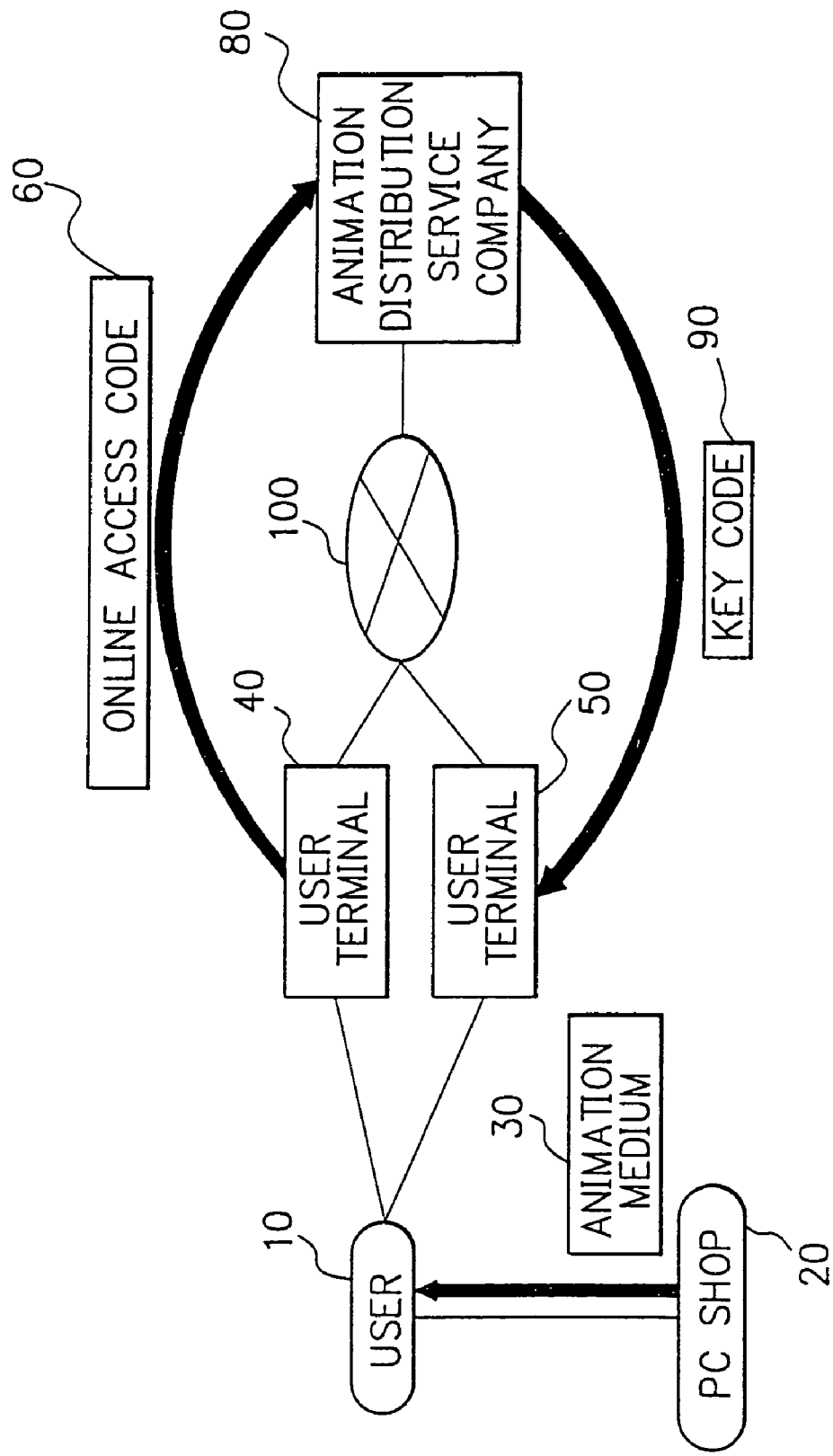

The animation data sales system of the present invention has the user terminal and the animation data sales server. FIG. 2 shows an example of this. In this drawing, the server of an animation distribution service company 80 falls under the animation data sales server.

<Animation Data Sales System>

As shown in FIG. 2, the animation data sales system has user terminals 40 and 50 that are the first user terminals and the server of the animation distribution service company 80 having the first animation data sales server.

Hereafter, the animation data sales system will be described, and the first user terminals and the first animation data sales server will also be described.

FIG. 2 is a diagram showing a flow of data (signal) and an animation medium in the animation data sales system.

As shown in FIG. 2, a user 10 acquires from a PC (personal computer) shop 20 and so on an animation medium 30 in which the animation data is stored. Moreover, the animation medium 30 may be acquired not only from the PC shop 20 but from an arbitrary place. As a charge may be collected as mentioned later, it is not necessary to collect the charge (a consideration for the animation medium (animation data)) when distributing the animation medium 30. Accordingly, the animation medium 30 may be distributed anywhere such as the PC shop 20 as shown in FIG. 2, or at a retailer, a station and so on otherwise.

The animation medium 30 includes at least the animation data and an online access code 60 for acquiring a key code 90. In addition, it may have a reproduction program for reproducing the animation data on the user terminals 40 and 50. Also, it may have transmission program for sending the online access code 60 to the animation distribution service company 80.

Moreover, the animation medium 30 (animation data) may be reproduced by the reproduction program not stored in the animation medium 30. For instance, it may be reproduced by the reproduction program stored in advance in the user terminals 40 and 50 or by an animation data reproducing device that may be included in the user terminals 40 and 50.

Moreover, any format can be used for the formats (compressed format, storage format and so on) of the animation data, the above program and so on.

To reproduce the animation data (animation medium), it requires at least the program or the device for reproducing the above described animation data and the key code 90 corresponding to the animation medium (animation data). To be more specific, the animation data cannot be reproduced in the case where there is no key code 90 unique to the animation medium (animation data).

Thus, the key code 90 is unique to each animation medium (animation data), and besides, only a predetermined number (preferably one) thereof is provided, and is encrypted by cryptography and stored in the user terminal 40.

Because of this, the animation medium (animation data) is not viewed by a plurality of user terminals under one license (key code 90). To be more specific, the animation data sales mediation system of the present invention prevents unauthorized copies by using key code technology, providing only a predetermined number (preferably one) of the key code 90 and using the cryptography.

Any technology may be used for the key code technology. To be more specific, either a technology in the public domain or the latest technology may be used for the key code technology.

As described above, the predetermined unauthorized copy prevention technology is mounted on the animation medium (animation data) and the animation data reproducing device (or the user terminals 40 and 50).

However, even if this unauthorized copy prevention technology is the latest technology at the stage of establishing specifications of the animation medium and so on, it gradually becomes inferior due to the daily progress in the technology, and so the possibility of cracking this unauthorized copy prevention technology becomes gradually high. For this reason, once the unauthorized copy prevention technology is decrypted and an unauthorized copy technology is invented, the unauthorized copy prevention technology for the animation medium becomes useless since the networks have come into wide use.

Accordingly, as mentioned above, it is possible to change the unauthorized copy prevention technology for each animation medium (animation data) by allowing any technology to be used as the key code technology and thus it becomes very difficult to make unauthorized copies (to decrypt and analyze the unauthorized copy prevention technology).

Furthermore, as the use of the newest key code technology allows the newest unauthorized copy prevention technology to be adopted in ever-advancing technological standards, in addition to the unauthorized copy prevention technology unique to the animation medium that becomes inferior to the ever-advancing technological standards, so that it becomes very difficult to make unauthorized copies.

The user 10 acquires the key code 90 required for reproducing this animation medium (animation data) from the server of the animation distribution service company 80 by using the user terminal 40. As a method of acquiring this, the online access code 60 stored in the animation medium 30 is sent to the server of the animation distribution service company 80 and the key code 90 corresponding to it is sent in return. The details will be described below.

Figure 3:
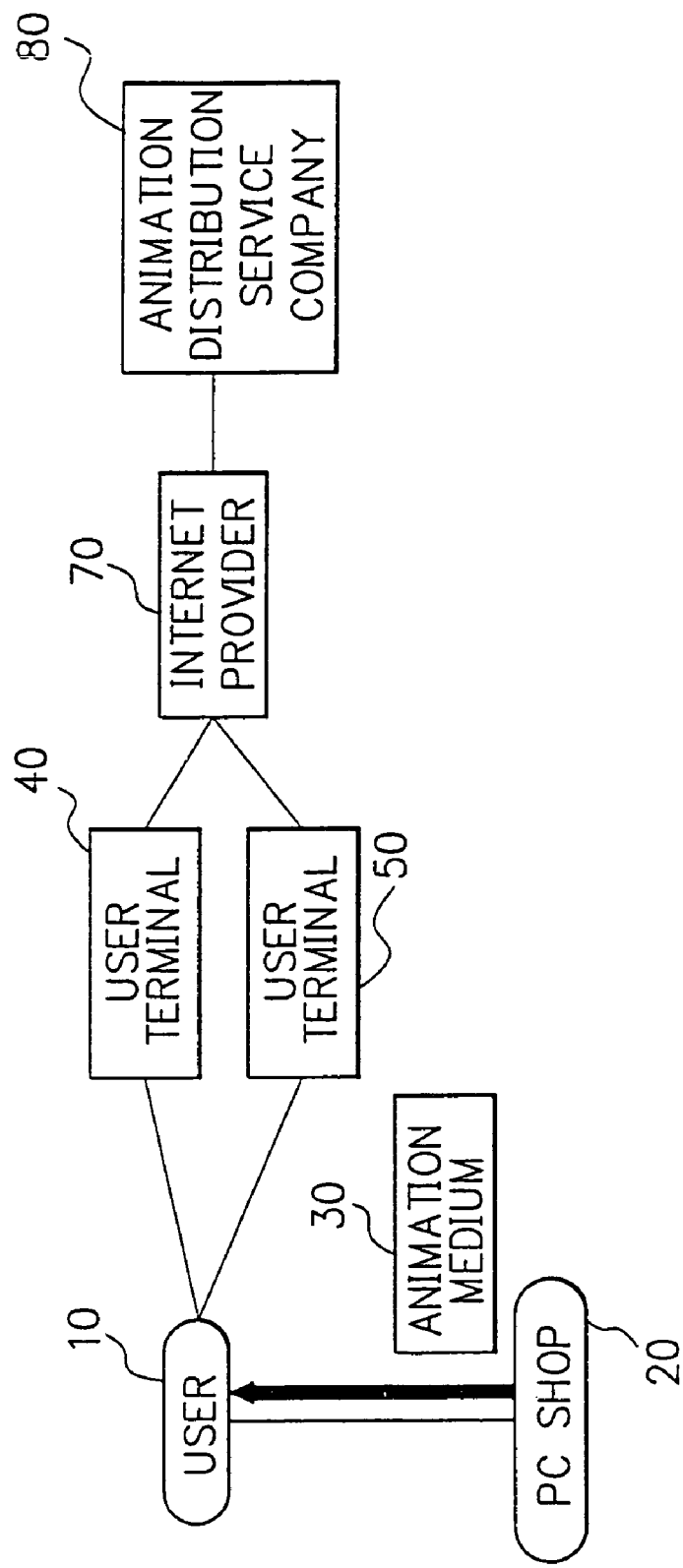
FIG. 3 is a block diagram for describing the large capacity data sales mediation system.

The user terminal 40 only has to send and receive data (signals) such as the online access code 60 and the key code 90 to and from the server of the animation distribution service company 80. To be more specific, the first user terminals and the first animation data sales server just have to be connected to an environment capable of data communication such as a network 100. Moreover, as shown in FIG. 3, the user terminal 40 can be connected to the network via an Internet provider 70.

The user 10 sends a registration request signal having at least the online access code 60 to the server of the animation distribution service company 80 by using the user terminal 40. User information can be sent in addition to the online access code 60 by this registration request signal. This user information can be any information by which the user can be identified, and in the case of collecting a charge for the animation medium (animation data), it can be any information for collecting a consideration (charge) of the animation data (animation medium) such as the user's name, address, telephone number and payment method of the charge.

Moreover, in the case where the number of the issued key code 90 is the above predetermined number, the user 10 can cancel the contract once and execute a view contract again to reproduce the animation data on a terminal other than the user terminal in which the key code 90 is stored. This will be described later.

The server of the animation distribution service company 80 first determines whether or not there is the predetermined key code 90 corresponding the online access code 60. Next, it performs a search as to whether the predetermined number of the key codes 90 have already been issued to the online access code 60.

The predetermined number of the key codes 90 are issued to one online access code 60. To be more specific, the number of the user terminals and animation reproducing devices capable of reproducing one animation medium (animation data) will be a limited number.

Thus, the key code 90 is no longer provided to the registration request signal sent from the animation medium (counterfeit) copied in an unauthorized manner, and it becomes possible to prevent reproduction of the animation data by the counterfeit. To be more specific, it will no longer be reproduced on one animation medium by an indefinite number of persons.

The number of the key codes 90 to be issued should preferably be 1 that allows the charge to be collected from each person (user terminal, animation reproducing device).

As it only issues the limited number of the key codes 90 (licenses), it is possible, in the case of billing the charge (consideration) for the animation medium (animation data), to bill and/or collect from each person (each user 10, each user terminal 40, 50) for the charge.

In other words, as the key code 90 unique to the animation medium (animation data) is only passed to the user 10 having sent the online access code 60 to the animation distribution service company 80, it becomes possible to collect the charge from the user 10 having viewed the animation data.

Hereafter, the case where only one key code 90 is provided (issued) to the online access code 60 will be taken as an example and described.

The key code 90 is only stored in the user terminal 40 having sent the registration request signal including the online access code 60. Accordingly, the animation medium (animation data) is only reproduced on the user terminal 40 (or the animation data reproducing device under management by the user terminal 40).

Thus, the user 10 enter into a contract with the animation distribution service company 80 to reproduce the animation medium 30 on the user terminal 40 (or the animation data reproducing device under management by the user terminal 40).

The user 10 cancels the above contract in the manner mentioned later in the case of reproducing the animation medium 30 on the user terminal 50 (or the animation data reproducing device under management by the user terminal 50).

Next, the user terminal 50 is used to send the online access code 60 to the server of the animation distribution service company 80 and have the key code 90 sent in return to the user terminal 50 to be stored therein. Thus, it becomes possible for the user 10 to reproduce the animation on the user terminal 50 (or the animation data reproducing device under management by the user terminal 50).

Moreover, in the case of changing the user terminal for reproducing the animation medium 30 in this manner, a charge collection method can be established arbitrarily, for instance, a charge collection method for not newly collecting the charge from the same user 10.

Any other user (not shown) cannot reproduce the animation medium 30 on a user terminal that is not shown. It is because the user cannot receive the key code 90 corresponding to the online access code 60 even if the online access code 60 is sent to the animation distribution service company 80, as described above. To be more specific, the server of the animation distribution service company 80 does not issue the key code 90 to this user (user terminal) since a key code 60 corresponding to the online access code 60 has already been sent (issued) to the user 10 (user terminal 40).

Accordingly, there will no longer be a situation where so-called secondhand goods appear on the market in a state uncontrollable by the animation distribution service company, that is, in a state where it is impossible to collect the charge for the animation medium (animation data) from another user. It is because, in order for the other user to reproduce the animation by using the animation medium 30, it is first necessary for the other user, after the user 10 cancelled the above contract as to be mentioned later, to have a contract with the animation distribution service company 80 in the above described manner.

Thus, it becomes possible for the animation distribution service company 80 to supply the animation medium 30 to the market without apprehension of the problem that marketing of one animation medium 30 may cause it to be reproduced by indefinite number of users (the problem of so-called secondhand goods).

In addition, the user 10 only has to pay the charge when viewing the animation data. Accordingly, it becomes possible to implement a charge system that is more elaborate than a conventional one.

Moreover, especially in the case of including the user information in the above registration request signal, it becomes possible for the animation distribution service company 80 to grasp the user 10 viewing the animation data, and so a fairly detailed market research can be conducted.

Furthermore, it becomes possible to effectively deal with the problem of thefts (stealing, shop lifting) that has been problematic in the conventional sales method of the animation media via retailers and so on by rendering the key code 90 essential to viewing the animation data.

Moreover, any method can be used as a method of sending the online access code 60 to the server of the animation distribution service company 80. For instance, it is also feasible to store in the animation medium 30 a program for sending the registration request signal including the online access code 60 to the animation distribution service company 80. In this case, it becomes possible for the user 10 to send the online access code 60 to the animation distribution service company 80 by starting the program from the user terminal 40. It is also feasible to send the online access code 60 to the animation distribution service company 80 by using a communication function of the user terminal 40.

The server of the animation distribution service company 80 stores the key code 90 corresponding to the online access code 60, and in the case where the predetermined number of the key codes 90 have not been issued to the online access code 60 yet, it sends the key code 90 to the user terminal 40 having sent the online access code 60.

In addition, it increases the number of the key codes 90 provided to the online access code 60 by one and stores this number.

Moreover, it is also feasible to store information on the user (user information) to whom the key code 90 was provided.

The user terminal 40 stores the key code 90. In this case, the key code 90 is encrypted by cryptography and stored. Any technology may be used for the cryptography, that is, either a technology in the public domain or the latest technology may be used.

Thus, the key code 90 is encrypted and stored, so that even if this key code 90 is duplicated onto another user terminal, the animation medium 30 can no longer be reproduced. Thus, it becomes possible to effectively prevent the animation medium 30 from being reproduced by a plurality of user terminals (or the animation data reproducing devices under management by the user terminals).

In addition, as any technology may be used for the cryptography, it becomes possible, for instance, to change this technology for each animation medium 30 and render unauthorized copying more difficult.

Furthermore, it becomes possible, by using the newest cryptography, to adopt the newest copy prevention technology from the viewpoint of the ever-advancing technological level and render unauthorized copying even more difficult.

When reproducing the animation medium 30, the user terminal 40 (or the animation data reproducing device under management by the user terminal 40) decodes and extracts the above encrypted key code 90 to reproduce the animation data by using the key code 90. In the case where there is no key code 90, the animation data (animation medium) cannot be reproduced.

As mentioned above, the user 10 can also cancel this contract. This contract is cancelled by deleting the key code 90 stored in the user terminal 40 and erasing the information about the key code 90 corresponding to the online access code 60 being provided to the user terminal 40 from this server. To be more specific, any method of canceling the contract may be used as far as it is a method of conducting such work.

For instance, it is also possible to cancel the contract as follows.

The user 10 sends the deregistration request signal from the user terminal 40 to the server of the animation distribution service company 80. This deregistration request signal includes at least the online access code 60 and the name of the user terminal in which the key code 90 is stored.

The server of the animation distribution service company 80 determines whether or not the online access code 60 is an existing code. If it exists, the server determines whether or not the key code 90 corresponding to the online access code 60 is provided. Moreover, it is possible, in addition to such determination, to let the server determine whether or not the key code 90 is provided to the user terminal 40. In addition, it is also possible to add the user information to the above deregistration request and let the server determine whether or not the key code 90 is provided to the user identified by the user information.

The server of the animation distribution service company 80 sends a deregistration confirmation signal to the user terminal 40 in the case where the key code 90 is provided, meaning that the deregistration request is a reasonable request. In addition, it stores the number of the key codes 90 provided to the online access code 60 by reducing it by one. In this case, the above user information and so on may be erased, and the information about the key code 90 not being provided to the user 10 may be added.

The user terminal 40 erases the stored key code 90 upon receipt of this deregistration confirmation. Thus, the viewing contract of the animation medium (animation data) is canceled.

Hereafter, the first user terminal will be described in detail referring to FIG. 4.

(First User Terminal)

Figure 4:
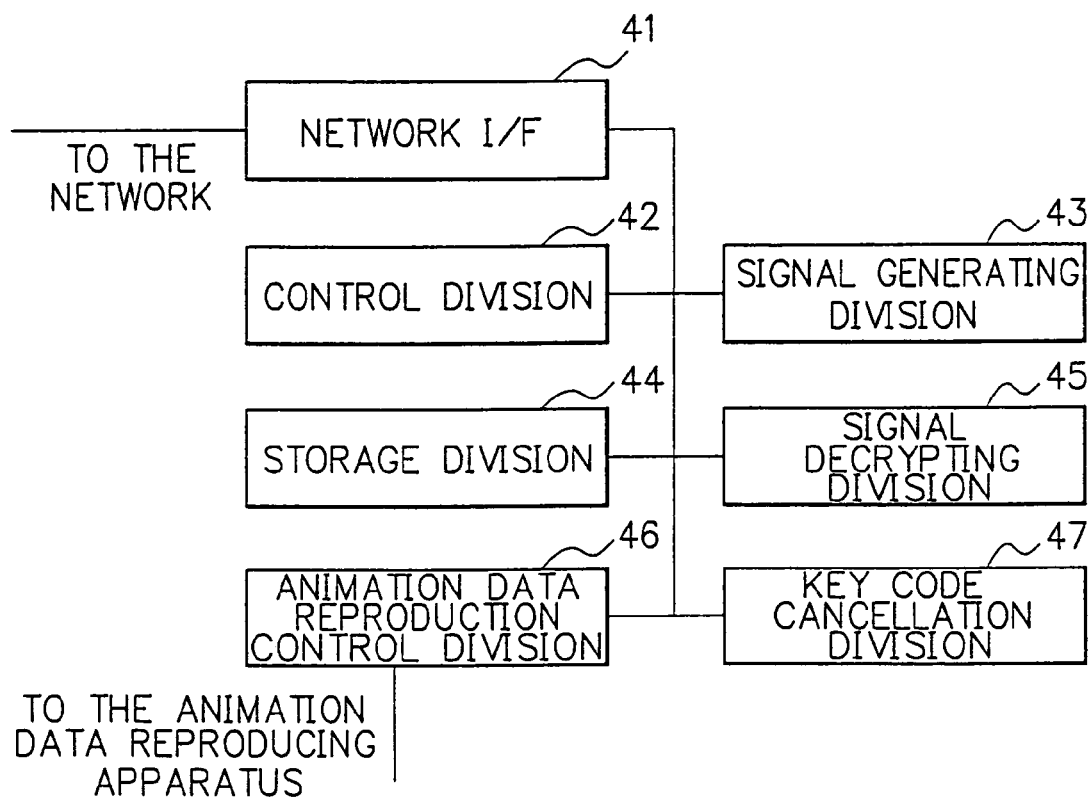
FIG. 4 is a block diagram showing internal configuration of a user terminal.

According to FIG. 4, the user terminals 40 and 50 as the first user terminals have a network I/F 41, a control division 42, a signal generating division 43, a storage division 44, a signal decrypting division 45, an animation data reproduction control division 46 and a key code cancellation division 47, and perform the above described operation.

The network I/F 41 performs communication with the animation distribution service company 80.

The control division 42 controls the network I/F 41, the signal generating division 43, the storage division 44, the signal decrypting division 45, the animation data reproduction control division 46 and the key code cancellation division 47, and controls operation of the user terminals.

In addition, it encrypts the key code 90 included in the above registration confirmation signal and stores it in the storage division 44.

The signal generating division 43 creates the above described signals, and sends them to the server of the animation distribution service company 80 via the network I/F 42. As for these signals, at least the registration request signal and the deregistration request signal shown in FIG. 5 are generated. The registration request signal and the deregistration request signal are created according to instructions of the user 10 as described above and sent to the server of the animation distribution service company 80.

The storage division 44 stores the key code 90 received from the server of the animation distribution service company 80.

The signal decrypting division 45 decrypts a signal sent from the animation distribution service company as shown in FIG. 2, and delivers the decrypting results to the control division 42. This signal may be the registration confirmation signal or a registration reject signal for the registration request signal, or the deregistration confirmation signal or a deregistration reject signal for the deregistration request signal.

The animation data reproduction control division 46 uses the key code 90 decoded by the key code cancellation division 47 to reproduce the animation data on the animation data reproducing device.

Moreover, the animation data reproducing device may exist in the user terminal 40. This animation data reproducing device should be able to display the animation data at least, and in the case where this animation data has audio data, it should also be able to display the audio data.

The data included in the animation medium 30 is read by the animation medium (large capacity medium) reading division (not shown). This animation medium reading division may be either inside or outside the user terminal. It may also be placed inside the animation data reproducing device.

Moreover, as described above, these signals may be generated by the signal generating division 43, or it may also be generated by the control division 42 based on the program included in the animation medium 30 and so on.

In addition, as described above, the animation data may also be generated software-wise by the control division 42 (or the animation data reproduction control division 46) based on the animation reproduction program included in the animation medium 30 and so on.

In addition, the signal received from the animation distribution service company 80 may be analyzed by the control division 42 operating based on the program included in the animation medium 30 and so on.

In addition, the process of encrypting the key code 90 and storing it in the storage division 44 may be performed by an encryption processing division (not shown).

Moreover, the user terminal 40 is an example of the first user terminals of the animation data sales system. Accordingly, in the case where the large capacity data is other data such as map data, it has a map data reproduction control division instead of the animation data reproduction control division 46.

Figure 6:
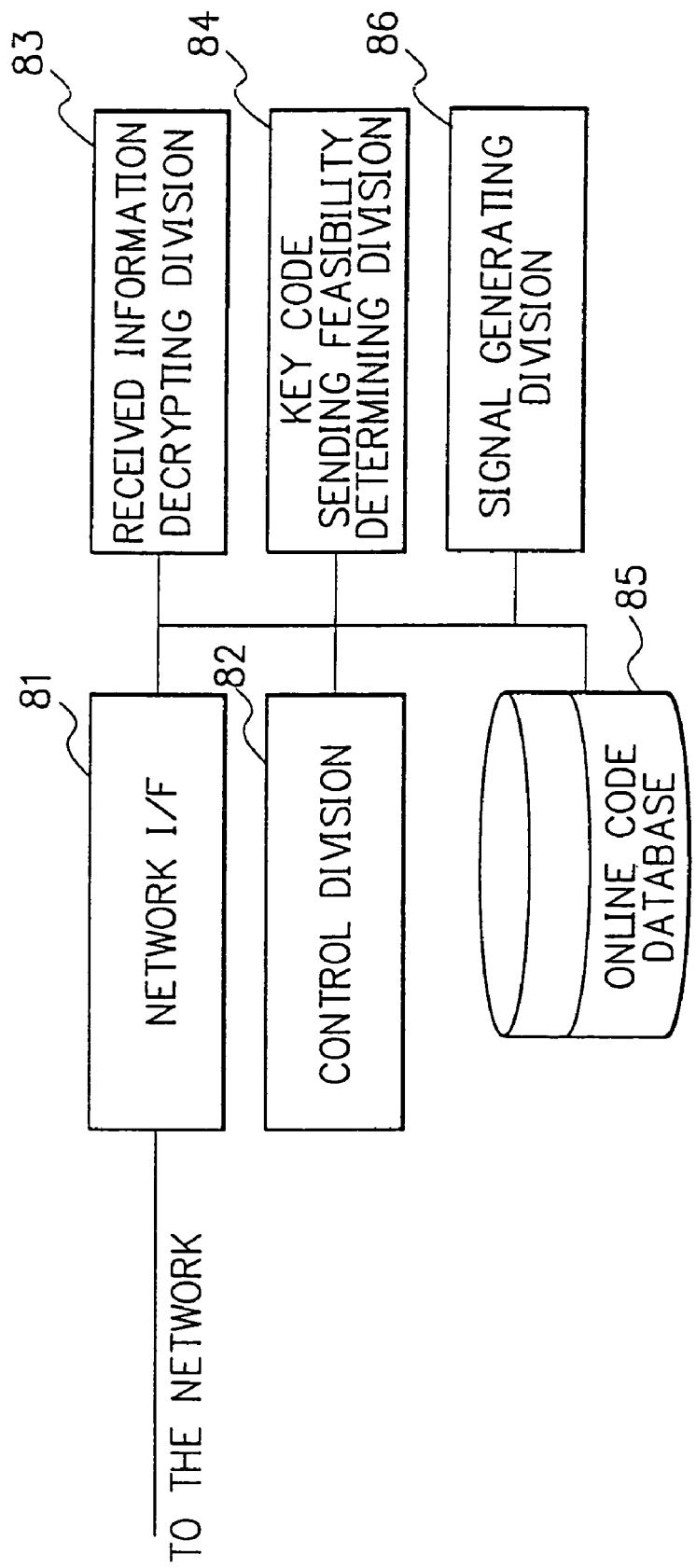
FIG. 6 is a first block diagram showing the internal configuration of a large capacity data sales server.

Hereafter, the first animation data sales server will be described by referring to FIG. 6.

(First Animation Data Sales Server)

The server of the animation distribution service company 80 that is the first animation data sales server has a network I/F 81, a control division 82, a received information decrypting division 83, a key code sending feasibility determining division 84, an online code database 85 and a signal generating division 86, and performs the above described operation.

The network I/F 81 performs communication with the user terminals 40 and 50.

The control division 82 controls the network I/F 81, the received information decrypting division 83, the key code sending feasibility determination division 84 and the online code database 85, and performs the operation of the above described server of the animation distribution service company 80.

The received information decrypting division 83 analyzes the signal (the registration request signal, the deregistration request signal etc.) shown in FIG. 2 received via the network I/F 81, and delivers the analysis results to the control division 82.

As for the online code database 85, the online access code 60 provided to the animation medium 30 and the key code 90 corresponding thereto one to one are stored in the online code database 85 as being associated to each other. In addition, for each online access code 60, the number of the provided key codes 90 corresponding thereto is stored.

The signal generating division 86 generates the signal as shown in FIG. 5 and sends it to the user terminal 40. To be more specific, the registration confirmation signal or the registration reject signal is generated for the registration request signal, and the deregistration confirmation signal or the deregistration reject signal for the deregistration request signal. It follows an instruction from the key code sending feasibility determination division 84 as to which of the registration confirmation signal or the registration reject signal is generated or which of the deregistration confirmation signal or the deregistration reject signal is generated.

Figure 7:
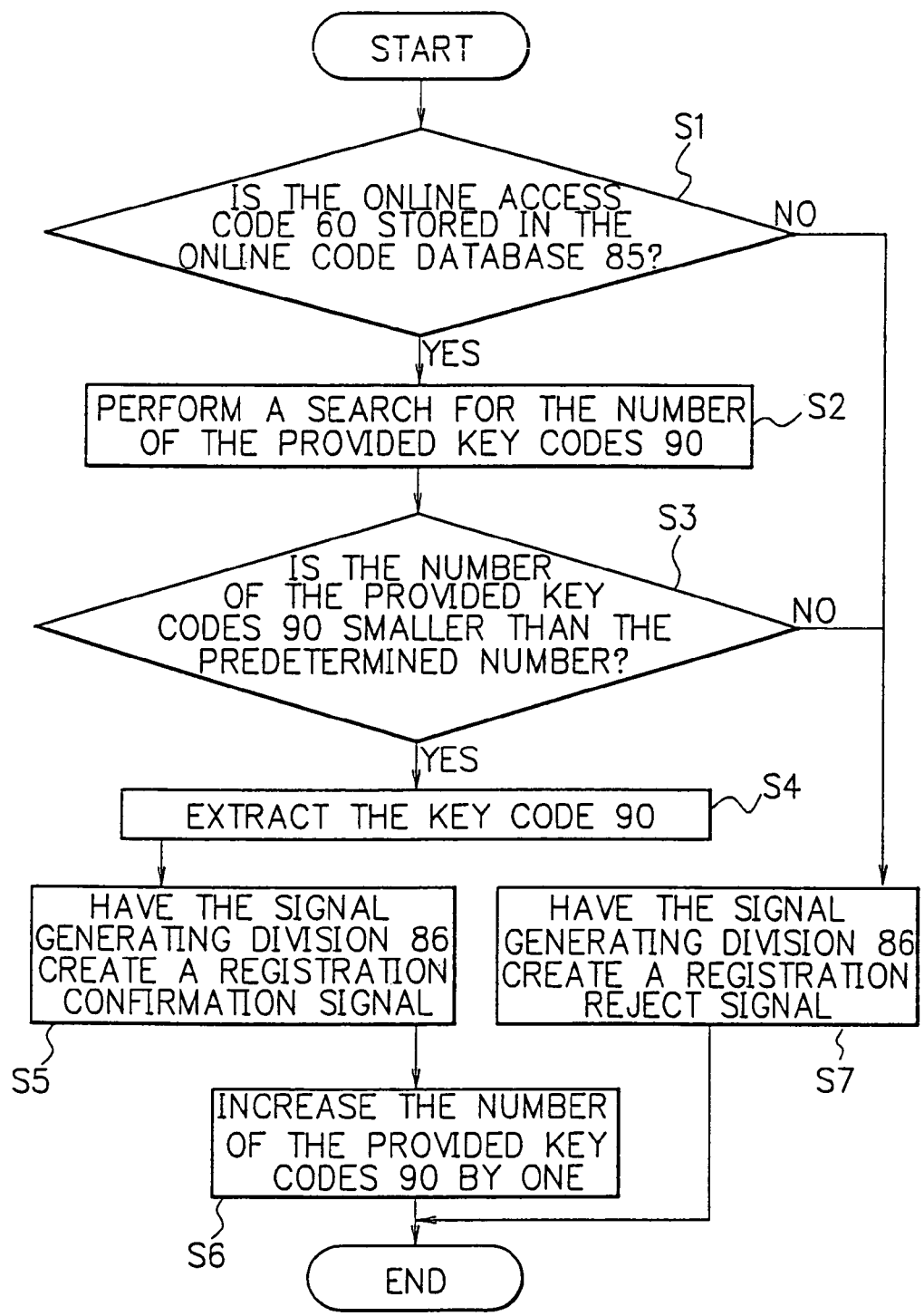
FIG. 7 is a flowchart for describing operation of a key code sending feasibility determination division 84 in the case where a registration request signal is inputted.
Figure 8:
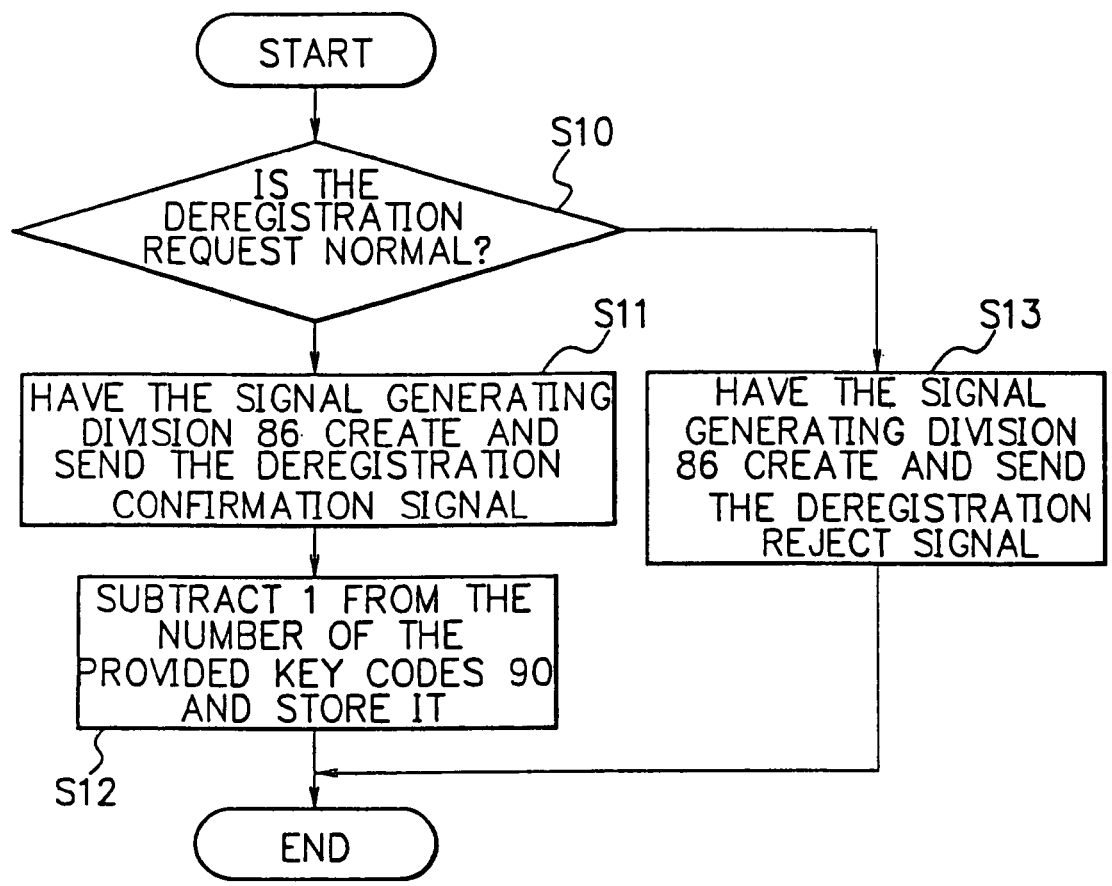
FIG. 8 is a flowchart for describing operation of the key code sending feasibility determination division 84 in the case where a deregistration request signal is inputted.

If the results of analyzing the registration request signal are inputted to the control division 82, the key code sending feasibility determination division 84 performs a search, as shown in FIG. 7, as to whether the online access code 60 is stored in the online code database 85 (step S1).

In the case where the online access code 60 is stored (step S1/YES), the key code sending feasibility determination division 84 checks the number of the provided key codes 90 corresponding thereto (step S2).

The key code sending feasibility determination division 84 checks whether the number of the provided key codes 90 is smaller than the above predetermined number (the number of the key codes 90 provided to one online access code 60) (step S3).

In the case where the number of the provided key codes 90 is smaller than the above predetermined number (step S3/YES), the key code sending feasibility determination division 84 extracts from the online code database 85 the key code 90 corresponding to the online access code 60 (step S4). Then the key code sending feasibility determination division 84 will have the signal generating division 86 create the online access code 90 via a network I/F 91 and send the registration confirmation signal including the key code 90 to the user terminal having sent the registration request (step S5).

Next, the number of the key codes 90 provided to each online access code 60 stored in the online code database 85 is increased by one (step S6), and the process is terminated.

In the case where the online access code 60 is not stored (in the case where it is not the legitimate online access code 60; step S1/NO), and in the case where the number of the provided key codes 90 is equal to or larger than the above predetermined number (step S3/NO), the key code sending feasibility determination division 84 will have the signal generating division 86 create the registration reject signal and send it to the user terminal 40 having sent the online access code 60 (step S7), and the process is terminated.

In the case where the above deregistration request is inputted, the key code sending feasibility determination division 84 checks whether the online access code 60 included in the deregistration request is legitimate (checks whether the deregistration request is legitimate; step S10). To be more specific, it checks whether the key code has already been provided to the online access code 60, whether the key code 90 has been provided to the user terminal that is the sender of the deregistration request, and so on.

In the case where this deregistration request is legitimate (step S10/YES), the key code sending feasibility determination division 84 will have the signal generating division 86 create the deregistration confirmation signal and send it via the network I/F 81 to the user terminal 40 having sent the above deregistration request (step S11).

Then the number of the provided key codes 90 corresponding to the online access code 60 stored in the online code database 85 is subtracted by one (step S12), and the process is terminated.

In the case where this deregistration request is not legitimate (step S10/NO), the key code sending feasibility determination division 84 will have the signal generating division 86 create the deregistration reject signal and send it via the network I/F 81 to the user terminal 40 having sent the above deregistration request signal (step S13), and the process is terminated.

Moreover, the online access code 60 may be associated with the key code 90 by a predetermined conditional formula and so on. In this case, the key code 90 is created by the control division 82, the received information decrypting division 83, or the key code sending feasibility determination division 84 based on an online access code 60 sent from the user terminal 40 and by using the above predetermined conditional formula.

In addition, a condition other than the ones described above may be set as a requirement for sending the above registration confirmation signal and/or a requirement for sending the deregistration confirmation signal. For instance, payment of a consideration for the animation medium (animation data) may be added as a condition for sending the registration confirmation signal. Hereafter, the requirement for sending the registration confirmation signal is represented as a registration confirmation signal sending requirement and the requirement for sending the deregistration confirmation signal as a deregistration confirmation signal sending requirement.

Figure 9:
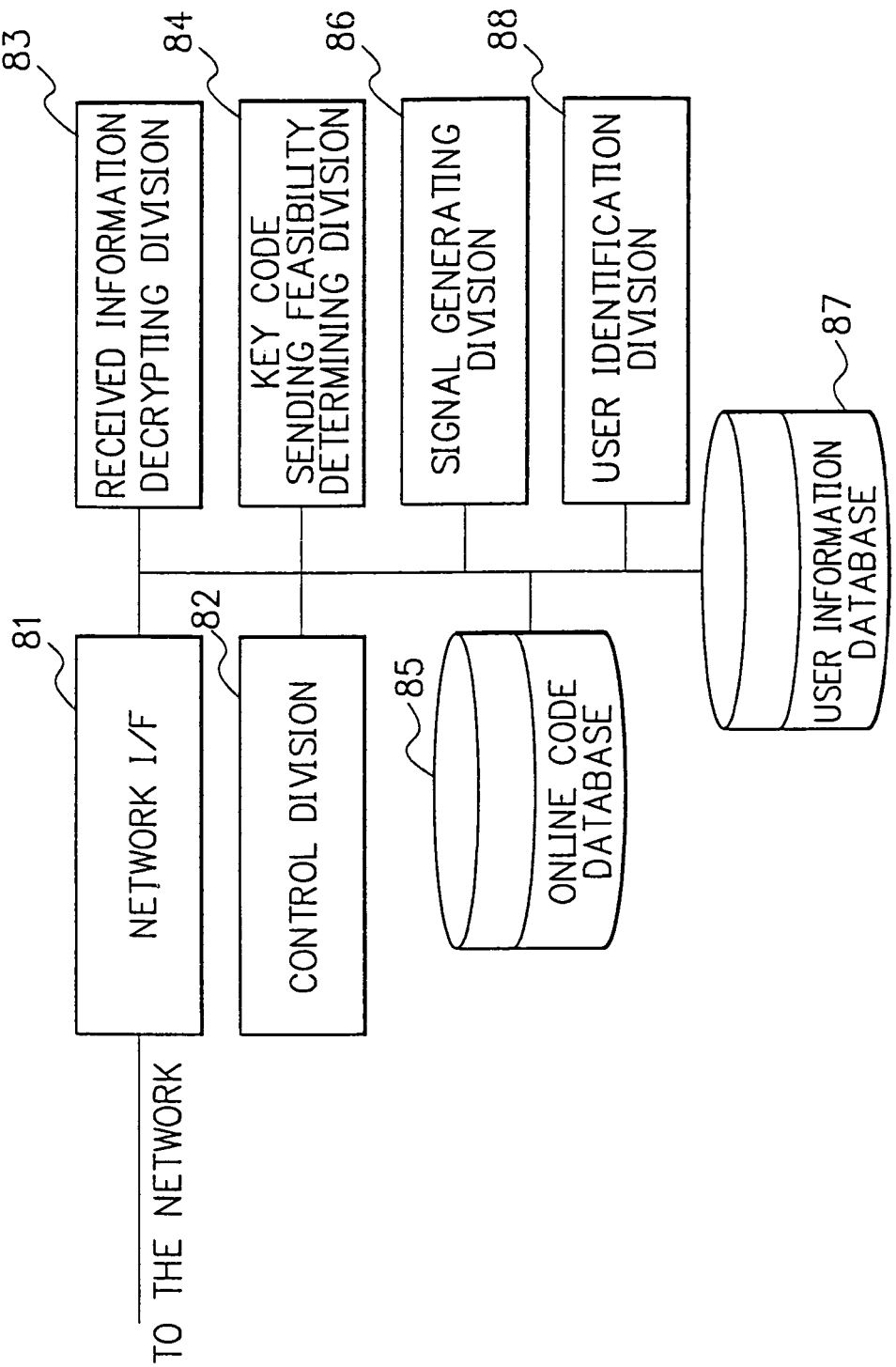
FIG. 9 is a second block diagram showing the internal configuration of a large capacity data sales server.

In addition, it may further have a user information database 87 and a user identification division 88, as shown in FIG. 9.

In the user information database 87, information on the user 10 having provided the key code 60 will be stored. This information includes at least the name of the user terminal having provided the online access code 60, the name of the online access code 60 and the name of the key code 90.

The user identification division 88 manages the user information database 87 and performs user authentication based on the inputted user information. In addition, it registers and updates the user information in the user information database 87. As mentioned later, more detailed information (user name, charge collection method and so on) may be stored in the case of collecting the charge for the animation medium (animation data) from the user 10.

In this case, as a condition of the registration confirmation signal sending requirement and/or the deregistration confirmation signal sending requirement, a condition that the user 10 can be identified as a result of the user authentication by the user identification division 88 may be added.

Moreover, it is a matter of course that these components may be operated by the control division 82 according to the program.

Thus, it becomes possible to reproduce the animation medium (animation data) by exchanging signals between the user terminal and the server of the animation distribution service company. FIG. 5 shows the six signals required for reproduction of this animation data, their source of transmission, etc. To be more specific, the above operation is implemented by the registration request signal, the registration confirmation signal, the registration reject signal, the deregistration request signal, the deregistration confirmation signal and the deregistration reject signal. The flow of this operation (signals) is summarized using the sequence diagrams of FIGS. 10 to 13.

Figure 10:
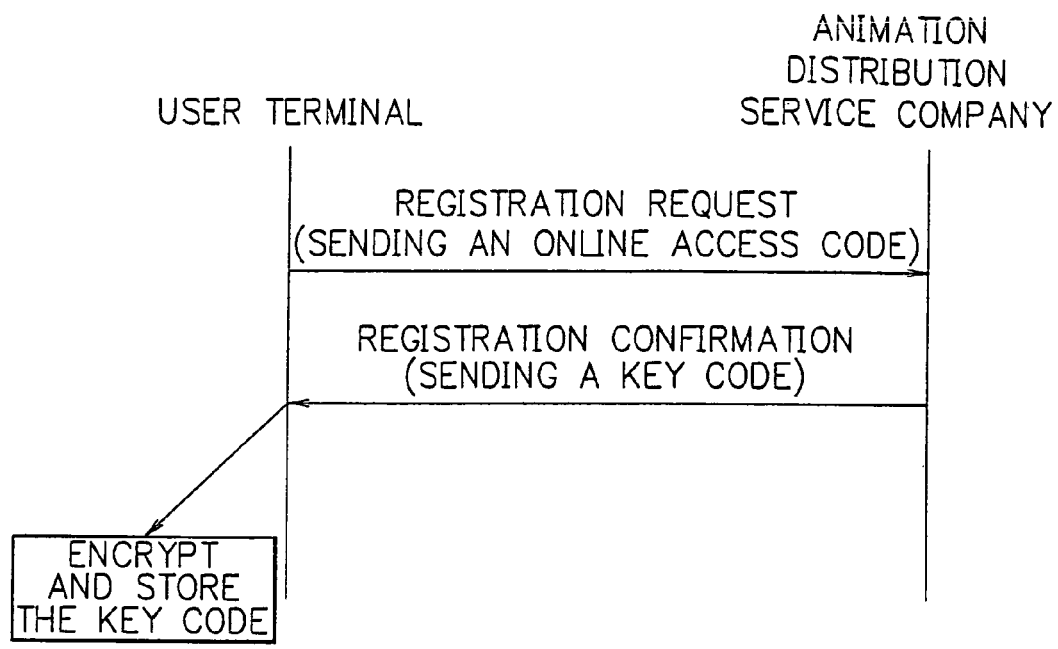
FIG. 10 is a first sequence diagram for describing the flow of processing in the large capacity data sales system.
Figure 11:
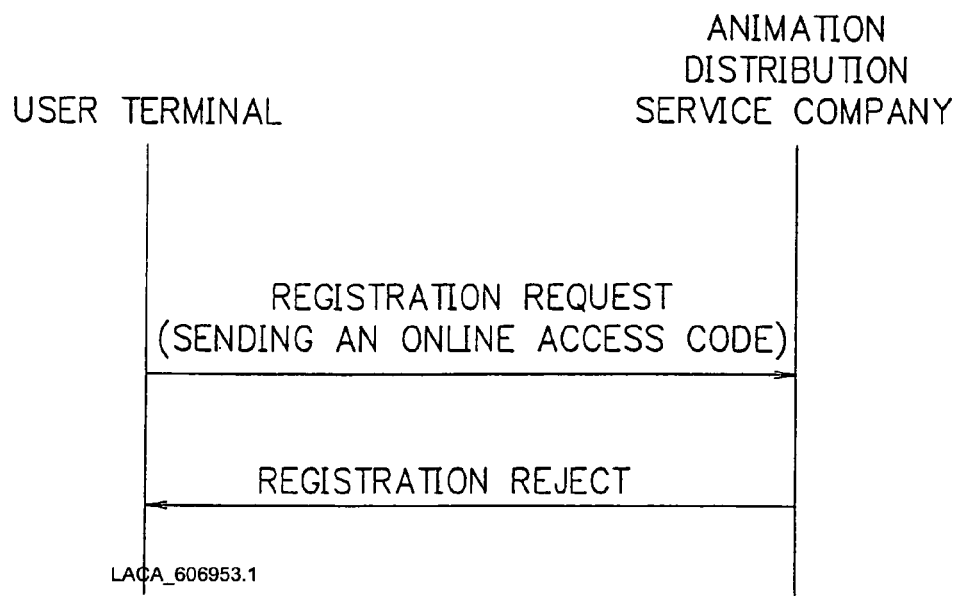
FIG. 11 is a second sequence diagram for describing the flow of processing in the large capacity data sales system.

FIGS. 10 and 11 describe the operation by which the user terminal 40 acquires the key code 90 from the animation distribution service company 80.

As shown in FIG. 10, the user terminal 40 sends the registration request signal to the server of the animation distribution service company 80. This registration request signal includes at least the online access code 60.

The server of the animation distribution service company 80 determines whether this registration request signal satisfies the above registration confirmation signal sending requirement. In the case where it satisfies the requirement, it sends to the user terminal 40 the registration confirmation signal including the key code 90 as shown in FIG. 10.

The user terminal 40 encrypts and stores the key code 90 included in the received registration confirmation signal.

In the case where it does not satisfy the above requirement, the server of the animation distribution service company 80 sends the registration reject signal to the user terminal 40 as shown in FIG. 11.

Thus, the key code 90 for reproducing the animation medium (animation data) is sent only to the user terminal 40 having sent the registration request signal satisfying the requirement.

Figure 12:
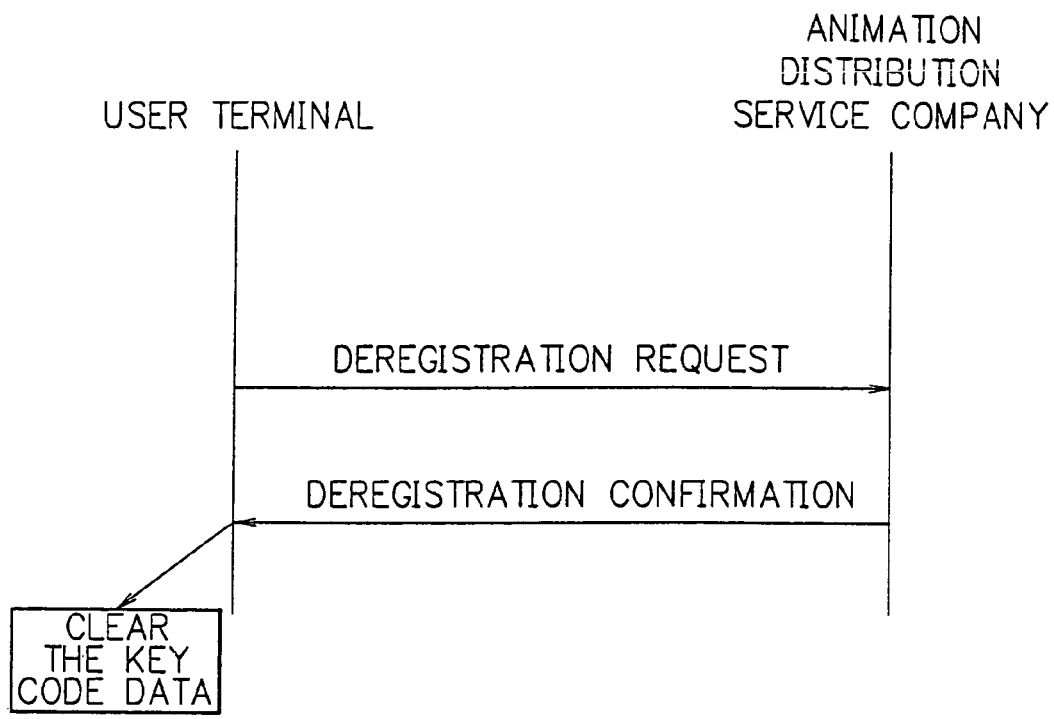
FIG. 12 is a third sequence diagram for describing the flow of processing in the large capacity data sales system.
Figure 13:
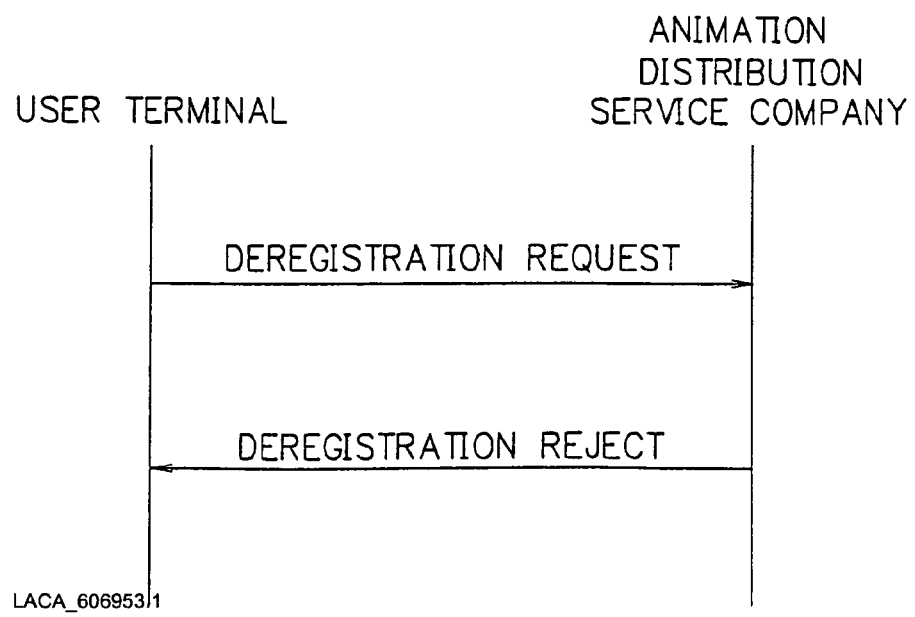
FIG. 13 is a fourth sequence diagram for describing the flow of processing in the large capacity data sales system.

FIGS. 12 and 13 show the flow of a deregistration process.

The user terminal 40 sends the deregistration request to the server of the animation distribution service company 80 as shown in FIG. 12.

The server of the animation distribution service company 80 determines whether this deregistration request satisfies the above deregistration confirmation signal sending requirement.

In the case where it satisfies the requirement, it sends the deregistration confirmation signal to the user terminal 40 as shown in FIG. 12.

In the case where it does not satisfy the requirement, it sends the deregistration reject signal to the user terminal 40 as shown in FIG. 13.

The user terminal 40 having received the deregistration confirmation signal erases the key code.

By this method, the key code 90 for reproducing the animation medium (animation data) is deleted by sending the deregistration signal satisfying the deregistration confirmation signal sending requirement. Thus, the number of the provided key codes 90 stored in the online code database 85 is subtracted by one.

Accordingly, it becomes possible for the user 10 to reproduce the animation medium 30 on another user terminal (such as the user terminal 50) by performing operation according to the sequence diagram of FIG. 10 from another user terminal (such as the user terminal 50) (it becomes possible to shift the animation reproduction environment from the user terminal 40 to the user terminal 50).

Next, the method of collecting the charge for the animation medium (animation data) will be described.

(Charge Collection Method)

Collecting the charge for the animation medium (animation data) is voluntary. To be more specific, the animation medium (animation data) may be delivered either for a consideration or at no charge.

In the case of assigning it for a consideration, the charge may be collected by the following method for instance.

(First Charge Collection Method)

The charge can be collected by adding as the above registration confirmation signal sending requirement a condition that the consideration for the animation medium (animation data) is paid to the animation distribution service company 80. Any method can be used as this method of payment, such as paying the above charge to the animation distribution service company 80 by using electronic money technology or having a third party organization make advances.

Moreover, this charge may be paid either in a lump sum or by a predetermined amount for each fixed period. In the latter case, it may be set such that the payment continues until deregistration or stops after the elapse of a predetermined period.

(Second Charge Collection Method)

It is also possible to collect the charge according to viewing time. An example of this method is shown below.

The animation data reproduction control division 46 is instructed to reproduce the animation data by the user and then starts to reproduce it, and has the signal generating division 43 generate a reproduction start signal and send it to the server of the animation distribution service company 80. This reproduction start signal includes information on at least the time when the reproduction of the animation data was started and the name of the user terminal that reproduced the data.

The received information decrypting division 83 of the animation distribution service company 80 stores this information for each user terminal name in the user information database 87.

Next, when the animation data reproduction control division 46 is instructed to stop the reproduction of the data and then stops it, and the animation data reproduction control division 46 will have the signal generating division 43 generate a reproduction stop signal and send it to the server of the animation distribution service company 80. This reproduction stop signal includes information on at least the time when the reproduction of the animation data was stopped and the name of the user terminal that reproduced the data.

The received information decrypting division 83 of the animation distribution service company 80 stores this information for each user terminal name in the user information database 87.

The control division 82 of the server of the animation distribution service company 80 checks the above information stored in the user information database 87 for each predetermined period, and checks the viewing time of the user 10 during this period to bill the user 10 for the charge corresponding to this viewing time. Any appropriate method can be used as this method of billing (collection) of the charge.

In addition, if the animation data reproduction control division 46 is instructed to stop the reproduction of the animation data by the user, it may have the signal generating division 43 generate a reproduction time information signal and send it to the server of the animation distribution service company 80. This reproduction time information signal includes information on at least the time when the animation data was reproduced and the name of the user terminal that reproduced it.

The received information decrypting division 83 of the animation distribution service company 80 stores the information included in the reproduction time information signal in the user information database 87.

The control division 82 checks the above information stored in the user information database 87 for each predetermined period, and checks the viewing time of the user 10 during this period to bill the user 10 for the charge corresponding to this viewing time.

(Third Charge Collection Method)

It is also possible to collect the charge according to frequency of viewing instead of the viewing time.

In this case, definition of the frequency of viewing can be established arbitrarily, and so, for instance, one view can be defined as viewing all of the animation data was viewed or viewing the animation data for predetermined time or longer.

If the conditions for counting the above frequency of viewing are met, the animation data reproduction control division 46 has the signal decrypting division 45 generate a count information signal and send it to the server of the animation distribution service company 80. This count information includes at least the frequency of viewing and the name of the user terminal that reproduced it.

The received information decrypting division 83 of the animation distribution service company 80 stores this information for each user terminal in the user information database 87.

The control division 82 checks the frequency of viewing of the user 10 from the information stored in the user information database 87 for each predetermined period, and bills the user 10 for the charge corresponding to this frequency of viewing.

(Fourth Charge Collection Method)

The key code 90 may be erased from the user terminal 40 each time it reproduces the animation data.

That is, in this animation data (large capacity data) sales system, the key code 90 in the user terminal 40 is erased if the reproduction of the animation data is stopped or the predetermined time elapses during the reproduction, so that the key code 90 must be newly downloaded in the case of reproducing the animation data again.

Thus, it is no longer necessary to perform the above described operation for deregistration in order to reproduce the animation medium on another user terminal. In addition, the animation distribution service company 80 can conduct collection of the charge and so on more elaborately since the reproduction state of the animation data can be grasped in more detail.

As for a method of implementing this, it is possible for instance, for the control division 42 to erase the key code 90 stored in the storage division 44 on condition that it must be after the elapse of a predetermined time after the key code 90 is stored in the storage division 44 or upon receipt of an instruction to stop the animation from the user 10. This condition can be established arbitrarily.

It is also possible that the server of the animation distribution service company 80 sends a key code erasure order signal to the user terminal 40 after the elapse of the predetermined time after sending the key code 90, and the signal decrypting division 45 of the user terminal 40 erases the key code 90 stored in the storage division 44 via the control division 42 based on this signal.

Moreover, in such a case of assigning the animation medium (animation data) for a consideration, the server of the animation distribution service company 80 has the user identification division 88 and the user information database 87 as shown in FIG. 9. The user information required for collecting the charge is stored in the user information database 87. This information includes the user name, charge payment method and so on for instance.

<Animation Data Sales Method>

The animation data sales method as one of the large capacity data sales methods can be performed as described above.

To be more specific, this data sales method has the steps of: having the user 10 acquire the animation medium 30 from an animation media distribution place such as the PC shop 20; having the user 10 send the registration request signal including the online access code 60 from the user terminal 40 to the server of the animation distribution service company 80; and in the case where the above registration request signal satisfies the registration confirmation signal sending requirement, having the server of the animation distribution service company 80 send to the user terminal 40 the key code 90 corresponding to the online access code 60 one to one and essential for reproducing the animation data.

This animation data sales method may further have the steps of: having the user 10 send the deregistration request signal to the animation distribution service company by using the user terminal 40; in the case where this deregistration request signal satisfies the deregistration confirmation signal sending requirement, having the server of the animation distribution service company 80 send the deregistration confirmation signal to the user terminal 40; and having the key code 90 stored in the user terminal 40 erased.

The above registration confirmation signal sending requirement may be, for instance, the requirement to satisfy the condition that the server of the animation distribution service company 80 has the key code 90 corresponding to the online access code 60 and the condition that the number of the issued key codes 90 corresponding to the online access code 60 is smaller than the predetermined number. In addition, it can be included as a condition that the above registration request signal includes the user information from which the user 10 can be identified. It can also be included as a condition that the consideration for the animation medium (animation data) is paid.

The above deregistration confirmation signal sending requirement may be, for instance, that the above deregistration request signal was received from the user terminal 40 and/or the user 10 having been sent the key code 90.

In addition, the above animation data sales method may further have the steps of: having the user terminal 40 notify the animation distribution service company 80 of the time for reproducing the animation medium (animation data), and having the animation distribution service company 80 collect from the user 10 the consideration according to the time.

In addition, the above animation data sales method may further have the steps of: having the user terminal 40 notify the animation distribution service company 80 of the frequency of reproducing the animation medium (animation data); and having the animation distribution service company 80 collect from the user 10 the consideration according to the frequency.

Next, the animation data sales mediation system that is the large capacity data sales mediation system will be described. In addition, its user terminal, the animation data sales mediation system, that is the large capacity data sales mediation server, the animation data sales server, that is the large capacity data sales server, and the large capacity data sales mediation method will be described.

[Large Capacity Data Sales Mediation System]

The animation data sales mediation system of the present invention has the user terminal, the animation data sales mediation server and the animation data sales server. An example of this is shown in FIG. 3. In FIG. 3, the server of the animation distribution service company 80 and the server of the Internet provider 70 fall under the animation data sales server and the animation data sales mediation server respectively.

In this animation data sales mediation system, the animation data sales mediation server takes charge of some of the functions of the animation data sales server of the above animation data sales system. Hereafter, the first to third animation data sales mediation systems wherein the functions shared between the animation data sales server and the animation data sales mediation system are different will be described. In addition, the user terminal, the animation data sales server, the animation data sales mediation server and the animation data sales mediation method will be described.

<First Animation Data Sales Mediation System>

The first animation data sales mediation system has the second user terminal, the first animation data sales mediation server and the second animation data sales server.

As shown in FIG. 3, the first animation data sales mediation system has the user terminals 40 and 50, the server of the Internet provider 70 that is the first animation data sales mediation server, and the server of the animation distribution service company 80 that is the second animation data sales server.

The first animation data sales mediation system is different from the above animation data sales system on the following point.

The different point is that the user authentication is performed by the server of the Internet provider 70.

To be more specific, in the case where the user information is included in the above registration request signal, the server of the animation distribution service company 80 makes an inquiry to the server of the Internet provider 70 as to whether this user information is legitimate. Then it is rendered as a condition, for the above registration confirmation signal sending requirement, that the user information is legitimate.

Thus, it becomes possible to prevent unauthorized copies more effectively by rendering the user information as a condition of the above registration confirmation signal sending requirement. It is because the animation distribution service company 80 can grasp the user's identity.

Accordingly, it is proper enough for the first animation data sales mediation server that it performs the user authentication.

In addition, the second user terminal may be the same as the above first user terminal.

In addition, as for the second animation data sales server, it is proper enough, in addition to the functions of the above first animation data sales server, that it sends a user authentication request signal to the above first animation data sales mediation server and have the user authentication results sent in return, and render the results as a condition for the above registration confirmation signal sending requirement.

Moreover, it is proper if the above registration request signal includes the user information.

Figure 14:
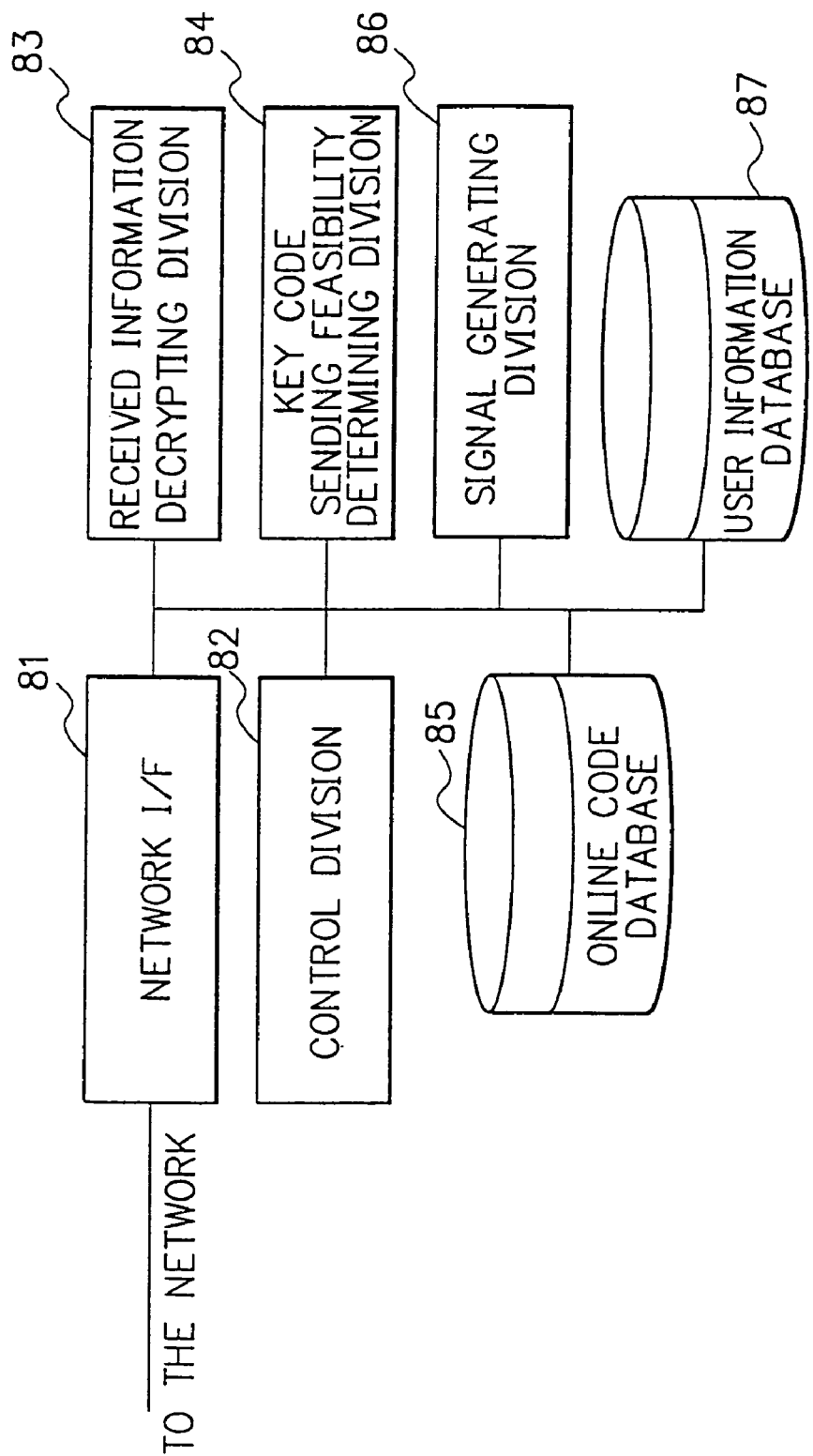
FIG. 14 is a third block diagram showing the internal configuration of the large capacity data sales server.

As shown in FIG. 14, the server of the animation distribution service company 80 has the network I/F 81, the control division 82, the received information decrypting division 83, the key code sending feasibility determining division 84, the online code database 85 and the user information database 87. Moreover, the user authentication is performed by the server of the Internet provider 70, and so it is not required.

The key code sending feasibility determining division 84 delivers the inputted user information to the server of the Internet provider 70 via the network I/F 81, and has the user authentication results sent in return. In this case, it has the signal generating division 86 create the user authentication request signal including the user information and send it to the server of the Internet provider 70.

The user authentication results are a condition for the above registration confirmation signal sending requirement as described above. Thus, in the case where the above registration request signal has the unmistaken (legitimate, correct) user information and satisfies other requirements, the key code sending feasibility determining division 84 sends the registration confirmation signal to the user terminal 40. To be more specific, it sends the registration confirmation signal in the case where the user 10 is identified.

Operations of the other components are the same as the case of the above animation data sales system.

Figure 15:
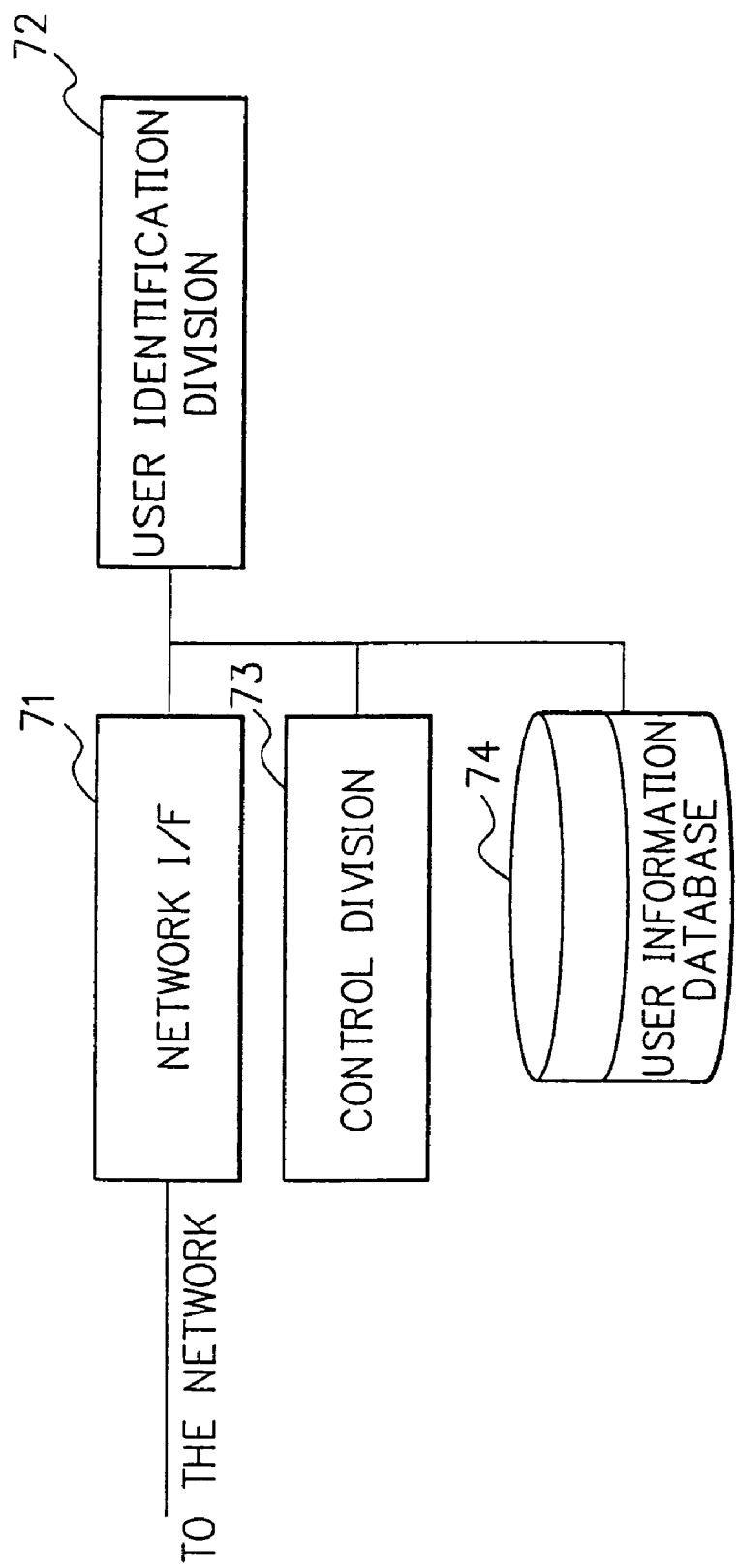
FIG. 15 is a first block diagram showing the internal configuration of a large capacity data sales mediation server.

As shown in FIG. 15, the server of the Internet provider 70 has at least a network I/F 71, a user identification division 72, a control division 73 and a user information database 74.

The network I/F 71 performs communication with the server of the animation distribution service company 80.

If the user authentication request is inputted from the server of the animation distribution service company 80, the user identification division 72 determines whether or not the user information included in the user authentication request matches with the user information stored in the user information database 74. Then it sends the determination results to the server of the animation distribution service company 80 via the network I/F 71.

The control division 73 controls the network I/F 71, the user identification division 72 and the user information database 74 and controls this server.

The user information database 74 has the user information stored in advance.

The user authentication may be performed in any manner. For instance, the user identification division 72 checks the user name included in the user information in the above registration request signal, and performs a search for the user information having the same user name as this from the user information database 74. Of the searched-for user information, if there is information matching with all other information, this user information is determined to be correct.

Moreover, the user 10 is required to store user information 10 in the first animation data sales mediation server in advance. Any appropriate method may be used as the method of storing the user information.

Figure 1:
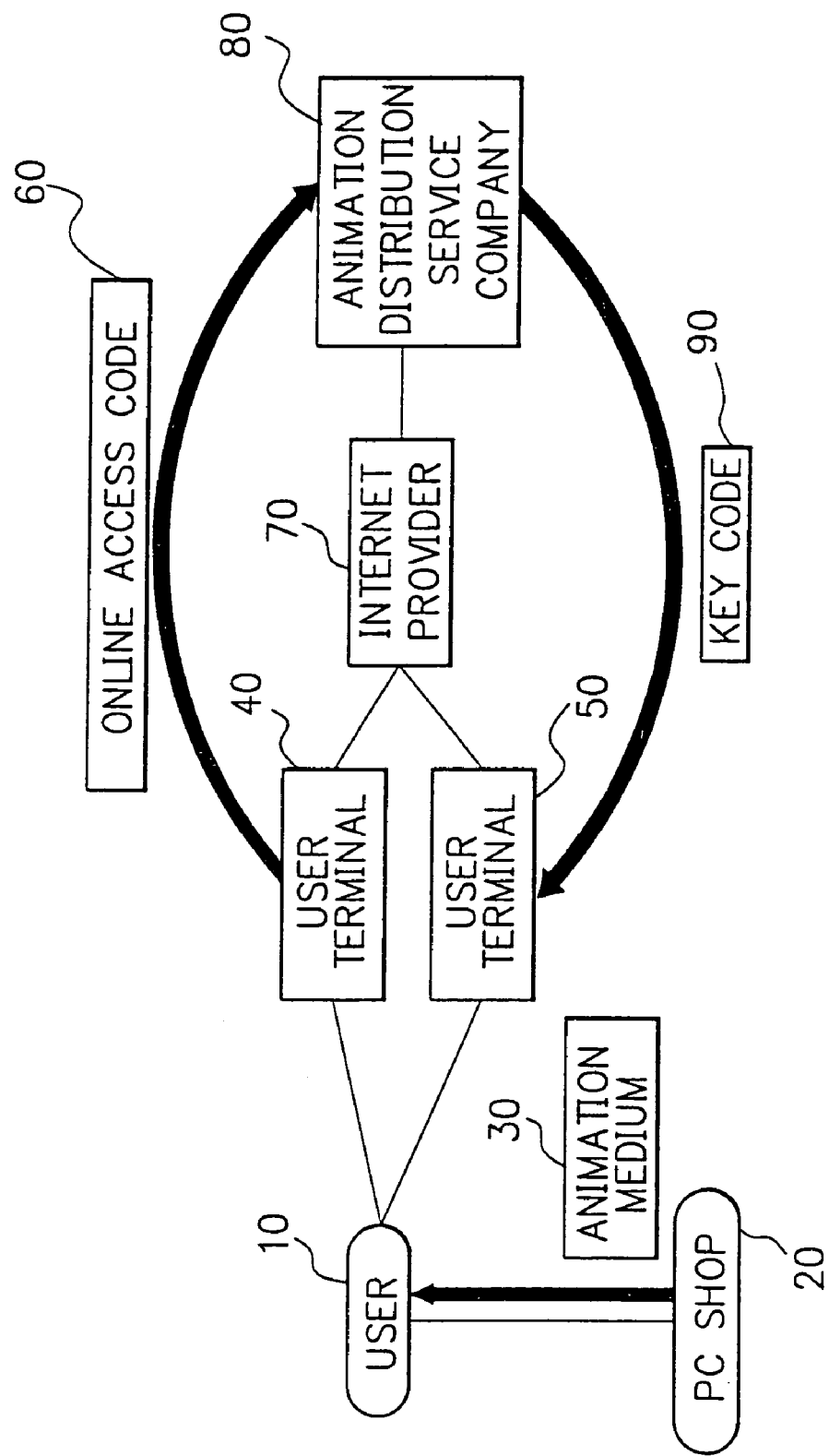

Thus, it becomes possible to prevent any unauthorized copies effectively by setting a condition that the user information must be correct for the above registration confirmation signal sending requirement. In addition, it becomes possible for the animation distribution service company 80 to grasp elaborate information such as the place where the animation medium 30 exists, usage conditions and so on. This flow will be summarized in FIGS. 16 to 18 with reference to FIG. 1 wherein the flow of signals and so on is added to the block diagram of FIG. 3.

The user terminal 40 sends to the server of the animation distribution service company 80 the registration request signal including the user information 10 and the online access code 60 included in the animation medium 30 acquired from the PC shop 20 and so on.

The key code sending feasibility determining division 84 determines whether or not the inputted online access code 60 is legitimate (whether or not the key code 90 is stored in the online code database 85). In addition, it determines whether or not the number of the issued key codes 90 corresponding to the online access code 60 is smaller than the predetermined number. In the following description, a requirement wherein the user authentication requirement is excluded from the registration confirmation signal sending requirement is indicated as a code authentication requirement. As for this code authentication requirement, conditions other than those enumerated here may also be set for determination.

Figure 18:
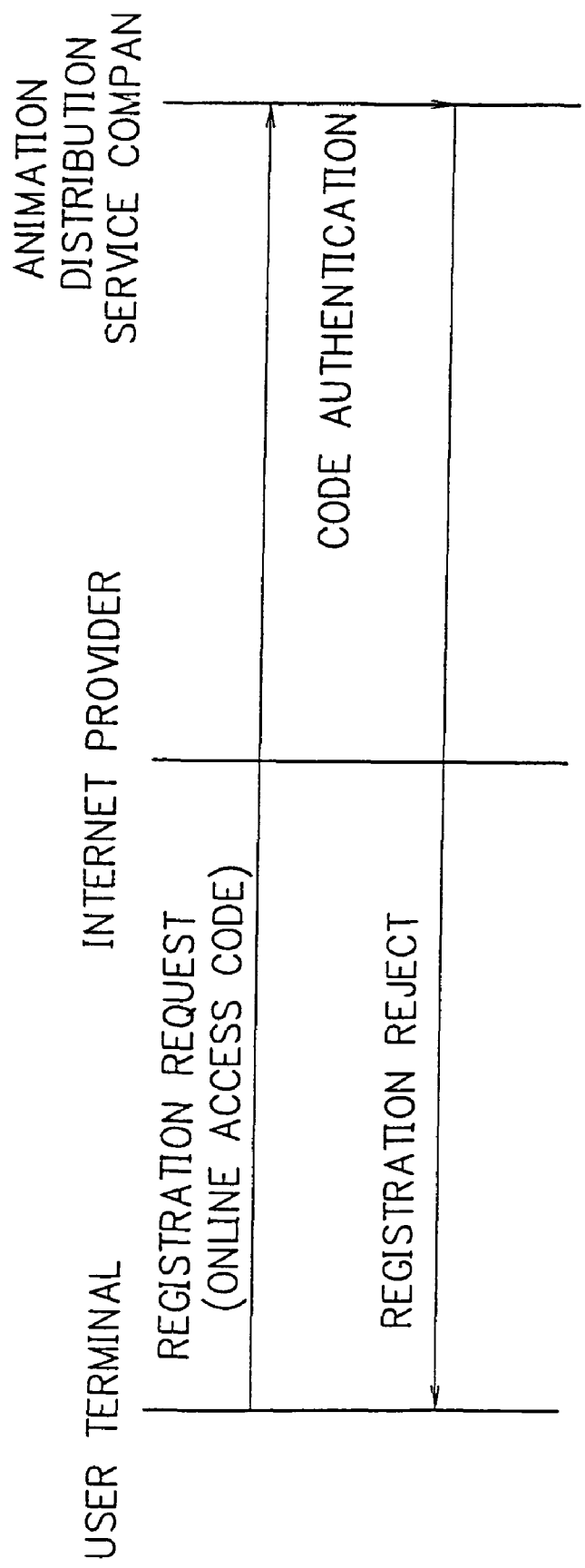
FIG. 18 is a third sequence diagram for describing the flow of processing in the large capacity data sales mediation system.

In the case where the above registration request signal does not satisfy the above code authentication requirement, the key code sending feasibility determining division 84 sends the registration reject signal to the user terminal 40 as shown in FIG. 18.

Figure 16:
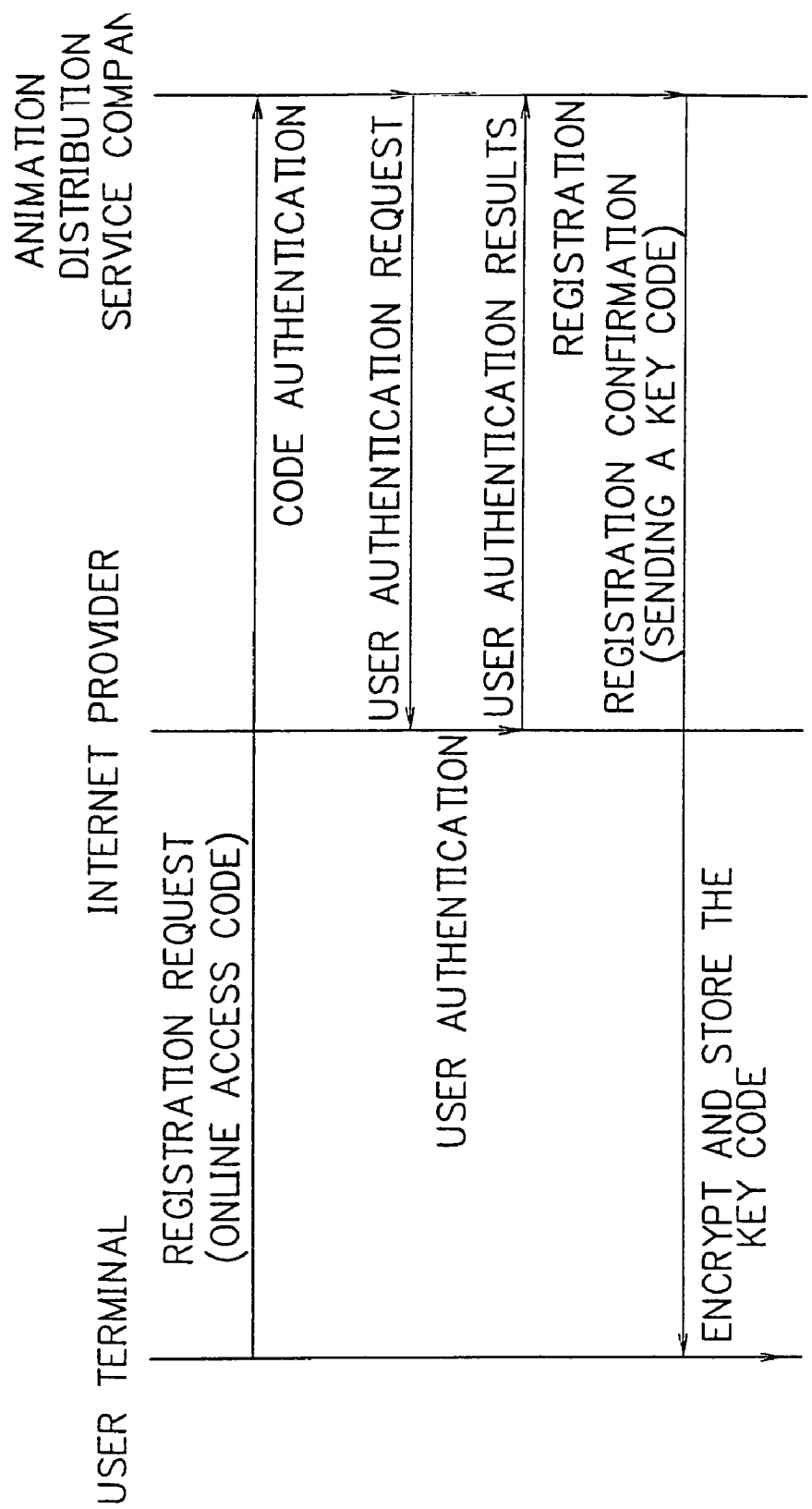
FIG. 16 is a first sequence diagram for describing the flow of processing in the large capacity data sales mediation system.
Figure 17:
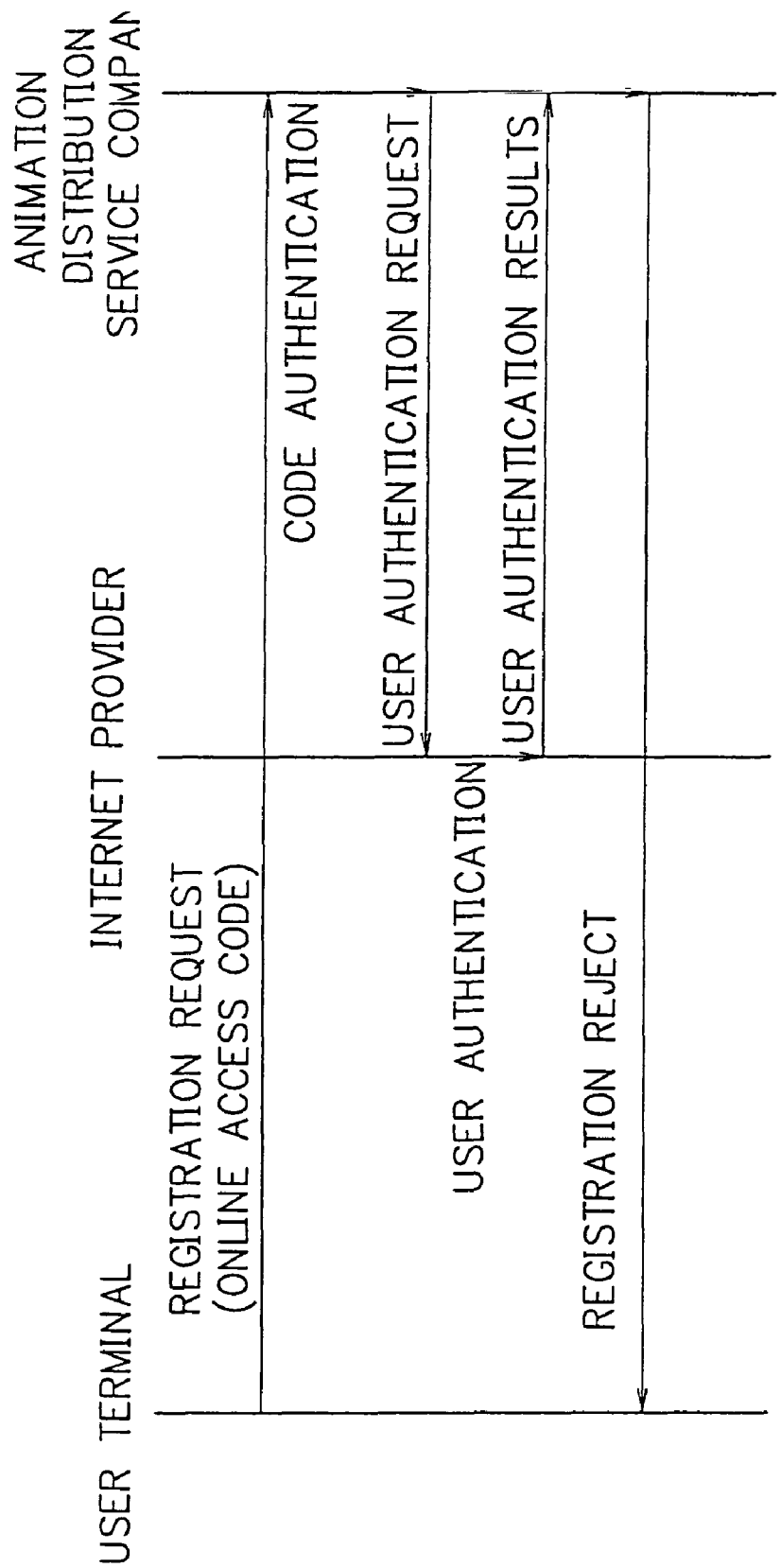
FIG. 17 is a second sequence diagram for describing the flow of processing in the large capacity data sales mediation system.

In the case where the above registration request signal satisfies the above code authentication requirement, the key code sending feasibility determining division 84 has the signal generating division 86 generate the user authentication request signal and send it to the server of the Internet provider 70 as shown in FIGS. 16 and 17.

The user identification division 72 of the Internet provider 70 performs the user authentication based on this request, and sends the user authentication results to the server of the animation distribution service company 80.

In the case where the user authentication results identify the user 10, the key code sending feasibility determining division 84 sends the key code 90 to the user 10 (user terminal 40) as shown in FIG. 16. In addition, it stores (registers) information that the key code 90 was provided to the user in the user information database 87, and increases the number of the issued key codes 90 by one and then stores it in the online code database 85.

The user terminal 40 encrypts and stores the key code 90.

In addition, in the case of receiving the user authentication results including that the user 10 cannot be identified from the user information, the key code sending feasibility determining division 84 has the signal generating division 86 generate the registration reject signal and send it to the user terminal 40 as shown in FIG. 17.

Moreover, the order of performing the code authentication and the user authentication can be different from the order shown in FIGS. 16 to 18.

Cancellation of the contract may be conducted in the same manner as the above animation data sales system. Moreover, a condition that the user information should be legitimate may be set as a condition for the above deregistration confirmation signal sending requirement. In this case, the key code sending feasibility determining division 84 can have the server of the Internet provider 70 performed this operation.

Moreover, it is a matter of course that each of these components may be operated by each control division according to the program.

<First Animation Data Sales Mediation Method>

The first animation data sales mediation method may be conducted as described above.

To be more specific, this first animation data sales mediation method has the steps of: having the user 10 send to the server of the animation distribution service company 80 the registration request signal having at least the user information and the online access code 60; having the animation distribution service company 80 send the above user information to the server of the Internet provider 70; having the server of the Internet provider 70 perform the user authentication based on this user information and send the results to the animation distribution service company 80; having the server of the animation distribution service company 80 check, the registration confirmation signal sending requirement for any condition other than the user authentication condition (code authentication condition); having the server of the animation distribution service company 80 send to the user terminal 40 the key code 90 corresponding to the online access code 60 one to one in the case of meeting the user authentication condition as well as the code authentication condition; and having the user terminal 40 encrypt and store the key code 90.

This animation data sales mediation method may further have the steps of: having the user 10 send the deregistration request signal to the animation distribution service company by using the user terminal 40; in the case where this deregistration request signal satisfies the deregistration confirmation signal sending requirement, having the server of the animation distribution service company 80 send the deregistration confirmation signal to the user terminal 40; and having the user terminal 40 erase the stored key code 90.

In addition, the above deregistration request signal may include the user information, and the above deregistration confirmation signal sending requirement may include a condition that the user 10 should be identified The above animation data sales mediation method may further have the steps of: having the server of the animation distribution service company 80 send the user information to the server of the Internet provider 70; and having the server of the Internet provider 70 perform the user authentication, and the above server of the animation distribution service company 80 may use, of the above deregistration confirmation signal sending requirement, the user authentication results by the server of the Internet provider 70 as the user authentication condition.

The above registration confirmation signal sending requirement may include, for instance, the condition that the animation distribution service company 80 has the key code 90 corresponding to the online access code 60, the condition that the number of the issued key codes 90 corresponding to the online access code 60 is smaller than the predetermined number and the condition that the user 10 can be identified from the above user information. In addition, it may be included as a condition that the consideration for the animation medium (animation data) is paid. Moreover, the Internet provider 70 may make advances for the consideration for the animation medium (animation data).

The above deregistration confirmation signal sending requirement may include a condition that the above deregistration request signal was received from the user terminal 40 and/or the user 10 having been sent the key code 90.

In addition, the above animation data sales mediation method may further have the steps of: having the user terminal 40 notify the animation distribution service company 80 of the time for reproducing the animation medium (animation data); and having the animation distribution service company 80 collect from the user 10 the consideration according to this time.

In addition, the above animation data sales mediation method may further have the steps of: having the user terminal 40 notify the server of the Internet provider 70 of the time for reproducing the animation medium (animation data); and having the Internet provider 70 collect from the user 10 the consideration according to the time; and having the Internet provider 70 pay the collected consideration to the animation distribution service company.

In addition, the above animation data sales mediation method may further have the steps of: having the user terminal 40 notify the server of the animation distribution service company 80 of the frequency of reproducing the animation medium (animation data); and having the animation distribution service company 80 collect from the user 10 the consideration according to the frequency.

Moreover, the above animation data sales mediation method may further have the steps of: having the user terminal 40 notify the server of the Internet provider 70 of the frequency of reproducing the animation medium (animation data); having the Internet provider 70 collect from the user 10 the consideration according to the frequency; and having the Internet provider 70 pay the collected consideration to the animation distribution service company.

<Second Animation Data Sales Mediation System>

The second animation data sales mediation system has a third user terminal, a second animation data sales mediation server and a third animation data sales server.

The third user terminal is different from the first and second user terminals only in that its signal sending source and destination are the second animation data sales mediation server.

In this second animation data sales mediation system, the second animation data sales mediation server registers and manages the user authentication and the user information, and the third animation data sales server determines whether or not the online access code is appropriate and manages the key code. Details are described below.

As shown in FIG. 3, this second animation data sales mediation system has the user terminals 40 and 50 that are the third user terminals, the server of the Internet provider 70 that is the second animation data sales mediation server, and the server of the animation distribution service company 80 that is the third animation data sales server.

Figure 19:
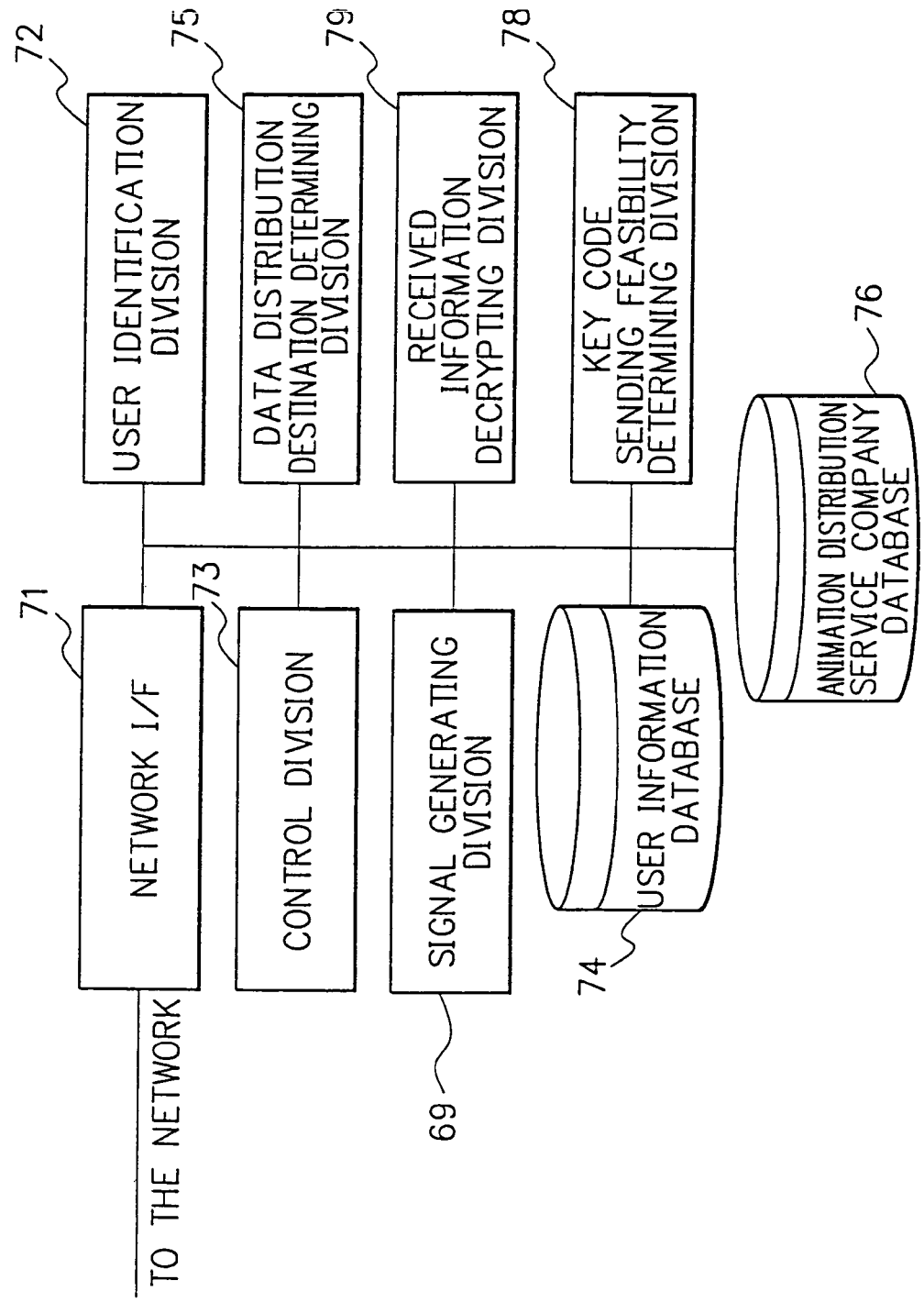
FIG. 19 is a second block diagram showing the internal configuration of the large capacity data sales mediation server.

As shown in FIG. 19, the server of the Internet provider 70 has the network I/F 71, the user identification division 72, the control division 73, the user information database 74, a data distribution destination determining division 75, an animation distribution service company database 76, a key code sending feasibility determining division 78, a received information decrypting division 79 and a signal generating division 69.

The network I/F 71 performs communication with the user terminals 40 and 50 and the server of the animation distribution service company 80.

The user identification division 72 determines whether or not the user 10 is a user registered in the user information database 74 (performs the user authentication) from the user information included in the above registration request signal inputted from the user terminals 40 and 50.

The control division 73 controls the entire operation of the server.

The user information is registered in the user information database 74. In addition, this user information includes information on the name of the animation medium 30 to which the key code 90 is provided and so on for each user 10.

The data distribution destination determining division 75 determines the server of the animation distribution service company 80 for sending the online access code 60 included in the above registration request signal referring to the animation distribution service company database 76, and sends the online access code 60 to this server.

The animation distribution service company database 76 stores the name of the animation distribution service company 80 for storing the key code 90 corresponding to the online access code 60 stored therein. For instance, the data of some high-order bytes of the online access code 60 may represent the name of the animation distribution service company 80 so that a correspondence table of the data and the name of the company will be stored.

The key code sending feasibility determining division 78 determines whether or not to send the key code 90 to the user terminal 40 based on the information inputted from the server of the animation distribution service company 80 and the user authentication results from the user identification division 72. In the case of sending the key code 90, the key code sending feasibility determining division 78 will have the signal generating division 69 create the above registration confirmation signal and send it to the user terminal 40. In the case of not sending the key code 90, the key code sending feasibility determining division 78 will have the above registration reject signal created and sent to the user terminal 40.

In addition, the key code sending feasibility determining division 78 determines whether or not the inputted deregistration request signal has the above deregistration confirmation signal sending requirement. If the signal has the above requirement, the key code sending feasibility determining division 78 will have the signal generating division 69 generate the deregistration confirmation signal and send it to the user terminal 40. The key code sending feasibility determining division 78 will also have the server of the animation distribution service company 80 subtract one from the number of the provided key codes 90. It may also add the information that the key code 90 is not (currently) provided to the user information stored in the user information database 74. If the signal does not have the above requirement, the key code sending feasibility determining division 78 will have the signal generating division 69 send the above deregistration reject signal.

The received information decrypting division 79 decrypts the inputted signal and delivers the decryption results to the control division 73.

The signal generating division 69 generates a signal according to an instruction from the key code sending feasibility determining division 78 and sends it to the user terminal 40.

Figure 20:
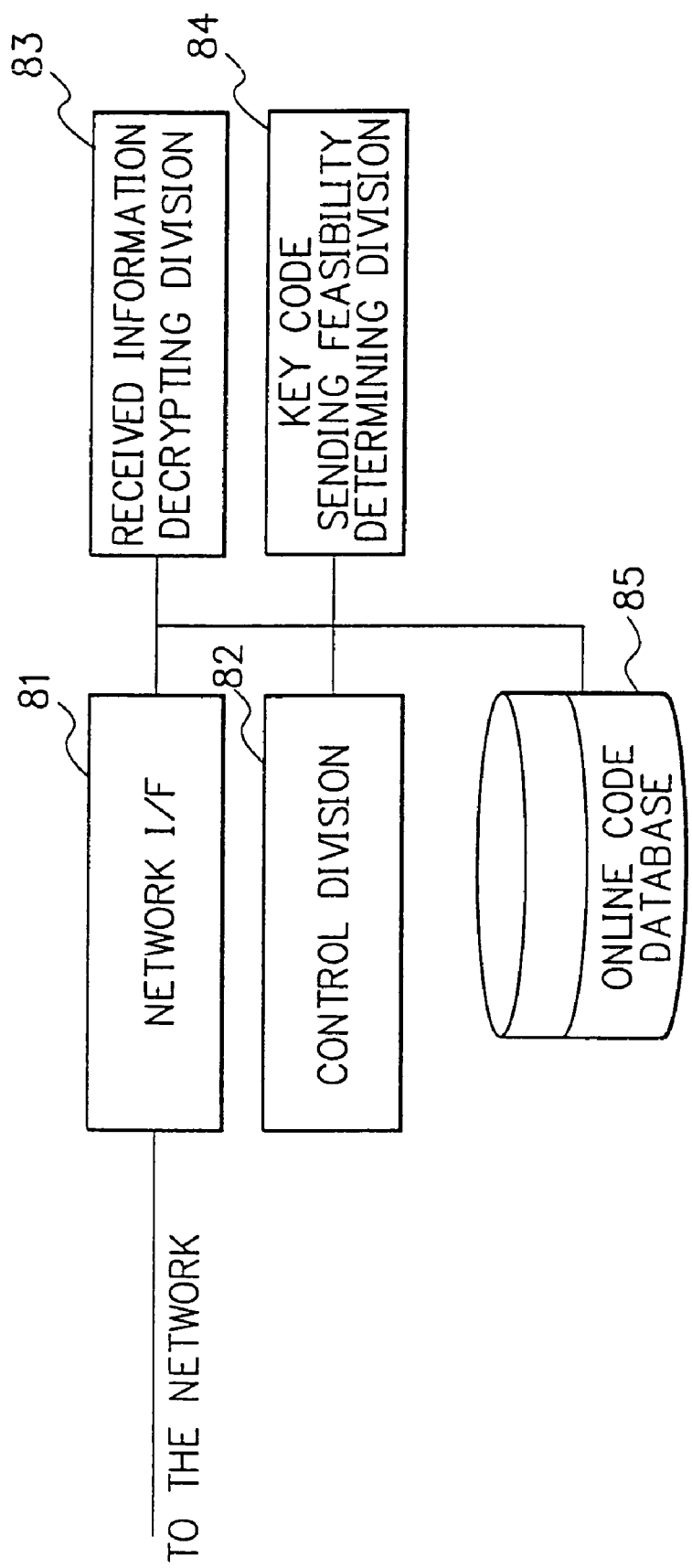
FIG. 20 is a fourth block diagram showing the internal configuration of the large capacity data sales server.

As shown in FIG. 20, the server of the animation distribution service company 80 has the network I/F 81, the control division 82, the received information decrypting division 83, the key code sending feasibility determining division 84 and the online code database 85.

The network I/F 81 performs communication with the server of the Internet provider 70 at least. It may also be allowed to perform communication with the user terminals 40 and 50.

The control division 82 controls the entire operation of the server.

The received information decrypting division 83 analyses the data (signals) inputted from the server of the Internet provider 70 and delivers the analysis results to the control division 82.

The key code sending feasibility determining division 84 determines whether or not the online access code 60 inputted from the server of the Internet provider 70 is legitimate (whether or not it is stored in the online code database 85). This can be determined as described above. The key code sending feasibility determining division 84 also determines whether or not the number of the issued key codes 90 corresponding to the online access code 60 is smaller than the predetermined number, the key code sending feasibility determining division 84 also manages the number of the provided key codes 90 for each online access code 60 using the online code database 85.

The online code database 85 stores the key code 90 unique to the online access code 60. In addition, as mentioned above, the number of the provided key codes 90 is stored for each online access code 60.

Moreover, the key code 90 may be calculated by performing an operation on the online access code 60 according to a predetermined conditional formula. In this case, the control division 82 (or a key code sending feasibility determining division 84) creates the key code 90 from the inputted online access code 60.

Figure 21:
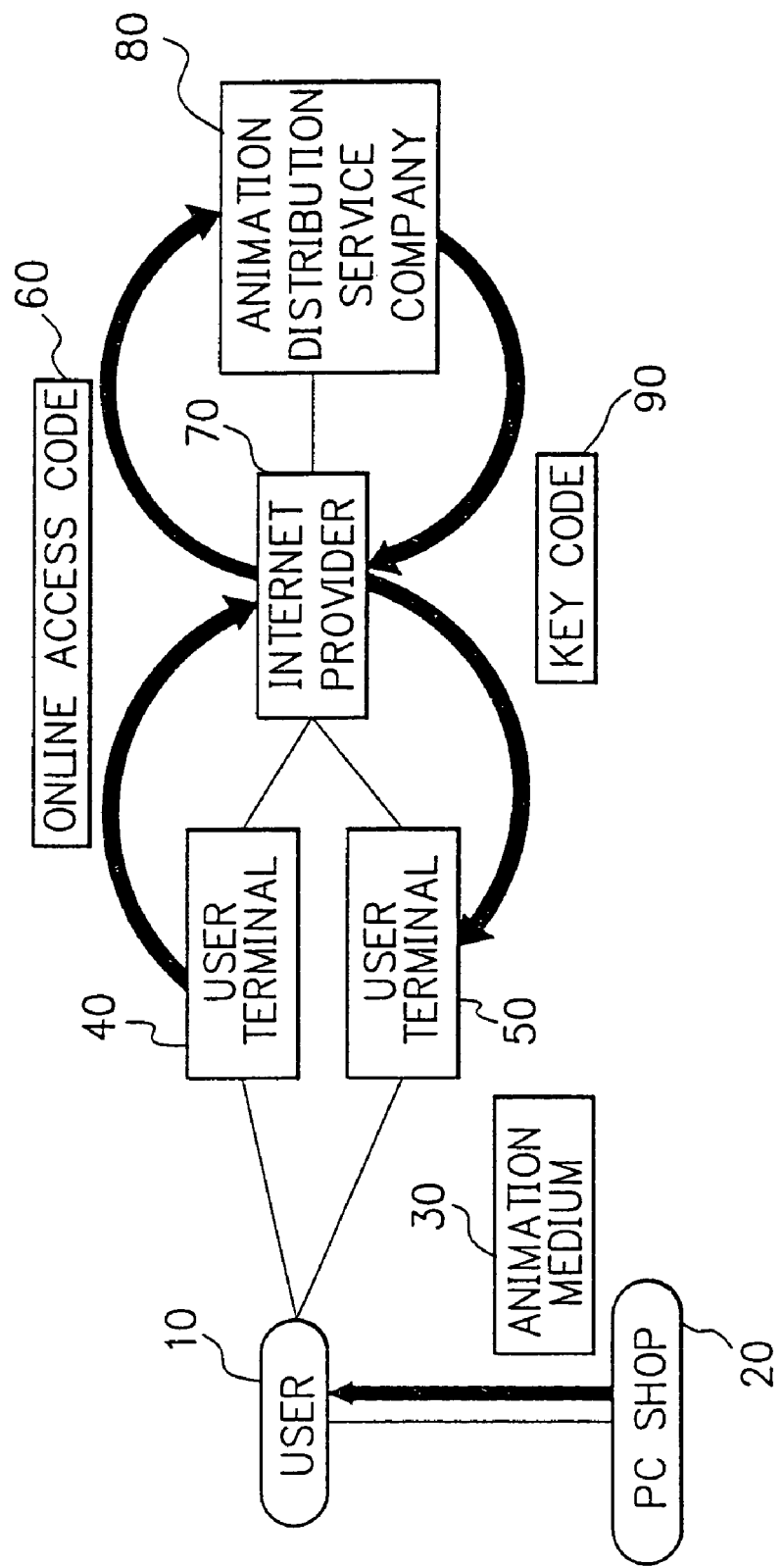

Hereafter, the flow of signals in the second animation data sales mediation system will be described referring to FIGS. 21 to 26. FIG. 21 shows the flow of the online access code 60 and the key code 90.

Figure 22:
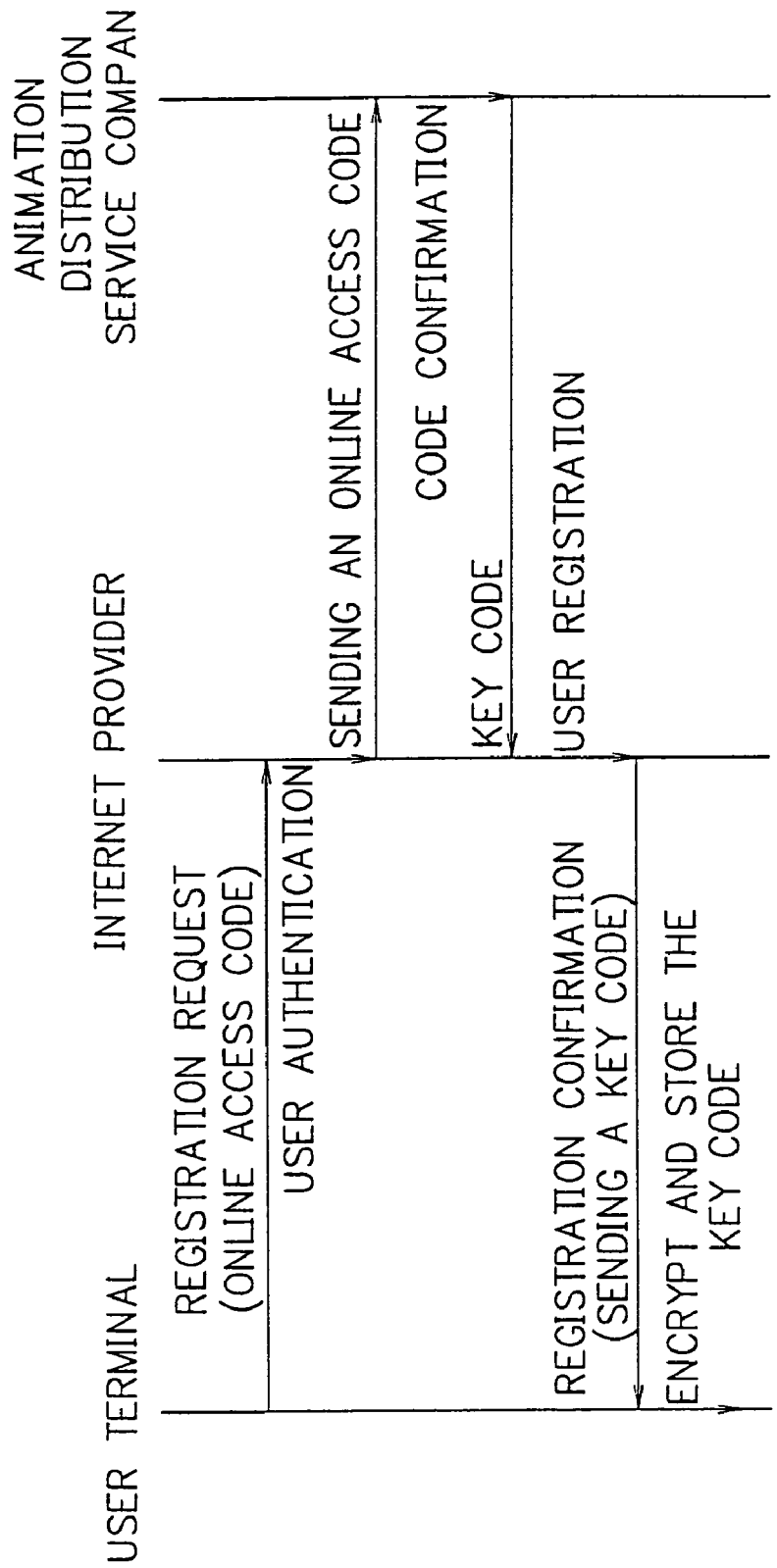
FIG. 22 is a fourth sequence diagram for describing the flow of processing in the large capacity data sales mediation system.

As shown in FIG. 22, the user terminal 40 sends the registration request signal including at least the online access code 60 and the user information to the server of the Internet provider 70.

The user identification division 72 determines whether or not this user information matches with the user information stored in the user information database 74. The method of this determination may be as described above.

In the case where the user identification division 72 identifies the user 10, the data distribution destination determining division 75 determines the name of the animation distribution service company 80 for sending the online access code 60 by contrasting the information stored in the animation distribution service company database 76 with the above registration request signal. For instance, as described above, the name of the animation distribution service company represented by some high-order bits of the online access code 60 may be determined by using the table stored in the animation distribution service company database 76.

The data distribution destination determining division 75 sends the online access code 60 to the server of the animation distribution service company 80 based on the determination results.

The key code sending feasibility determining division 84 performs the same operation as mentioned as to the above animation data sales system. To be more specific, it determines whether or not the inputted online access code 60 is legitimate by referring to the online code database 85. In addition, the key code sending feasibility determining division 84 determines whether or not the number of the provided key codes 90 corresponding to the online access code 60 is smaller than the predetermined number.

In the case where the online access code 60 is legitimate and the number of the provided key codes corresponding to the online access code 60 is smaller than the predetermined number, the key code sending feasibility determining division 84 sends the key code 90 corresponding to the online access code 60 to the server of the Internet provider 70.

If the key code 90 is inputted, the key code sending feasibility determining division 78 adds the information indicating that a license for reproducing the animation was provided, to the user information stored in the user information database 74. This information may be, for instance, information about the key code 90 being sent to the user terminal 40 or the names of the user terminal 40 and the online access code 60 for which animation reproduction was permitted. After adding the user information, the key code sending feasibility determining division 84 will have the signal generating division 69 generate the registration confirmation signal including the key code 90 and send it to the user terminal 40. Moreover, other conditions may be added as the above registration confirmation signal sending requirement. In addition, the key code sending feasibility determining division 84 increases the number of the key codes 90 stored in the online code database 85 by one.

Upon receipt of this registration confirmation signal, the user terminal 40 encrypts and stores the key code 90 as with the first user terminal in the above animation data sales system and also reproduces the animation medium (animation data) using the key code 90.

Figure 23:
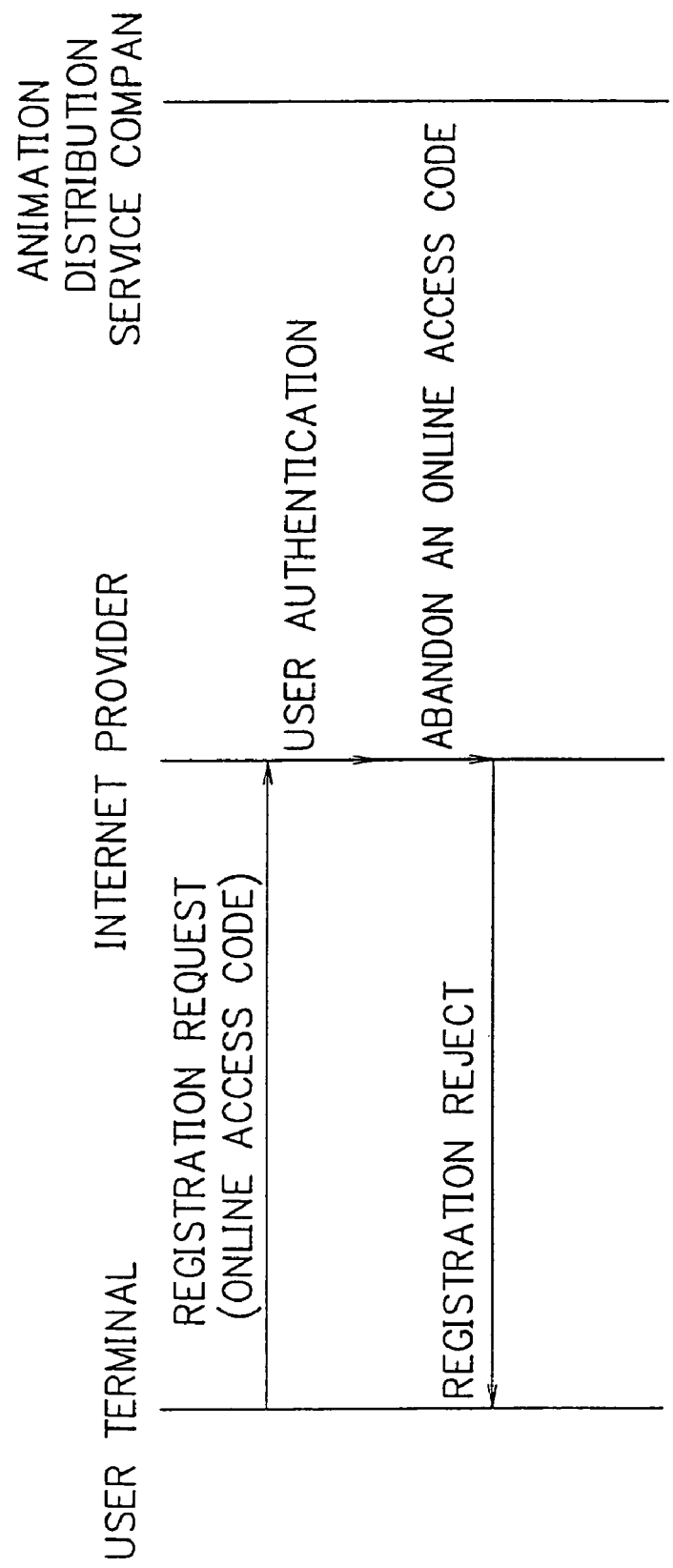
FIG. 23 is a fifth sequence diagram for describing the flow of processing in the large capacity data sales mediation system.

As shown in FIG. 23, in the case where the user identification division 72 cannot identify the user 10 (and/or in the case where the above registration request signal does not satisfy another condition of the registration confirmation signal sending requirement), the key code sending feasibility determining division 78 will have the signal generating division 69 create the registration reject signal and send it to the user terminal 40.

Figure 24:
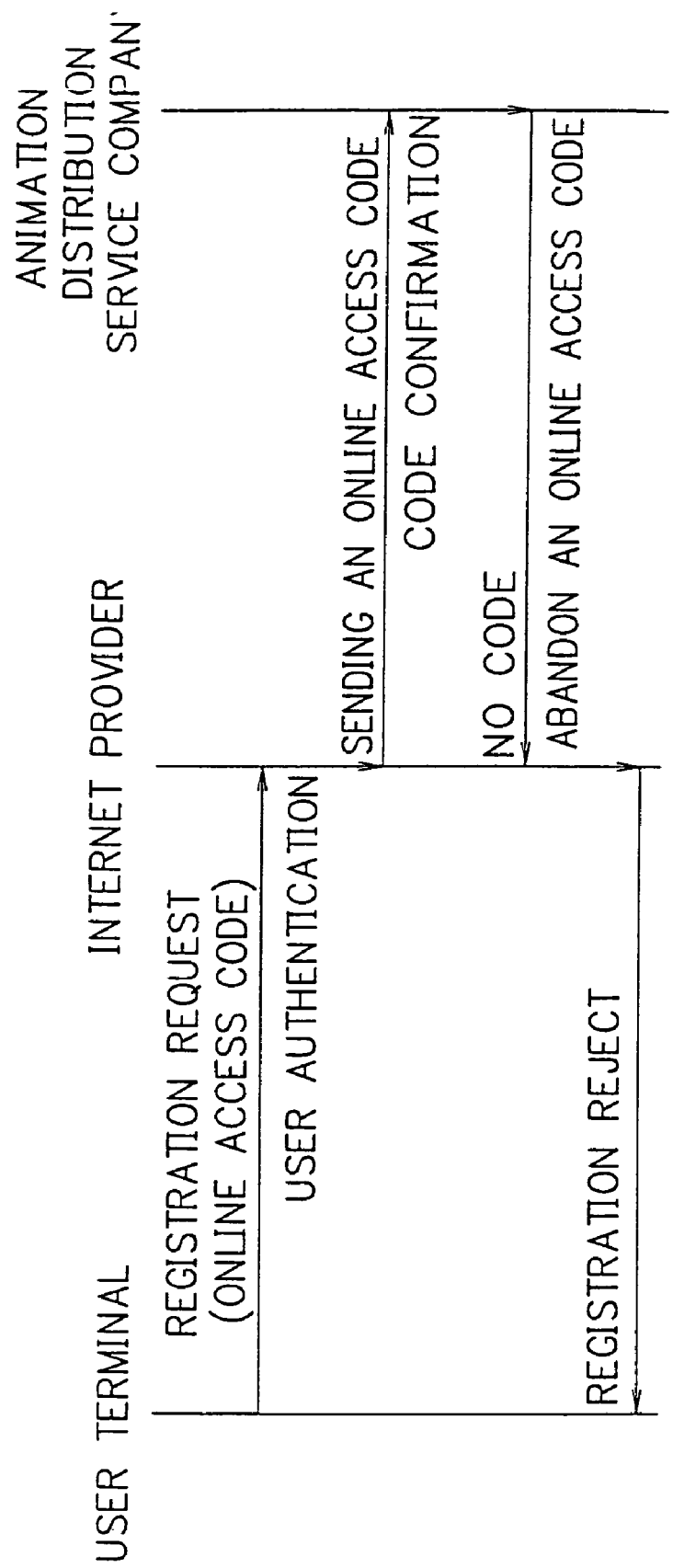
FIG. 24 is a sixth sequence diagram for describing the flow of processing in the large capacity data sales mediation system.

In addition, as shown in FIG. 24, if the input from the server of the animation distribution service company 80 indicates that the code authentication was unsuccessful, the key code sending feasibility determining division 78 sends the registration reject signal to the user terminal 40 using the signal generating division 69 as shown in FIG. 24.

If the deregistration request signal is inputted from the user terminal 40, the key code sending feasibility determining division 78 of the Internet provider 70 determines whether or not this signal is appropriate as mentioned as to the above animation data sales system.

Figure 25:
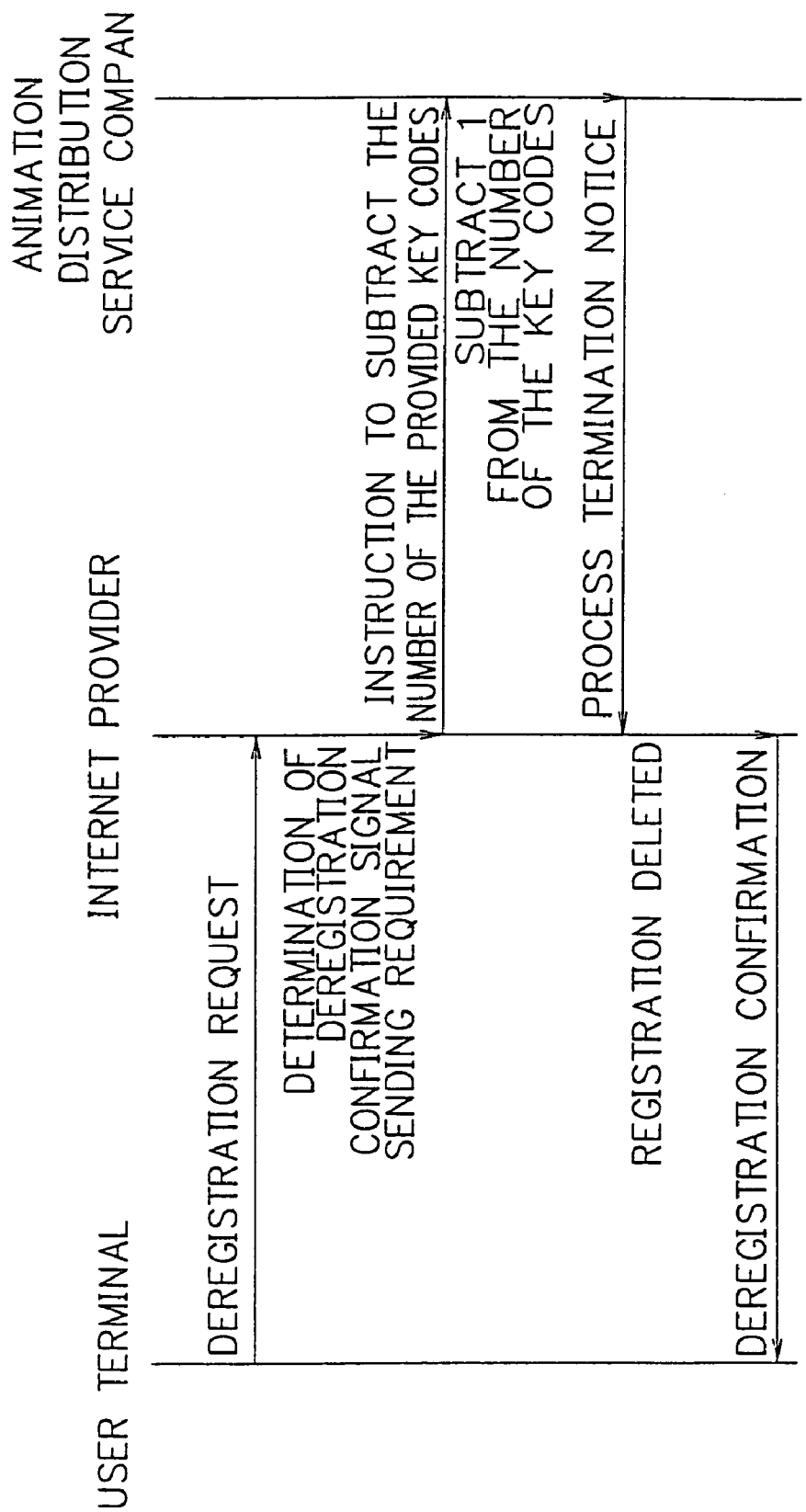
FIG. 25 is a seventh sequence diagram for describing the flow of processing in the large capacity data sales mediation system.

In the case of effecting deregistration as a result of the determination, the key code sending feasibility determining division 78 instructs the server of the animation distribution service company 80 to subtract one from the number of the distributed key codes 90 stored in the online code database 85 as shown in FIG. 25.

Upon receipt of this instruction, the received information decrypting division 83 (or the key code sending feasibility determining division 84) of the animation distribution service company 80 subtracts one from the above provided number and stores it.

The control division 73 of the Internet provider 70 uses the signal generating division 69 thereafter to send the above deregistration confirmation signal to the user terminal 40.

If this signal is inputted, the user terminal 40 erases the stored key codes 90 as described above.

In the case of not effecting deregistration as a result of the above determination, the key code sending feasibility determining division 78 sends the deregistration reject signal to the user terminal 40 using the signal generating division 69.

Thus, as the second animation data sales mediation server performs user management such as the user authentication, user registration and so on, the server of the animation distribution service company 80 only has to manage the online access code 60 and the key codes 90.

In addition, safety of the server of the animation distribution service company 80 is enhanced since the user 10 no longer accesses the server directly.

Moreover, the order of the user authentication and the code authentication may be reversed.

In addition, it is a matter of course that each constituent may be operated by the control division 82 according to the program.

<Second Animation Data Sales Mediation Method>

The second animation data sales mediation method may be performed as described above.

To be more specific, it has the steps of: having the user send the registration request signal including at least the online access code 60 and the user information to the server of the Internet provider 70; having the server of the Internet provider 70 send the online access code 60 to the server of the animation distribution service company 80; in the case where the key code 90 corresponding to the online access code 60 is stored in the server of the animation distribution service company 80 and the number of the issued key codes 90 is smaller than the predetermined number, having the key codes 90 sent to the server of the Internet provider 70; in the case where the above registration request signal meets the above registration confirmation signal sending requirement, having the server of the Internet provider 70 send the registration confirmation signal including the key codes 90 to the user terminal, add the information about this transmission, and increase the number of the key codes 90 stored in the animation distribution service company 80 by one; and having the user terminal 40 encrypt and store the key codes 90.

This animation data sales mediation method may further have the steps of: having the user 10 send the deregistration request signal to the server of the Internet provider 70 using the user terminal 40; in the case where the deregistration request signal satisfies the deregistration confirmation signal sending requirement, having the server of the Internet provider 70 send the deregistration confirmation signal to the user terminal 40; having the key codes 90 stored in the user terminal 40 erased; and having one subtracted from the number of the key codes 90 stored in the server of the animation distribution service company 80.

The above registration confirmation signal sending requirement may include, for instance, the condition that the server of the animation distribution service company 80 has the key code 90 corresponding to the online access code 60, the condition that the number of the issued key codes 90 corresponding to the online access code 60 is smaller than the predetermined number, and the condition that the user 10 can be identified from the above user information. In addition, it may include the condition that the consideration for the animation medium (animation data) is paid. Moreover, the Internet provider 70 may make advances for the consideration for the animation medium (animation data).

The above deregistration confirmation signal sending requirement, for instance, may include a condition that the above deregistration request signal was received from the user terminal 40 and/or the user 10 having been sent the key code 90.

In addition, the above animation data sales mediation method may further have the steps of: having the user terminal 40 notify the animation distribution service company 80 of the time for reproducing the animation medium (animation data); and having the animation distribution service company 80 collect from the user 10 the consideration according to this time.

In addition, the above animation data sales mediation method may further have the steps of: having the user terminal 40 notify the server of the Internet provider 70 of the time for reproducing the animation medium (animation data); and having the Internet provider 70 collect from the user 10 the consideration according to the time; and having the Internet provider 70 pay the collected consideration to the animation distribution service company.

In addition, the above animation data sales mediation method may further have the steps of: having the user terminal 40 notify the server of the animation distribution service company 80 of the frequency of reproducing the animation medium (animation data); and having the animation distribution service company 80 collect from the user 10 the consideration according to the frequency.

Moreover, the above animation data sales mediation method may further have the steps of: having the user terminal 40 notify the server of the Internet provider 70 of the frequency of reproducing the animation medium (animation data); having the Internet provider 70 collect from the user 10 the consideration according to the frequency; and having the Internet provider 70 pay the collected consideration to the animation distribution service company.

<Third Animation Data Sales Mediation System>

The third animation data sales mediation system has a fourth user terminal, a third animation data sales mediation server and a fourth animation data sales server.

The fourth user terminal is the same as the above third user terminal.

In this third animation data sales mediation system, the third animation data sales mediation server takes charge of almost all the functions of the first animation data sales system in the above animation data sales system, and the fourth animation data sales server operates only in the case where no key codes corresponding to the online access code exists in the third animation data sales mediation server. The details will be described below.

As shown in FIG. 3, this third animation data sales mediation system has the user terminals 40 and 50 that are the fourth user terminals, the server of the Internet provider 70 that is the third animation data sales mediation server, and the server of the animation distribution service company 80 that is the animation data sales server.

Figure 27:
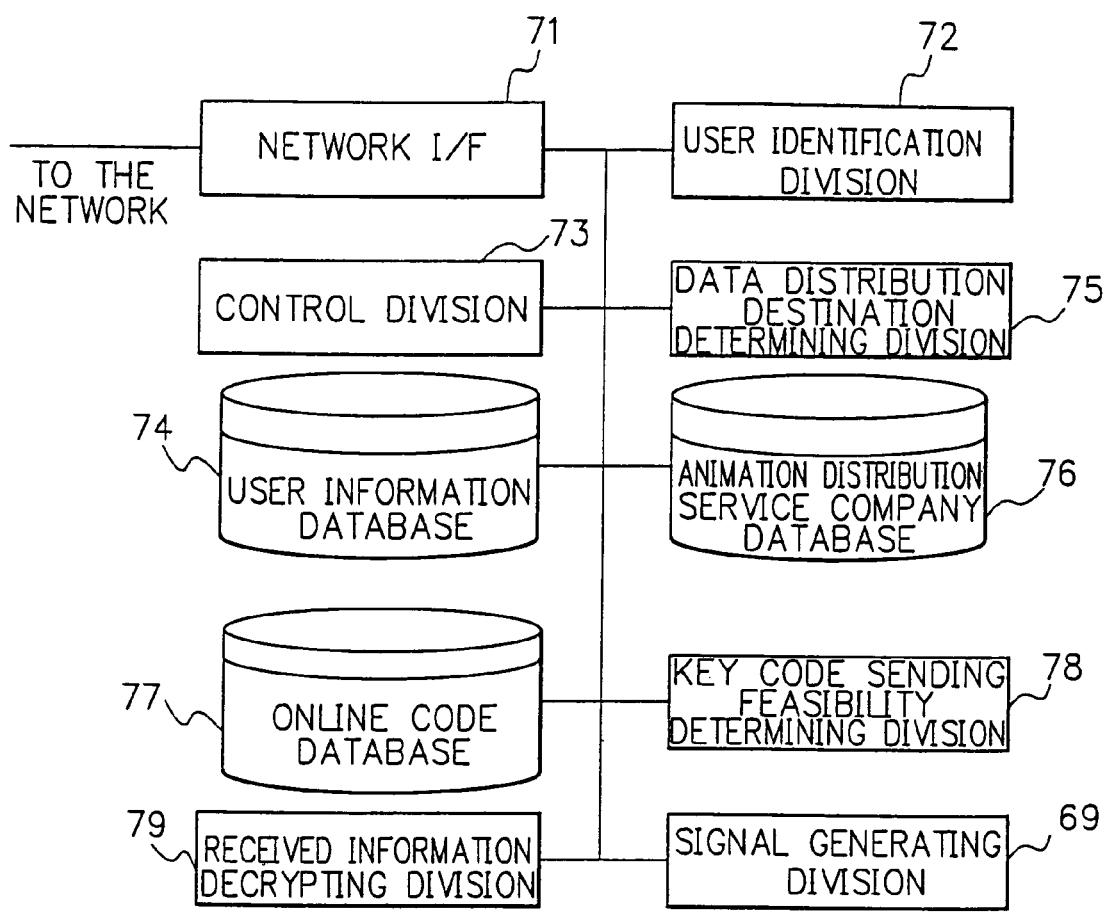
FIG. 27 is a third block diagram showing the internal configuration of the large capacity data sales mediation server.

As shown in FIG. 27, the server of the Internet provider 70 has the network I/F 71, the user identification division 72, the control division 73, a data distribution destination determining division 75, the user information database 74, an animation distribution service company database 76, an online code database 77, the key code sending feasibility determining division 78, the received information decrypting division 79 and the signal generating division 69.

The network I/F 71 performs communication with the user terminals 40 and 50 and the server of the animation distribution service company 80.

The user identification division 72 performs the user authentication based on the inputted user information and the user information stored in the user information database 74.

The control division 73 controls operation of this server.

The data distribution destination determining division 75 determines a destination of the online access code 60 inputted from the key code sending feasibility determining division 78 referring to the animation distribution service company database 76. This can be performed in the same manner as described above.

The user information is registered in the user information database 74 as described above.

The animation distribution service company database 76 has the name of the animation distribution service company 80 (or the name of the server of the animation distribution service company 80) having the key code 90 corresponding to the online access code 60 stored as described above.

The online code database 77 stores the key code 90 corresponding to the online access code 60 as in the case of online code database 85 of the server of the animation distribution service company 80 in the above animation data sales system. In addition, the number of the provided key codes 90 is stored for each online access code 60. Moreover, as described above, in the case where the key code 90 can be calculated by applying a predetermined conditional formula to the online access code 60, this conditional formula is stored. The key code 90 is created by the key code sending feasibility determining division 78 based on this conditional formula.

A correspondence table of the online access codes 60 and the key codes 90, and the key code 90 are acquired from the server of the animation distribution service company 80 in predetermined timing.

The key code sending feasibility determining division 78 refers to the online code database 77, just as the key code sending feasibility determining division 84 in the above animation data sales system, to determine whether or not the inputted registration request signal satisfies the above registration confirmation signal sending requirement. This requirement includes at least the three conditions, that is, a condition that the online access code 60 included in this registration request signal is stored in the online code database 77, a condition that the number of the provided key codes corresponding to the online access code 60 is smaller than the above predetermined number, and a condition that the user 10 can be identified by the user identification division 72 (user authentication condition). Moreover, the user authentication is performed by the user identification division 72. In addition, in the case where the online access code 60 is not stored in the online code database 77, it delivers the online access code 60 to the data distribution destination determining division 74.

In the case where the inputted registration request signal meets the above registration confirmation signal sending requirement, it has the signal generating division 69 create the registration confirmation signal and send it to the user terminal 40. In the case where the signal does not meet this requirement, the key code sending feasibility determining division 84 will have the signal generating division 69 create the registration reject signal and send it to the user terminal 40.

In the case where the inputted deregistration request signal meets the above deregistration confirmation signal sending requirement, the key code sending feasibility determining division 84 will have the signal generating division 69 create the deregistration confirmation signal and send it to the user terminal 40. In the case where the signal does not meet this requirement, the key code sending feasibility determining division 84 will have the signal generating division 69 create the deregistration reject signal and send it to the user terminal 40.

Moreover, in the case where there is no key code 90 corresponding to the online access code 60, the key code sending feasibility determining division 78 may either have the signal generating division 69 send the registration reject signal or have the key code 90 sent from the server of the animation distribution service company 80. This operation will be mentioned later.

The received information decrypting division 79 delivers the analysis results of the inputted signal to the control division 73.

The signal generating division 69 creates each signal based on instructions from the key code sending feasibility determining division 78 and sends it to the user terminal 40 via the network I/F 71.

Figure 28:
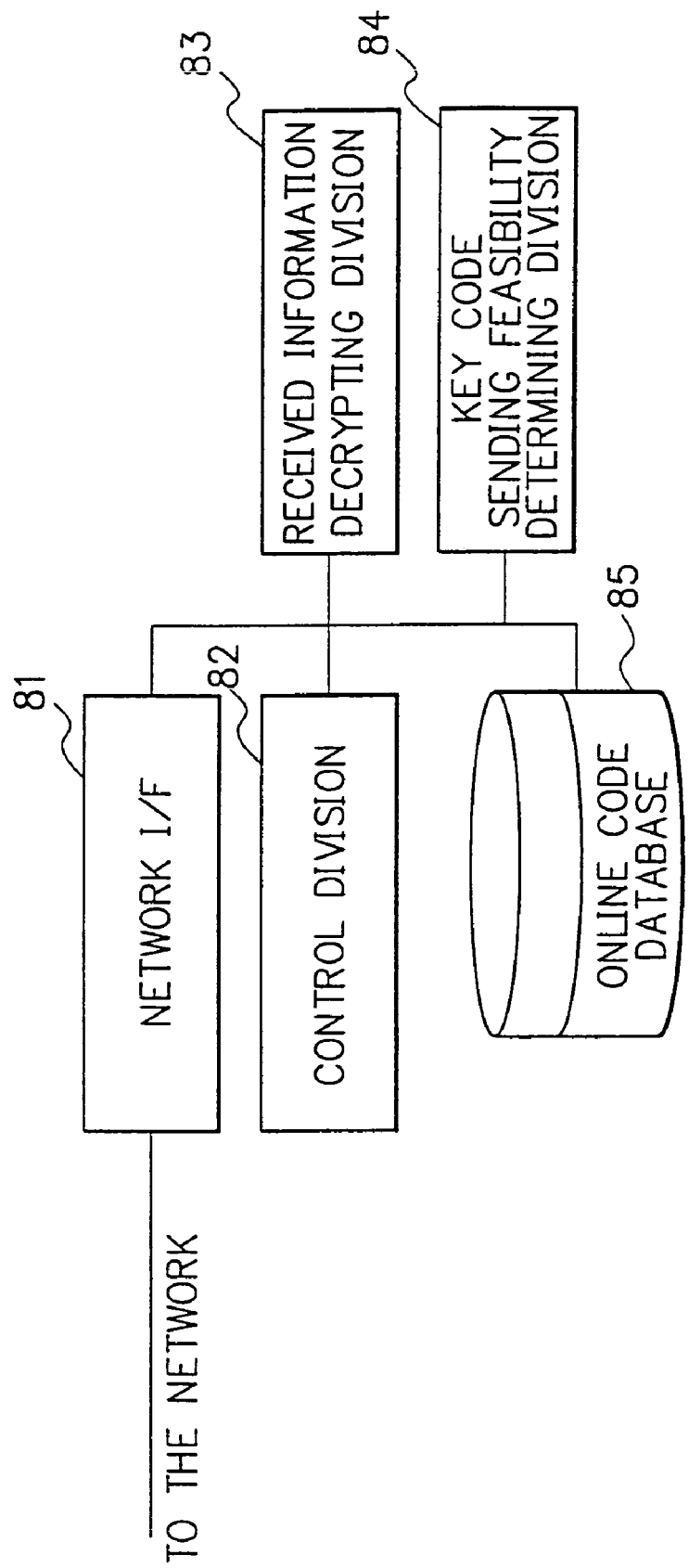
FIG. 28 is a fifth block diagram showing the internal configuration of the large capacity data sales server.

As shown in FIG. 28, the server of the animation-distribution service company 80 has the network I/F 81, the control division 82, the received information decrypting division 83, the key code sending feasibility determination division 84 and the online code database 85. The network I/F 81 performs communication with the server of the Internet provider 70. The control division 82 controls the operation of the server.

The key code sending feasibility determination division 84 performs a search as to whether the key code 90 corresponding to the inputted online access code 60 is stored in the online code database 85. In the case where the key code 90 is stored, it sends the key code to the server of the Internet provider 70.

The online code database 85 stores at least the key code 90 corresponding to the online access code 60. Moreover, as described above, it is also possible to store the predetermined conditional formula for deriving the key code 90 from the online access code 60. In the case where the conditional formula is stored in such a manner, the key code sending feasibility determination division 84 applies this conditional formula to the online access code 60 and creates the key code 90.

This flow of signals and so on in the third animation data sales mediation system will be described referring to the sequence diagrams of FIGS. 30 to 37 and FIGS. 21 and 29.

The user 10 sends the above registration request signal from the user terminal 40 to the server of the Internet provider 70.

Figure 30:
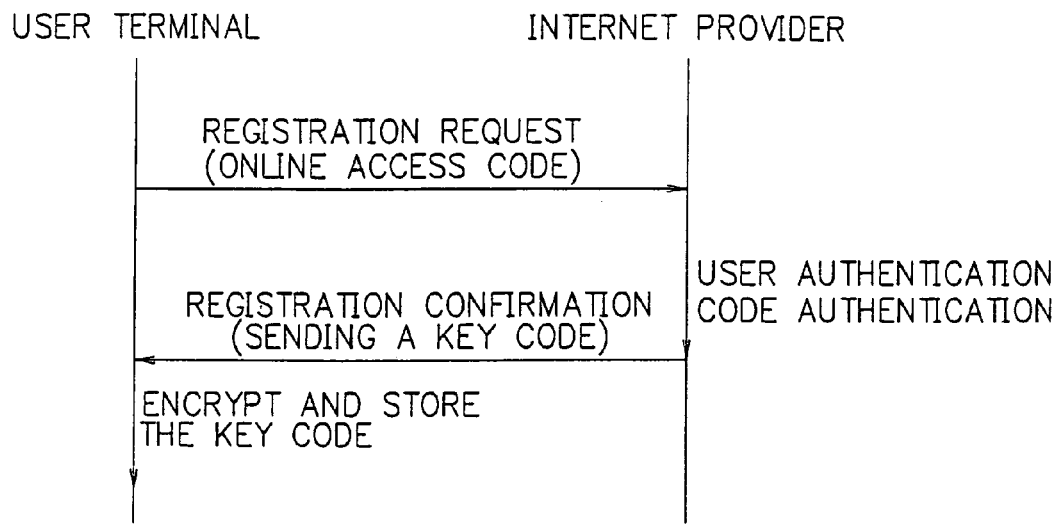
FIG. 30 is a ninth sequence diagram for describing the flow of processing in the large capacity data sales mediation system.

The key code sending feasibility determining division 78 determines whether or not the inputted registration request signal satisfies the above registration confirmation signal sending requirement. To be more specific, it has the user authentication performed by the user identification division 72 and the code authentication performed by the key code sending feasibility determining division 78. In the case where the above registration request signal satisfies the above registration confirmation signal sending requirement, the key code sending feasibility determining division 78 will have the signal generating division 69 send the registration confirmation signal to the user terminal 40 as shown in FIG. 30. This code authentication requirement includes at least the two conditions; a condition that the online access code 60 included in the above registration request signal is stored in the online code database 77 and a condition that the number of the provided key codes 90 is less than the predetermined number, and performing a search for any other conditions is voluntary. In addition, the number of the provided key codes 90 stored in the online code database 77 is increased by one. It also adds the information that the key code 90 has been added to the user information stored in the user information database 75.

The user terminal 40 encrypts and stores the key code 90 as described above.

Figure 29:
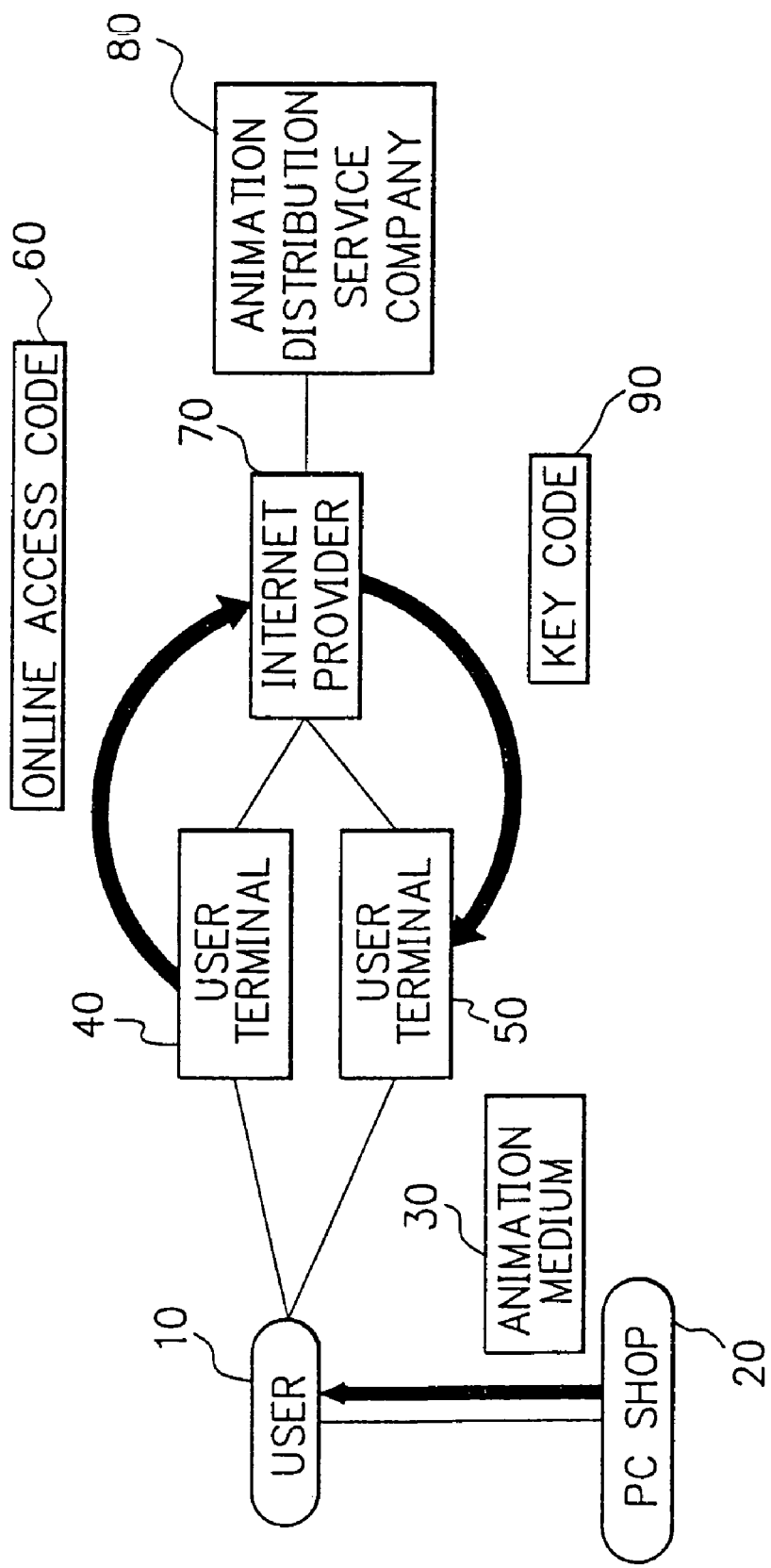

The flow of the data (signals) is as shown in FIG. 29.

Figure 31:
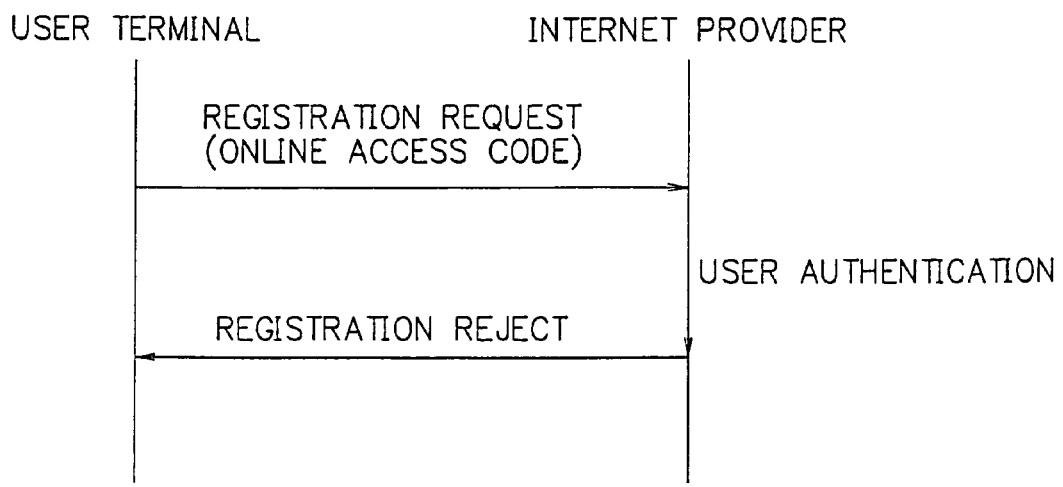
FIG. 31 is a tenth sequence diagram for describing the flow of processing in the large capacity data sales mediation system.

As shown in FIG. 31, in the case where the user 10 could not be identified as a result of the user authentication by the user identification division 72, the key code sending feasibility determining division 78 will have the signal generating division 69 send the registration reject signal to the user terminal 40.

The key code sending feasibility determining division 78 acquires the key code 90 from the server of the animation distribution service company 80. As for this method of acquisition, either one of the following methods or both of them may be used.

As a first method, there is a method of having the key code sending feasibility determination division 84 of the animation distribution service company 80 send the correspondence table of the online access codes 60 and the key codes 90 in predetermined timing.

Figure 32:
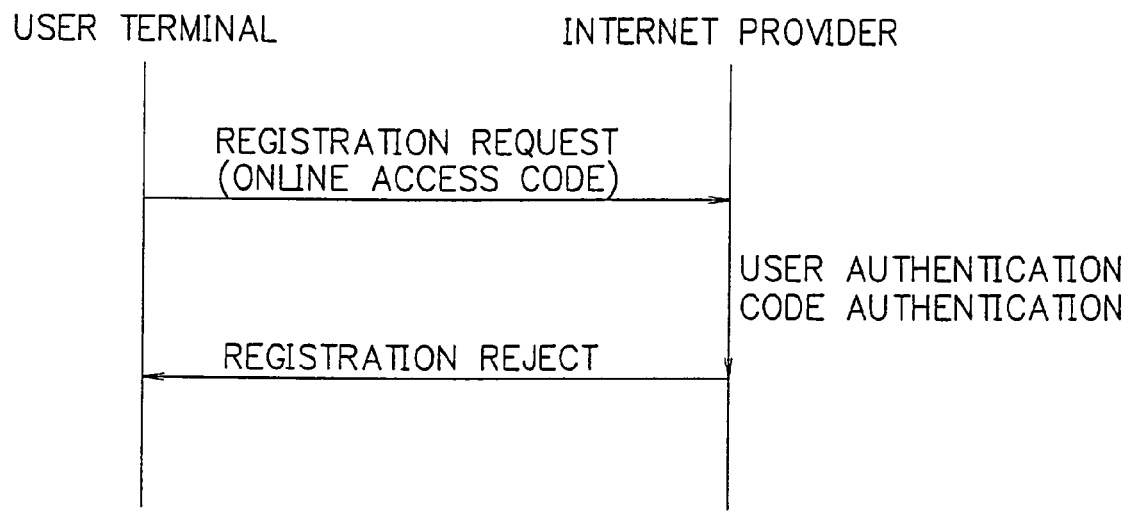
FIG. 32 is an eleventh sequence diagram for describing the flow of processing in the large capacity data sales mediation system.

Accordingly, in the case where no key code 90 corresponding to the online access code 60 is stored in the online code database 77 of the Internet provider 70, the key code sending feasibility determining division 78 will have the signal generating division 69 send the registration reject signal as shown in FIG. 32.

As a second method, there is a method of sending the online access codes 60 inputted from the user terminal 40 to the animation distribution service company 80 and having the corresponding key code 90 sent in return.

To be more specific, in the case where no key code 90 corresponding to the online access code 60 is stored in the online code database 77 of the Internet provider 70, the key code sending feasibility determining division 78 will have the data distribution destination determining division 75 send the online access codes 60 to the server of the predetermined animation distribution service company 80. The data distribution destination determining division 75 determines the destination of the online access codes 60 as mentioned above. In the case where the data distribution destination determining division 75 cannot determine the destination of the online access codes 60, it will have the signal generating division 69 send the registration reject signal as shown in FIG. 32.

The key code sending feasibility determination division 84 of the animation distribution service company 80 performs a search for the key code 90 corresponding to the online access code 60 at the online code database 85. If the key code 90 is successfully retrieved, the key code is sent to the server of the Internet provider 70.

Figure 33:
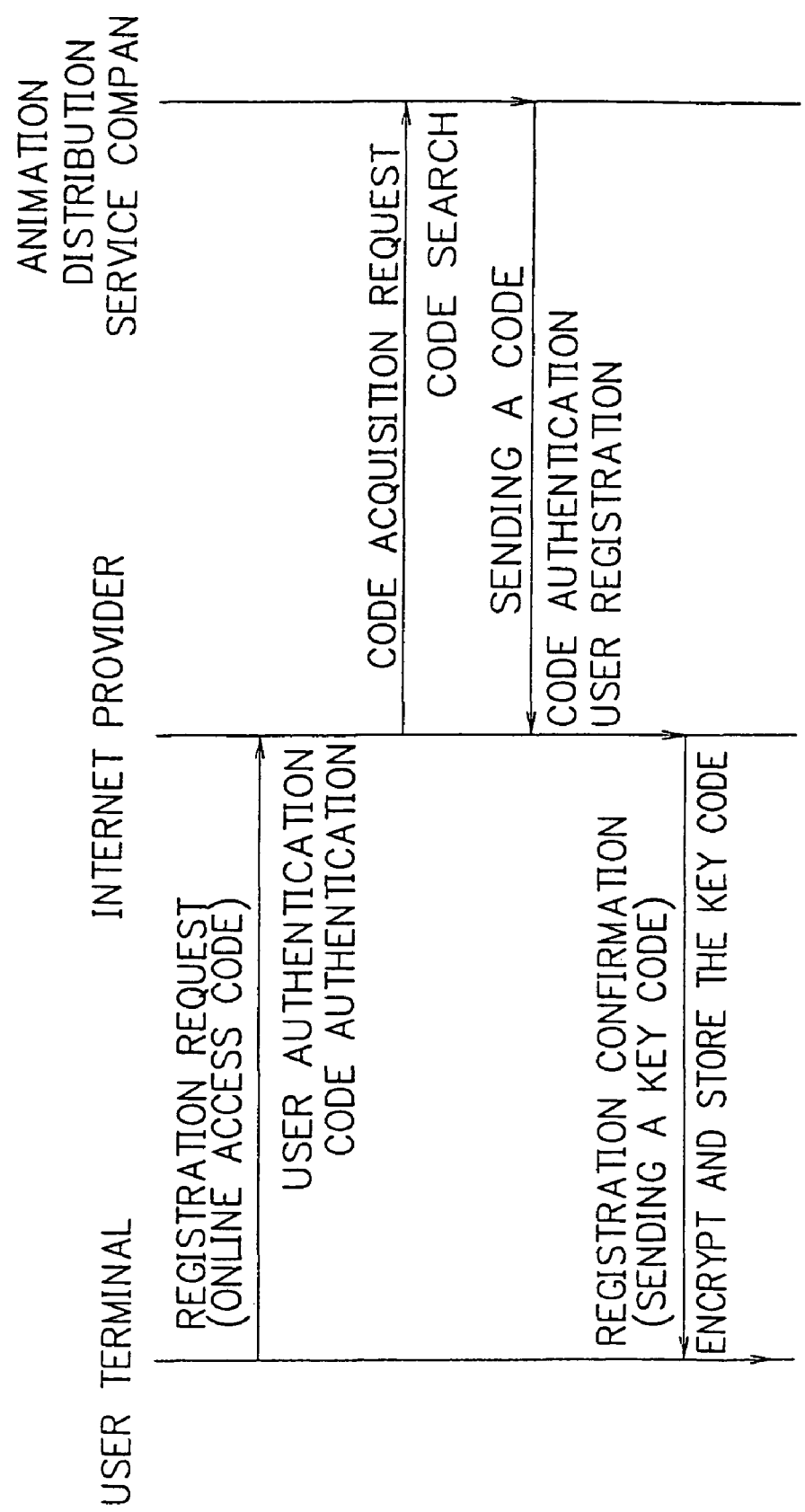
FIG. 33 is a twelfth sequence diagram for describing the flow of processing in the large capacity data sales mediation system.
Figure 34:
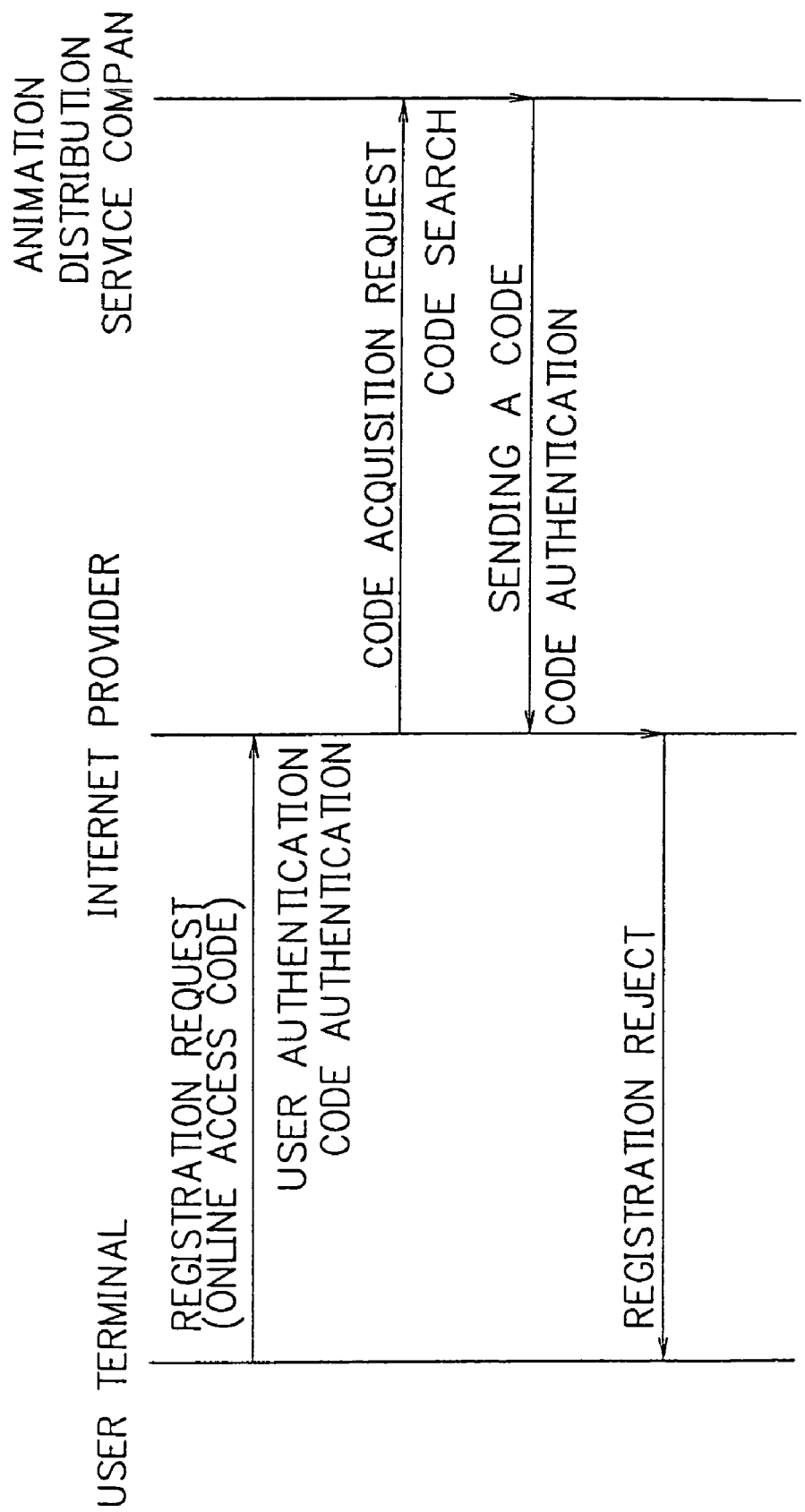
FIG. 34 is a thirteenth sequence diagram for describing the flow of processing in the large capacity data sales mediation system.

In the case where the above registration request signal meets the above registration confirmation signal sending requirement, the key code sending feasibility determining division 78 of the Internet provider 70 will have the signal generating division 69 send the registration confirmation signal as shown in FIG. 33. In the case where the above signal does not meet the above requirement, the key code sending feasibility determining division 78 will have the signal generating division 69 send the registration reject signal as shown in FIG. 34. The flow of the data (signals) in the case of sending the registration confirmation signal is as shown in FIG. 21.

Figure 35:
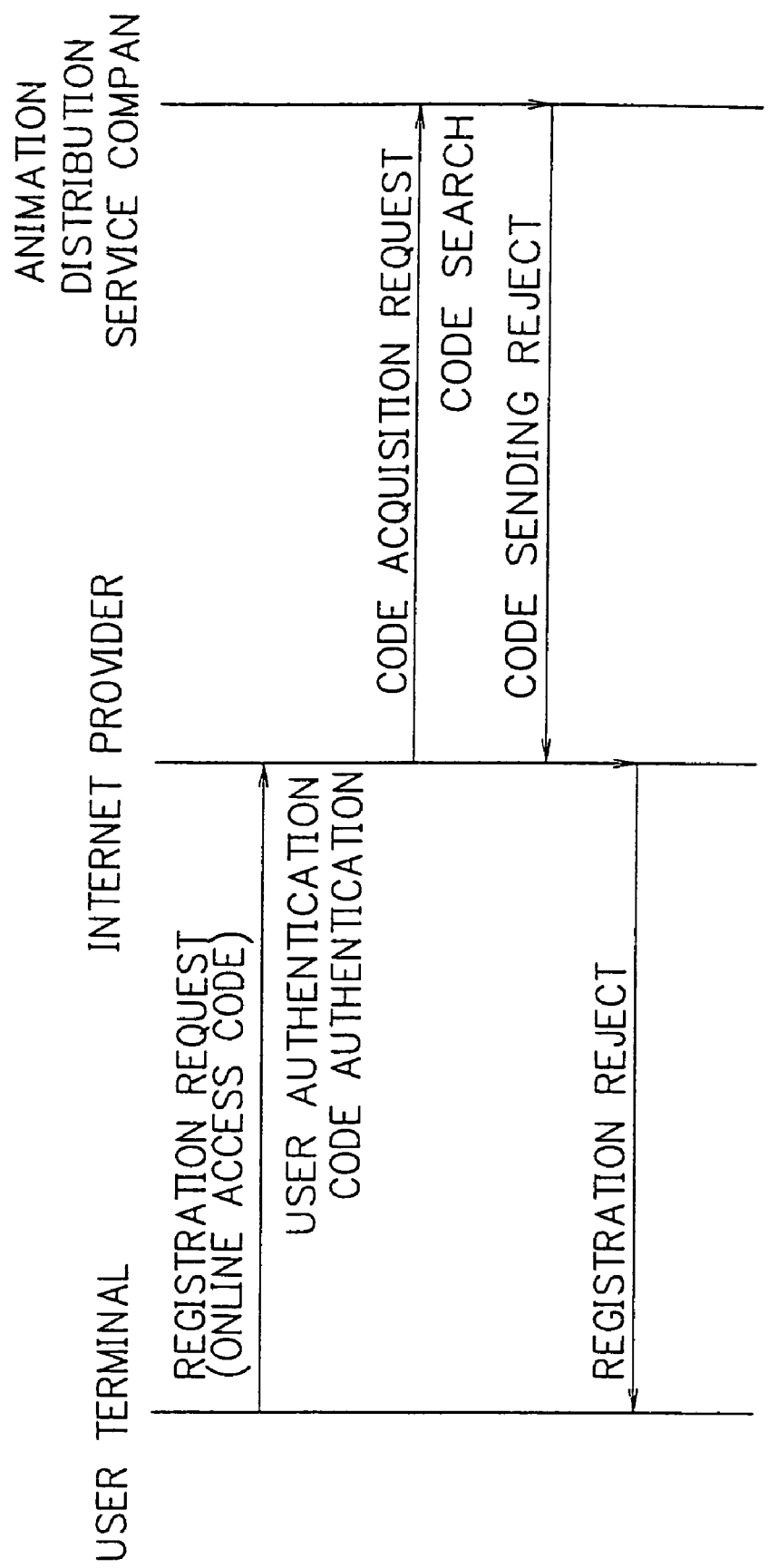
FIG. 35 is a fourteenth sequence diagram for describing the flow of processing in the large capacity data sales mediation system.

In the case where the key code sending feasibility determination division 84 of the animation distribution service company 80 cannot successfully perform a search for the key code 90 at the online code database 85, it notifies the server of the Internet provider 70 thereof as shown in FIG. 35.

The key code sending feasibility determining division 78 of the Internet provider 70 will have the signal generating division 69 send the registration reject signal to the user terminal 40.

Moreover, a method other than this may be used to acquire the key code 90.

Figure 36:
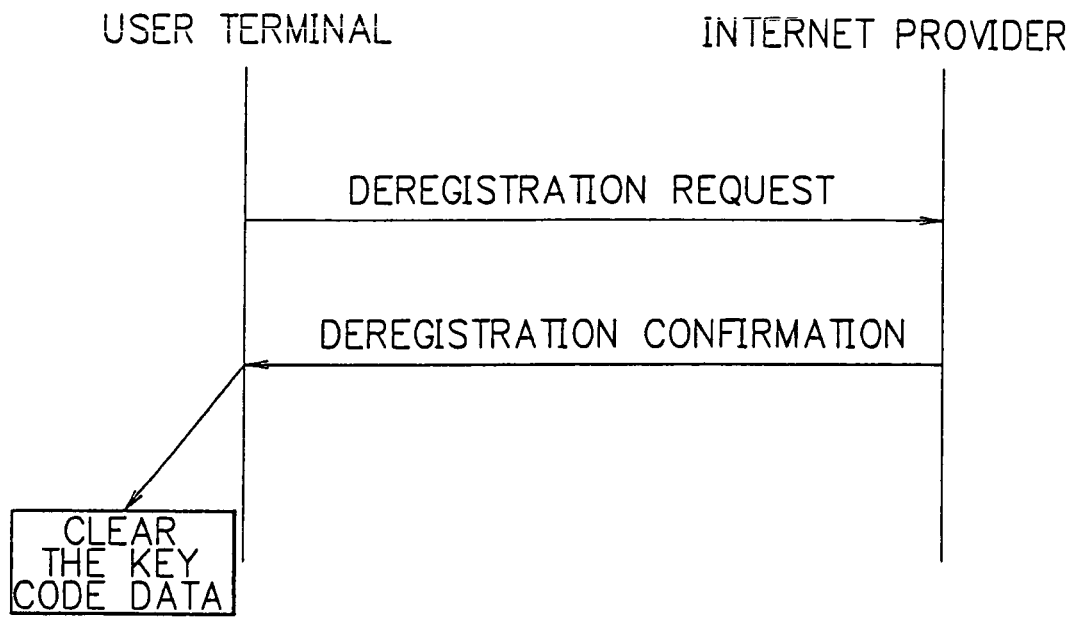
FIG. 36 is a fifteenth sequence diagram for describing the flow of processing in the large capacity data sales mediation system.
Figure 37:
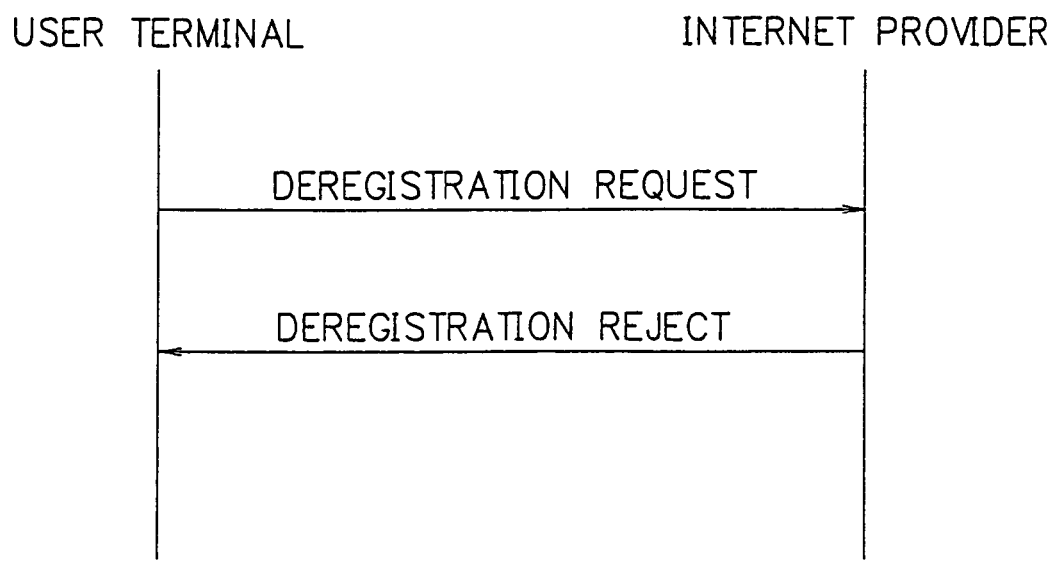
FIG. 37 is a sixteenth sequence diagram for describing the flow of processing in the large capacity data sales mediation system.

As shown in FIGS. 36 and 37, deregistration is performed not through the server of the animation distribution service company 80.

To be more specific, the key code sending feasibility determining division 78 of the Internet provider 70 determines whether or not the inputted deregistration request signal satisfies the above deregistration confirmation signal sending requirement in the above described manner. In the case where the above signal satisfies the above requirement, the key code sending feasibility determining division 78 will have the signal generating division 69 send the deregistration confirmation signal as shown in FIG. 36. In the case where it does not satisfy the requirement, the key code sending feasibility determining division 78 will have the signal generating division 69 send the deregistration reject signal as shown in FIG. 37.

Moreover, it is a matter of course that each of the above constituents may be operated by the control division according to the program.

<Third Animation Data Sales Mediation Method>

The third animation data sales mediation method may be performed as described above.

To be more specific, the third animation data sales mediation method has the steps of: having the user 10 send the registration request signal including at least the online access code 60 and the user information to the server of the Internet provider 70 using the user terminal 40; in the case where the above registration request signal satisfies the above registration confirmation signal sending requirement, having the server of the Internet provider 70 send the registration confirmation signal including the key code 90 to the user terminal

40, add the information indicating that the key code has been sent to the user information to be stored, and increase the number of the key codes 90 stored by the animation distribution service company 80 by one; and having the user terminal 40 encrypt and store the key codes 90.

In addition, determination of whether the above registration request signal satisfies the above registration confirmation signal sending requirement may be made based on data showing a corresponding relation between the online access code 60 and the key code 90.

Furthermore, this data may be stored in the server of the Internet provider 70.

In addition, the third animation data sales mediation method may further have the steps of: having the server of the animation distribution service company 80 send to the server of the Internet provider 70 the data showing the corresponding relation between the online access code 60 and the key code 90 in predetermined timing; and having the server of the Internet provider 70 store this data.

In addition, the third animation data sales mediation method may further have the steps of: in the case where the server of the Internet provider 70 could not successfully search for the key code 90 corresponding to the online access code included in the above registration request signal, having the server of the animation distribution service company 80 send the online access code 60; and in the case where the key code 90 corresponding to the online access code 60 inputted in the server of the animation distribution service company 80 is discovered, having it sent to the server of the Internet provider 70.

This animation data sales mediation method may further have the steps of: having the user 10 send the deregistration request signal to the server of the Internet provider 70 using the user terminal 40; in the case where the deregistration request signal satisfies the deregistration confirmation signal sending requirement, having the server of the Internet provider 70 send the deregistration confirmation signal to the user terminal 40; having the key codes 90 stored in the user terminal 40 erased; and having one subtracted from the number of the key codes 90 stored in the server of the Internet provider 70.

The above registration confirmation signal sending requirement may include, for instance, a condition that at least one of the servers of the Internet provider 70 and the animation distribution service company 80 has the key code 90 corresponding to the online access code 60, the condition that the number of the issued key codes 90 corresponding to the online access code 60 is smaller than the predetermined number and the condition that the user 10 can be identified from the above user information. A condition that the consideration for the animation medium (animation data) is paid may also be included. Moreover, the Internet provider 70 may make advances for the consideration for the animation medium (animation data).

The above deregistration confirmation signal sending requirement, for instance, may include a condition that the above deregistration request signal was received from the user terminal 40 and/or the user 10 having been sent the key code 90.

In addition, the above animation data sales mediation method may further have the steps of: having the user terminal 40 notify the animation distribution service company 80 of the time for reproducing the animation medium (animation data); and having the animation distribution service company 80 collect from the user 10 the consideration according to this time.

In addition, the above animation data sales mediation method may further have the steps of: having the user terminal 40 notify the server of the Internet provider 70 of the time of reproducing the animation medium (animation data); having the Internet provider 70 collect from the user 10 the consideration according to the time; and having the Internet provider 70 pay the collected consideration to the animation distribution service company.

In addition, the above animation data sales mediation method may further have the steps of: having the user terminal 40 notify the server of the animation distribution service company 80 of the frequency of reproducing the animation medium (animation data); and having the animation distribution service company 80 collect from the user 10 the consideration according to the frequency.

Moreover, the above animation data sales mediation method may further have the steps of: having the user terminal 40 notify the server of the Internet provider 70 of the frequency of reproducing the animation medium (animation data); having the Internet provider 70 collect from the user 10 the consideration according to the frequency; and having the Internet provider 70 pay the collected consideration to the animation distribution service company.

Moreover, as to the charge collection method of the above first animation data sales system, the same process executed by the animation distribution service company 80 in the above animation data sales system may be performed by the first animation data sales mediation server or the above second animation data sales server.

Likewise, in the above second animation data sales system, the same process as above may be performed by the above second animation data sales mediation server or the above third animation data sales server.

In addition, in the third animation data sales system, the same process as above may be performed by the third animation data sales mediation server or the above fourth animation data sales server.

Moreover, while the above description takes the animation data sales mediation server as the server of the Internet provider 70, it is not limited to this. To be more specific, it is sufficient, as mentioned above, as long as the functions of the animation data sales mediation server are possible.

However, there arises the following merit by using the animation data sales mediation server as the server of the Internet provider 70.

The Internet provider 70 can grasp the user's identity (user information) in detail. In addition, it is possible to acquire the user's credit information through the payment for the Internet connection charge and for products made through the Internet provider 70 and so on.

Furthermore, as the Internet provider 70 and the user terminal 40 are connected one to one instead of the WWW (world wide web), it becomes even easier to identify the user 10.

Thus, the Internet provider 70 having thorough information about the user allows any charge to be collected with high reliability and safety especially in the case of collecting the charge for the animation medium (animation data). In addition, such charge can be collected together with the Internet connection charge, for instance.

Moreover, it is possible to omit the user information included in the above registration request signal and/or the above deregistration request signal by using the large capacity data sales mediation server as the server of the Internet provider. It is because the Internet provider is connected to the user terminal in one to one correspondence so as to allow the user to be identified without necessarily acquiring the user information from the user.

[Record Medium Recording Animation Data Purchase Method]

In addition, the above user terminal may perform the above described operation by control of the program recorded on a record medium.

To be more specific, this record medium has the program recorded in a format readable by the user terminal 40 for implementing on the user terminal 40 the functions of: sending the registration request signal including the online access code 60 to the server of the animation distribution service company 80 or the server of the Internet provider 70; encrypting and storing the key code 90 corresponding one to one to the received animation medium (animation data) inputted to the server of the animation distribution service company 80 or the server of the Internet provider 70, being essential for reproducing; and decoding the encrypted key code 90 when reproducing the animation medium (animation data) to perform reproduction using the key code 90.

In addition, this record medium may have the program recorded for further implementing the functions of: sending the deregistration request signal requesting the deregistration to the server of the animation distribution service company 80 or the server of the Internet provider 70; and erasing the key code stored in the above user terminal upon receipt of the deregistration confirmation signal from the server of the animation distribution service company 80 or the Internet provider 70.

As is clear from the above description, the present invention allows sales and distribution of large capacity data to be efficiently conducted by providing the user with the large capacity storage medium in which the large capacity data such as the animation data is stored at an arbitrary place and permitting usage of the large capacity data on the network.

The present invention requires less work for the sales of the large capacity data since the consideration for the large capacity data can be collected via the network.

According to the present invention, only the predetermined number of key codes corresponding one to one to the online access code unique to the large capacity data, and which are essential for using the large capacity data are issued, and so there will no longer be the case where a single large capacity storage medium is reproduced by a plurality of user terminals. Thus, it is possible to prevent the large capacity storage medium from being copied in an unauthorized manner.

According to the present invention, it is possible to prevent the large capacity data (storage medium) from being used by a user (user terminal) having no key code since the use of data requires the key code corresponding one to one to the online access code unique to the large capacity data. In addition, it is possible to prevent unauthorized copies and so on more effectively by adopting the newest technology as the key code technology.

According to the present invention, it is possible to prevent the large capacity storage medium from being reproduced on any user terminal other than the agreed one since the key code essential for using the large capacity data is encrypted and stored in the user terminal. In addition, it becomes possible to prevent unauthorized copies and so on more effectively by adopting the newest technology as the encryption technology.

In addition, according to the present invention, it is possible for a distributor of the large capacity data to distribute the large capacity data by a simple server since the large capacity data sales mediation server mediates the sales of the large capacity data.

According to the present invention, it is possible for a seller of the large capacity storage medium (data) to grasp the information, usage situation and so on regarding the user of the large capacity data. In addition, in the case where the large capacity data sales mediation server performs the user authentication, it is possible for the distributor of the large capacity data to easily grasp the user information. Moreover, it is possible to grasp the detailed user information in the case where the large capacity data sales mediation server has the detailed user information, in particular, in the case where it is the server of the Internet provider.

It is possible to collect the usage charge for the large capacity data from each user since the users of the large capacity storage medium can be grasped.

According to the present invention, it is possible to elaborately set the usage charge for the large capacity data, and so it is also possible, for instance, to collect the usage charge each time the large capacity data is used. In addition, the user can pay the usage charge according to the actual usage situation of the large capacity data.

In addition, as the usage charge is collected by the large capacity data sales mediation server, it is possible for the seller of the large capacity data to engage in sales via the network of the animation medium without having to use a complicated system. In particular, in the case where the large capacity data sales mediation system is the Internet provider, it is possible to collect the usage charge together with the Internet connection charge so as to collect the usage charge more securely.

According to the present invention, it is possible for the distributor of the large capacity data to collect the usage charge safely and securely by performing the user authentication on issuing the key code. Moreover, the work required for the distribution of the large capacity data on the part of the distributor thereof is alleviated since the user authentication is performed by the large capacity data sales mediation server. In addition, it is possible for the distributor of the large capacity data to collect the usage charge more safely and securely in the case where the large capacity data sales mediation server has the detailed user information, in particular, in the case where it is the server of the Internet provider since the user authentication can be performed more securely.

While preferred embodiments of the invention have been described using specific terms, the description has been for illustrative purpose only, and it is to be understood that changes and variations may be made without departing from the sprit or scope of the following claims.

What is claimed is:

1. A user terminal comprising:

a reading division for reading an online access code from a storage medium in which the online access code and particular data have been stored prior to the storage medium ever being read from or written to by the user terminal, the online access code unique to the particular data stored in the storage medium;

means for sending to a mediation server a registration request signal including user identification information and the online access code;

means for receiving from said mediation server a registration confirmation signal including a key code corresponding to said online access code;

means for encrypting said key code to generate an encrypted key code;

means for storing said encrypted key code; and means for reproducing said particular data by using the key code.

2. The user terminal according to claim 1, further comprising:
   means for sending to said mediation server a deregistration request signal requesting erasure of said encrypted key code in the user terminal;
   means for receiving a deregistration confirmation signal from the mediation server; and
   means for erasing said encrypted key code.

3. A mediation server comprising:
   means for receiving from a user terminal a registration request signal comprising an online access code and user identification information, said user terminal having particular data stored in a storage medium;
   storage means for storing user information;
   means for determining whether user information corresponding to said user identification information is stored in said storage means;
   means for sending said online access code to a sales server;
   means for receiving from said sales server a key code corresponding to said online access code;
   means for sending to the user terminal a registration confirmation signal including said key code; and
   means for counting a number of user terminals storing the key code,
   wherein said mediation server sends to said user terminal said registration confirmation signal upon acquiring user information corresponding to said user identification information from said storage means, meeting at said sales server a condition that the key code corresponding to said online access code is acquired, and determining that the number of user terminals storing the key code is smaller than a predetermined number, and
   wherein said key code is used by said user terminal to reproduce said particular data at said user terminal.

4. The mediation server according to claim 3, wherein said mediation server sends to said user terminal said registration confirmation signal upon further receiving payment of a usage charge for said large capacity data.

5. The mediation server according to claim 3, further comprising means for sending a deregistration confirmation signal to said user terminal upon receiving a deregistration request signal from the user terminal.

* * * * *